United States Patent
Damiano et al.

(10) Patent No.: US 12,491,036 B2
(45) Date of Patent: Dec. 9, 2025

(54) IMAGE GUIDED SURGICAL ROBOTIC PLATFORM

(71) Applicant: Andromeda Surgical, Inc., San Francisco, CA (US)

(72) Inventors: Nicholas Ralph Damiano, San Francisco, CA (US); Kartik Tiwari, San Jose, CA (US)

(73) Assignee: Andromeda Surgical, Inc., San Francisco, CA (US)

( * ) Notice: Subject to any disclaimer, the term of this patent is extended or adjusted under 35 U.S.C. 154(b) by 0 days.

(21) Appl. No.: 19/017,696

(22) Filed: Jan. 12, 2025

(65) Prior Publication Data

US 2025/0228632 A1   Jul. 17, 2025

Related U.S. Application Data

(60) Provisional application No. 63/620,577, filed on Jan. 12, 2024.

(51) Int. Cl.
  *A61B 34/32* (2016.01)
  *A61B 18/20* (2006.01)
  *A61B 18/00* (2006.01)
  *A61B 34/20* (2016.01)

(52) U.S. Cl.
  CPC .............. *A61B 34/32* (2016.02); *A61B 18/20* (2013.01); *A61B 2018/00547* (2013.01); *A61B 2034/2065* (2016.02)

(58) Field of Classification Search
  CPC . A61B 34/32; A61B 18/20; A61B 2034/2065; A61B 2018/00547
  USPC ........................................................ 606/10
  See application file for complete search history.

(56) References Cited

U.S. PATENT DOCUMENTS

| | | |
|---|---|---|
| 2008/0013809 A1 | 1/2008 | Zhu et al. |
| 2017/0056116 A1 | 3/2017 | Kostrzewski |
| 2018/0049832 A1 | 2/2018 | Eckert et al. |
| 2018/0368921 A1 | 12/2018 | Jeszenszky et al. |
| 2019/0298449 A1 | 10/2019 | Khachaturov et al. |
| 2023/0137726 A1 | 5/2023 | Holsing et al. |

(Continued)

FOREIGN PATENT DOCUMENTS

WO    2014/031531 A1    2/2014

OTHER PUBLICATIONS

Macpherson. "The future of medicine: A medical student's perspective." University of Western Ontario Medical Journal 82.2 (2014): 3-3. Retrieved on Feb. 28, 2025 (Feb. 28, 2025) from <https://ojs.lib.uwo.ca/index.php/uwomj/article/view/4554/3759>.

(Continued)

*Primary Examiner* — Aaron F Roane
(74) *Attorney, Agent, or Firm* — Greenberg Traurig, LLP; Roman Fayerberg; David J. Dykeman

(57) ABSTRACT

A system, including one or more processors configured to receive imaging data of a surgical site, where an end effector held by a surgical robot is positioned in the surgical site, determine one or more anatomical landmarks in the imaging data, determine a location of the end effector, and generate a presentation to be presented on a user interface. The presentation includes one or more presentation elements indicative of the one or more anatomical landmarks in the surgical site, and one or more presentation elements indicative of a location of the end effector relative the one or more anatomical landmarks.

24 Claims, 26 Drawing Sheets

(56) References Cited

U.S. PATENT DOCUMENTS

2023/0397956 A1 12/2023 Crawford et al.
2024/0350215 A1 10/2024 Damiano et al.

OTHER PUBLICATIONS

Probst et al. "Automatic tool landmark detection for stereo vision in robot-assisted retinal surgery." IEEE Robotics and Automation Letters 3.1 (2017): 612-619. Retrieved on Feb. 28, 2025 (Feb. 28, 2025) from <https://arxiv.org/pdf/1709.05665>.
International Search Report and Written Opinion in PCT International Application No. PCT/US2025/8011319 mailed Mar. 10, 2025.

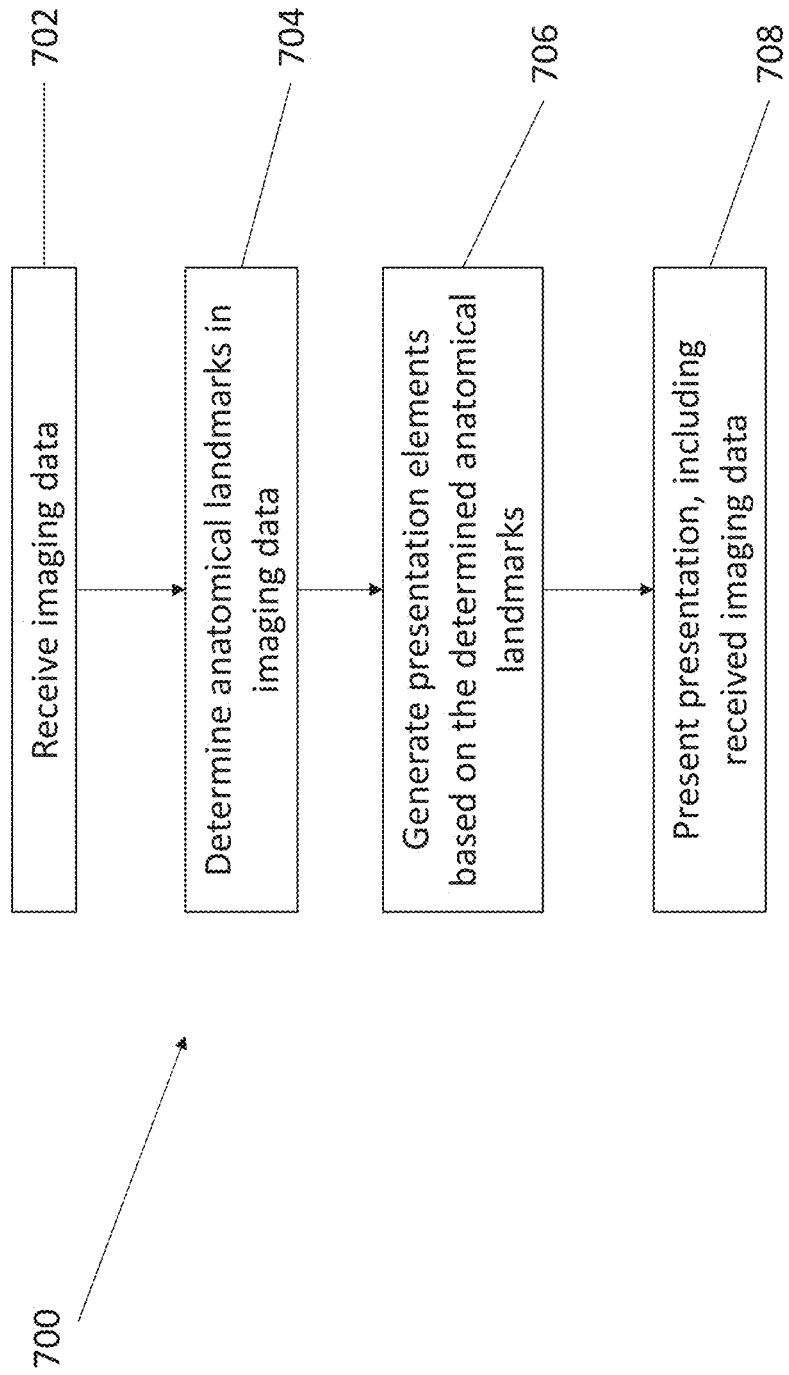

IMAGE GUIDED SURGICAL ROBOTIC PLATFORM

CROSS-REFERENCE TO RELATED APPLICATIONS

This application claims the benefit of and priority to U.S. Provisional Patent Application No. 63/620,577, filed Jan. 12, 2024, the contents of which are incorporated herein by reference in their entirety.

FIELD

This disclosure relates to processes and systems for an image-guide surgical robotic platform.

BACKGROUND

Various surgical techniques are known to provide high degree of successful outcomes when executed properly. Nonetheless, the high degree of manual surgical precision and expertise associated with such techniques may prevent the techniques from being widely adopted.

For instance, holmium laser enucleation of the prostate (HoLEP) is a trans-urethral procedure utilizing a Ho:YAG laser fiber to enucleate the adenoma of the prostate. The enucleated adenoma is then removed via morcellation from the bladder cavity. HoLEP was developed by Dr. Peter Gilling in the 1990s and has become a first-line surgical treatment for benign prostatic hypertrophy (BPH). Decades of data demonstrate HoLEP's safety and superiority in surgical outcomes compared to alternative treatments. However, the procedure's difficult learning curve remains an obstacle to its widespread adoption. There remains a need for methods and systems to make the HoLEP procedure more accessible to surgeons and lower the learning and training curve associated with the procedure.

SUMMARY

The present disclosure relates to a system, including: one or more processors; and one or more storage mediums having encoded thereon executable instructions that, when executed by the one or more processors, cause the one or more processors to: receive imaging data of a surgical site, wherein an end effector held by a surgical robot is positioned in the surgical site; determine one or more anatomical landmarks in the imaging data; determine a location of the end effector; and generate a presentation to be presented on a user interface, wherein the presentation includes: one or more presentation elements indicative of the one or more anatomical landmarks in the surgical site; and one or more presentation elements indicative of a location of the end effector relative the one or more anatomical landmarks.

In some embodiments, the present disclosure relates to a system, wherein the presentation further includes real-time imaging data of the surgical site. In some embodiments, the present disclosure relates to a system, wherein the one or more presentation elements indicative of the one or more anatomical landmarks in the surgical site annotate the real-time imaging data. In some embodiments, the present disclosure relates to a system, wherein: the presentation further includes a global map of the surgical site; the one or more presentation elements indicative of the one or more anatomical landmarks in the surgical site are presented on the global map; and the one or more presentation elements indicative of the location of the end effector relative the one or more anatomical landmarks are presented on the global map. In some embodiments, the present disclosure relates to a system, wherein: the presentation further includes a projection of an anatomy of the surgical site surrounding the real-time imaging data; and the one or more presentation elements indicative of the one or more anatomical landmarks in the surgical site are presented in the projection. In some embodiments, the present disclosure relates to a system, wherein the projection includes a point cloud of the anatomy of the surgical site surrounding the real-time imaging data. In some embodiments, the present disclosure relates to a system, wherein the executable instructions, when executed by the one or more processors, further cause the one or more processors to determine a location of a developed surgical plane in the surgical site. In some embodiments, the present disclosure relates to a system, wherein the one or more processors is configured to determine the location of the developed surgical plane in the surgical site based on radially extreme points that the end effector has been located at. In some embodiments, the present disclosure relates to a system, wherein the presentation further includes one or more presentation elements indicative of the location of the developed surgical plane in the surgical site. In some embodiments, the present disclosure relates to a system, wherein: the presentation further includes a global map of the surgical site; and the one or more presentation elements indicative of the location of the developed surgical plane in the surgical site is presented in the global map of the surgical site. In some embodiments, the present disclosure relates to a system, wherein the one or more anatomical landmarks include at least one of a Verumontanum, a bladder neck, a ureteric orifice, or an external urethral sphincter. In some embodiments, the present disclosure relates to a system, wherein the surgical site includes a prostate and surrounding anatomy. In some embodiments, the present disclosure relates to a system, wherein the end effector is configured to perform holmium laser enucleation of a prostate. In some embodiments, the present disclosure relates to a system, wherein the executable instructions, when executed by the one or more processors, further cause the one or more processors to determine a progress of enucleation of a prostate. In some embodiments, the present disclosure relates to a system, wherein the one or more processors is configured to determine the progress of enucleation of the prostate based on a location of the one or more anatomical landmarks in the surgical site and the location of the end effector in the surgical site. In some embodiments, the present disclosure relates to a system, wherein the one or more presentation elements indicative of the one or more anatomical landmarks in the surgical site are indicative of one or more of a location, a shape, or a size of the one or more anatomical landmarks in the surgical site.

The present disclosure relates to a system, including: one or more processors; and one or more storage mediums having encoded thereon executable instructions that, when executed by the one or more processors, cause the one or more processors to: receive imaging data of a surgical site, wherein an end effector held by a surgical robot is positioned in the surgical site; determine one or more anatomical landmarks in the imaging data; determine a location of the end effector; and generate a presentation to be presented on a user interface, wherein the presentation includes: real-time imaging data of the surgical site; a projection of an anatomy of the surgical site surrounding the real-time imaging data, wherein the projection includes a point cloud; a global map of the surgical site; one or more presentation elements indicative of a location, a size, or a shape of the one or more anatomical landmarks in the surgical site, wherein: at least one of the one or more presentation elements indicative of the location, the size, or the shape of the one or more anatomical landmarks are presented on the global map; and at least one of the one or more presentation elements indicative of the location, the size, or the shape of the one or more anatomical landmarks are presented in the projection; and one or more presentation elements indicative of a location of the end effector relative the one or more anatomical landmarks, wherein the one or more presentation elements indicative of the location of the end effector relative the one or more anatomical landmarks are presented on the global map.

In some embodiments, the present disclosure relates to a system, wherein: the executable instructions, when executed by the one or more processors, further cause the one or more processors to determine a location of a developed surgical plane in the surgical site; the presentation further includes one or more presentation elements indicative of the location of the developed surgical plane in the surgical site; and the one or more presentation elements indicative of the location of the developed surgical plane in the surgical site is presented in the global map of the surgical site.

The present disclosure relates to a method, including: receiving imaging data of a surgical site, wherein an end effector held by a surgical robot is positioned in the surgical site; determining one or more anatomical landmarks in the imaging data; determining a location of the end effector; and generating a presentation to be presented on a user interface, and wherein the presentation includes: one or more presentation elements indicative of the one or more anatomical landmarks in the surgical site; and one or more presentation elements indicative of a location of the end effector relative the one or more anatomical landmarks.

In some embodiments, the present disclosure relates to a method, wherein the presentation further includes real-time imaging data of the surgical site. In some embodiments, the present disclosure relates to a method, wherein the one or more presentation elements indicative of the one or more anatomical landmarks in the surgical site annotate the real-time imaging data. In some embodiments, the present disclosure relates to a method, wherein: the presentation further includes a global map of the surgical site; the one or more presentation elements indicative of the one or more anatomical landmarks in the surgical site are presented on the global map; and the one or more presentation elements indicative of the location of the end effector relative the one or more anatomical landmarks are presented on the global map. In some embodiments, the present disclosure relates to a method, wherein: the presentation further includes a projection of an anatomy of the surgical site surrounding the real-time imaging data; and the one or more presentation elements indicative of the one or more anatomical landmarks in the surgical site are presented in the projection. In some embodiments, the present disclosure relates to a method, wherein the projection includes a point cloud of the anatomy of the surgical site surrounding the real-time imaging data. In some embodiments, the present disclosure relates to a method, further including determining a location of a developed surgical plane in the surgical site. In some embodiments, the present disclosure relates to a method, wherein the location of the developed surgical plane in the surgical site is based on radially extreme points that the end effector has been located at. In some embodiments, the present disclosure relates to a method, wherein the presentation further includes one or more presentation elements indicative of the location of the developed surgical plane in the surgical site. In some embodiments, the present disclosure relates to a method, wherein: the presentation further includes a global map of the surgical site; and the one or more presentation elements indicative of the location of the developed surgical plane in the surgical site is presented in the global map of the surgical site. In some embodiments, the present disclosure relates to a method, wherein the one or more anatomical landmarks include at least one of a Verumontanum, a bladder neck, a ureteric orifice, or an external urethral sphincter. In some embodiments, the present disclosure relates to a method, wherein the surgical site includes a prostate and surrounding anatomy. In some embodiments, the present disclosure relates to a method, wherein the surgical robot is configured to perform holmium laser enucleation of a prostate. In some embodiments, the present disclosure relates to a method, further including determining a progress of enucleation of a prostate. In some embodiments, the present disclosure relates to a method, wherein determining the progress of enucleation of the prostate is based on the location of the one or more anatomical landmarks in the surgical site and the location of the end effector in the surgical site. In some embodiments, the present disclosure relates to a method, wherein the one or more presentation elements indicative of the one or more anatomical landmarks in the surgical site are indicative of one or more of a location, a shape, or a size, of the one or more anatomical landmarks in the surgical site.

The present disclosure relates to a system, including: a surgical robot configured to hold an end effector; one or more processors; and one or more storage mediums having encoded thereon executable instructions that, when executed by the one or more processors, cause the one or more processors to: receive imaging data of a surgical site, wherein the end effector is positioned in the surgical site; determine one or more anatomical landmarks in the imaging data; determine a location of the end effector; and generate a presentation to be presented on a user interface, wherein the presentation includes: one or more presentation elements indicative of a location of the one or more anatomical landmarks in the surgical site; and one or more presentation elements indicative of a location of the end effector relative the one or more anatomical landmarks.

The present disclosure relates to a system, including: one or more processors; and one or more storage mediums having encoded thereon executable instructions that, when executed by the one or more processors, cause the one or more processors to: receive imaging data of a surgical site; determine one or more anatomical landmarks in the imaging data; and generate a presentation to be presented on a user interface, wherein the presentation includes one or more presentation elements indicative of a location of the one or more anatomical landmarks in the surgical site.

The present disclosure relates to a system, including: one or more processors; and one or more storage mediums having encoded thereon executable instructions that, when executed by the one or more processors, cause the one or more processors to: receive imaging data of a surgical site, wherein: the surgical site includes a prostate; and an end effector held by a surgical robot configured to perform holmium laser enucleation of the prostate is positioned in the surgical site; determine one or more anatomical landmarks in the imaging data, wherein the one or more anatomical landmarks include at least one of a Verumontanum, a bladder neck, a ureteric orifice, or an external urethral sphincter; determine a location of the end effector; and generate a presentation to be presented on a user interface, wherein the presentation includes: one or more presentation elements indicative of a location of the one or more anatomical landmarks in the surgical site; and one or more presentation elements indicative of a location of the end effector relative the one or more anatomical landmarks.

In some embodiments, the present disclosure relates to a system, wherein the presentation further includes real-time imaging data of the surgical site. In some embodiments, the present disclosure relates to a system, wherein: the presentation further includes a global map of the surgical site; the one or more presentation elements indicative of the location of the one or more anatomical landmarks in the surgical site are presented on the global map; and the one or more presentation elements indicative of the location of the end effector relative the one or more anatomical landmarks are presented on the global map. In some embodiments, the present disclosure relates to a system, wherein: the presentation further includes a point cloud projection of an anatomy of the surgical site surrounding the real-time imaging data; and the one or more presentation elements indicative of the location of the one or more anatomical landmarks in the surgical site are presented in the point cloud projection. In some embodiments, the present disclosure relates to a system, wherein: the executable instructions, when executed by the one or more processors, further cause the one or more processors to determine a location of a developed surgical plane in the surgical site, wherein the developed surgical plane separates an adenoma from a prostatic capsule; and the presentation further includes one or more presentation elements indicative of the location of the developed surgical plane in the surgical site. In some embodiments, the present disclosure relates to a system, wherein: the presentation further includes a global map of the surgical site; and the one or more presentation elements indicative of the location of the developed surgical plane in the surgical site is presented in the global map of the surgical site.

BRIEF DESCRIPTION OF THE DRAWINGS

The present disclosure is further described in the detailed description which follows, in reference to the noted plurality of drawings by way of non-limiting examples of exemplary embodiments, in which like reference numerals represent similar parts throughout the several views of the drawings, and wherein:

FIG. 11 depicts an illustrative method for generating a presentation of imaging data based on determined landmarks in the imaging data, according to one or more embodiments herein;

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

DETAILED DESCRIPTION

The efficacy of surgical procedures has traditionally been largely dependent on a particular surgeon's skill level and experience with a specific surgery. That is, a surgeon may need to conduct a certain number of surgeries of a particular kind (for instance holmium laser enucleation of the prostate (HoLEP)) before the surgeon becomes proficient in the surgery such that desirable and precise surgical outcomes can be expected with a high degree of certainty. Even then, however the outcome of surgical procedures has been limited by human error of the surgeon. Such errors can be in decision making and physical precision (e.g., physical manipulation of a surgical instrument). Human surgical error, in many cases, has been tied to shortcomings in the surgeon's ability to accurately visualize the surgical target area in the patient's body. While real-time medical imaging has been beneficial, particularly, in non-invasive surgeries, such images can still be misinterpreted by a surgeon during the medical procedure.

Figure 1:
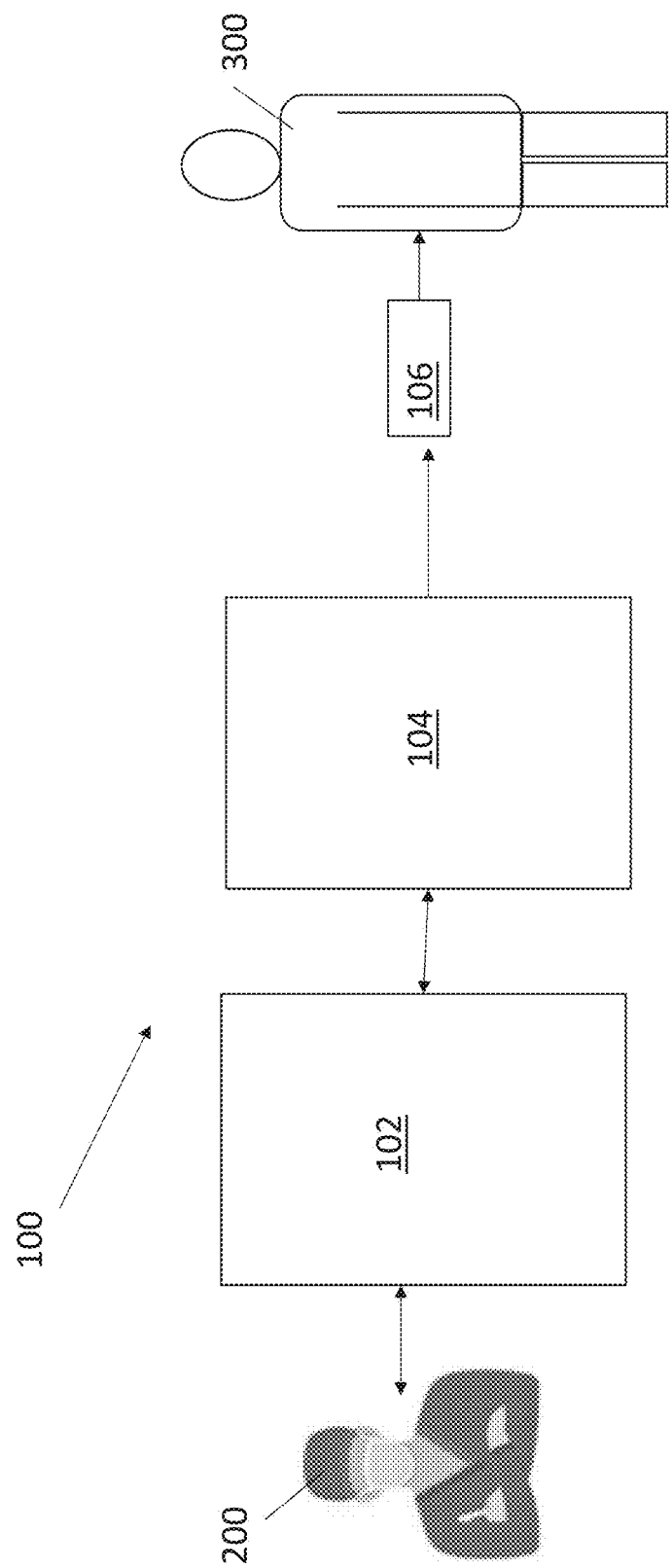
FIG. 1 depicts an illustrative system for guiding a surgeon during a medical procedure, according to one or more embodiments herein.

The present disclosure provides systems and methods for increasing the efficacy and reproducibility of surgical procedures by way of an image-guided surgical robotic platform. The presently disclosed surgical robotic platforms can be semi-autonomous, with varying degrees of human control or supervision over the surgical procedure, as discussed below. Referring to FIG. 1, a system 100 of the present disclosure is generally depicted. In some embodiments, the system 100 can generally include a control cart 102 (or another type of controller) and a robotic cart 104. In some embodiments, the control cart 102 and the robotic cart 104 can be in wired or wireless communication with each other such that data, information, commands, and instructions can be bi-directionally transmitted between the control cart 102 and the robot cart 104.

The robotic cart 104, as discussed in greater detail below, can generally include a movable robotic arm and an adapter positioned on the robotic arm and configured to hold and manipulate an end effector 106 (e.g. a surgical tool). In some embodiments, the adapter is fitted onto the robotic arm to hold endourology instruments and accessories needed to perform HoLEP. In some embodiments, the robotic cart 104 can include electronic systems to power and operate the robotic arm and end effector 106 and to process real-time data. The end effectors 106 can be positioned relative a patient 300 and controlled to perform a desired surgical procedure, such as HoLEP.

The control cart 102, as discussed in greater detail below, can generally include one or more displays or user interfaces, such as input/output devices, for interacting with a surgeon 200. In some embodiments, the control cart 102 can receive data from the robotic cart 104 relating to the location or operation of the end effector 106. In some embodiments, the control cart 102 can process the data received from the robotic cart 104. In some embodiments, the control cart 102 can process the data received from the robotic cart 104 in relation to a database of information generated from previously executed surgeries of the same type (e.g., previously executed HoLEP surgeries if the robotic cart 104 is being used to perform HoLEP). In some embodiments, the control cart 102 can present the processed data to the surgeon 200 on the one or more displays or user interfaces. In some embodiments, the control cart 102 can determine a proposed next surgical action for the robotic cart 104 to take and present, as a suggestion, the proposed next surgical action to the surgeon via the one or more displays. In some embodiments, the control cart 102 can receive an instruction from the surgeon via the one or more user interfaces, the instruction including a command for a next surgical action (e.g., movement of the end effector 106, actuation of the end effector 106, etc.) for the robotic cart 104 to take. The control cart 102 can transmit the command to the robotic cart 104.

The system 100, in presenting processed data to the surgeon 200 or in presenting a proposed next surgical action, can assist the surgeon 200 through the surgical procedure such that errors related to surgeon decision making are reduced or eliminated. The system 100, in controlling end effector 106 manipulation and activation via a robotic assembly, can more precisely execute the surgical procedure such that errors related to the surgeon 200 physically performing one or more surgical steps are reduced or eliminated. That is, in traditional surgical environment, the surgeon 200 directly interacts with the end effector 106, which is used to perform an action on the patient 300. The system 100, including the control cart 102 and the robotic cart 104, is functionally inserted between the surgeon 200 and the end effector 106 to assist the surgeon in controlling the end effector 106 to complete a surgical action on the patient 300.

Figure 2:
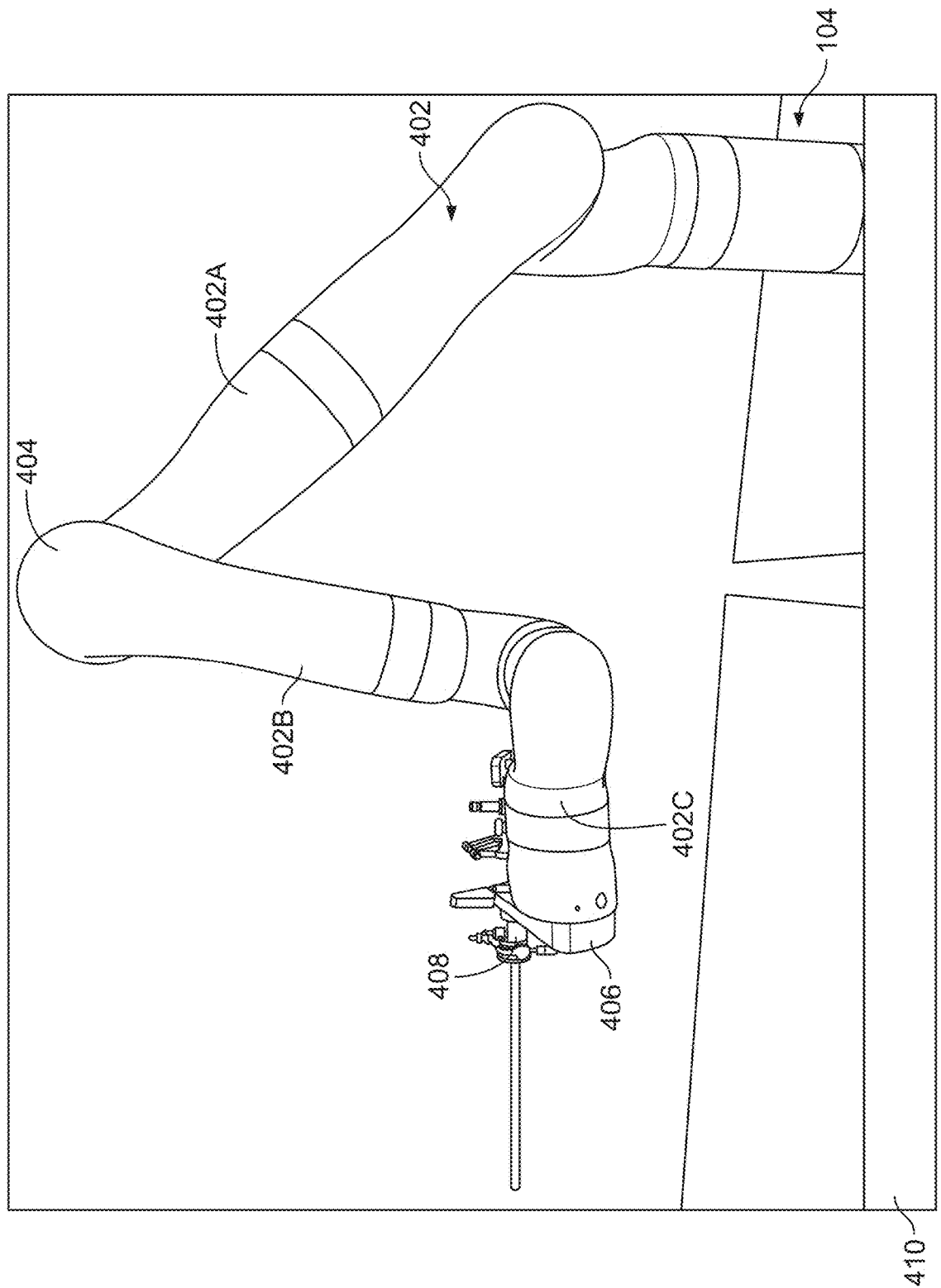
FIG. 2 depicts an illustrative robotic arm of a robotic cart, according to one or more embodiments herein.

Referring now to FIG. 2, the robotic cart 104 is depicted according to some embodiments. In some embodiments, the robotic cart 104 includes a base 410 and one or more robotic arms 402 which extend from the base 410. In some embodiments, the base 410 is movable, such that the base 410 and the robotic cart 104 can be optimally positioned for performing a surgery (e.g., next to a patient, operating table, hospital bed, etc.). For instance, in some embodiments, the base 410 can include one or more wheels to enable selective positioning of the base 410. In some embodiments, the base 410 is integral with one or more other pieces of hospital equipment, such as an operating table.

In some embodiments, each of the one or more robotic arms 402 can include a plurality of arm segments 402A, 402B, 402C. Each arm segment 402A-C can be coupled to an adjacent arm segment 402A-C by a joint 404. Each joint 404 can be selectively designed to impart a desired degree of freedom between the arm segments linked by the joint 404. For instance, the joint 404 can impart the robotic arm with two, four, or six degrees of freedom between the arm segment 402A and the arm segment 402B. Generally, the one or more robotic arms 402 can be designed and controlled to have any desirable axial, angular, or rotational motion. In some embodiments, the robotic arm 402 can have seven degrees of freedom.

In some embodiments, the distalmost (e.g., nearest to the surgical site) arm segment of the robotic arm 402 (e.g., the arm segment 402C in the embodiment of FIG. 2), can include an adapter 406 at its distal end. In some embodiments, the adapter 406 can be a hardware interface configured to receive or hold one or more end effectors 408. In some embodiments, the adapter 406 can allow the one or more robotic arms 402 to grip the one or more end effectors 408, can allow for non-permanent coupling of the one or more robotic arms 402 or other portion of the robotic cart 104 with the one or more end effectors 408, and the like.

In some embodiments, the end effector 408 can be any tool or device used to perform the surgical procedure. In some embodiments, the end effector 408 can be any tool or device positioned at or near the target surgical site for and during the surgical procedure. In some embodiments, the adapter 406 can be configured to hold or receive multiple end effector 408 at once. In some embodiments, the end effector 408 can be gripped or held by the adapter 406 at the distal ends of the one or more robotic arms 402. In some embodiments, the end effector 408 can be non-fixedly coupled to the adapter 406 at the distal ends of the one or more robotic arms 402. In some embodiments, a first end effector 408 can be removed from the adapter 406 and a second, different end effector 408 can be received by the adapter 406, as required.

In some embodiments, the end effector 408 is a procedure-specific tool, such as a tool designed for or implemented in a specific surgical procedure, such as HoLEP. In some embodiments, the end effector is a procedure-generic tool, such as a tool designed for or implemented in multiple different surgical procedures. In some embodiments, the end effector 408 can plug directly into the robotic cart 104 for providing energy to the end effector 408. In some embodiments, the end effector 408 can include one or more of a cystoscope, a rigid cystoscope, an endoscope, a resectoscope, a nephroscope, a cystoscopy, resectoscopy or nephroscopy sheath, a holmium, thulium, greenlight, or blue light laser, a laser fiber, a morcellator, an irrigation system, or an aspirator. In some embodiments, the end effector 408 can be any endourology instruments and accessories needed to perform HoLEP. In some embodiments, the robotic cart 104 can supply one or more operational sources to the end effector 408, such as a power source, a fluid source, or a vacuum source, as needed. In some embodiments, the one or more operational sources supplied to the end effector 408 can be included or stored in the base 410.

"Surgical site" as used herein can refer to the relevant anatomical area for performing a surgery. A surgical site can include an operating environment therein. The operating environment can be the anatomy in which the end effector 408 is directly actuated to perform the surgical procedure. Merely as an example, in the case of HoLEP, the operating environment can specifically be the prostate, where the end effector 408 is actuated to perform enucleation. In the case of HoLEP the surgical site can include anatomy surrounding the prostate that the surgeon can use as a positional reference or anatomy surrounding the prostate that could become implicated in the surgical procedure (e.g., can be accidentally punctured during enucleation of the prostate, can be navigated through to reach the prostate, etc.). Merely as an example, in the case of HoLEP, the broader surgical site can include one or more of the bladder neck, the ureteric orifices, the external urethral sphincter, or the bladder wall.

Figure 3:
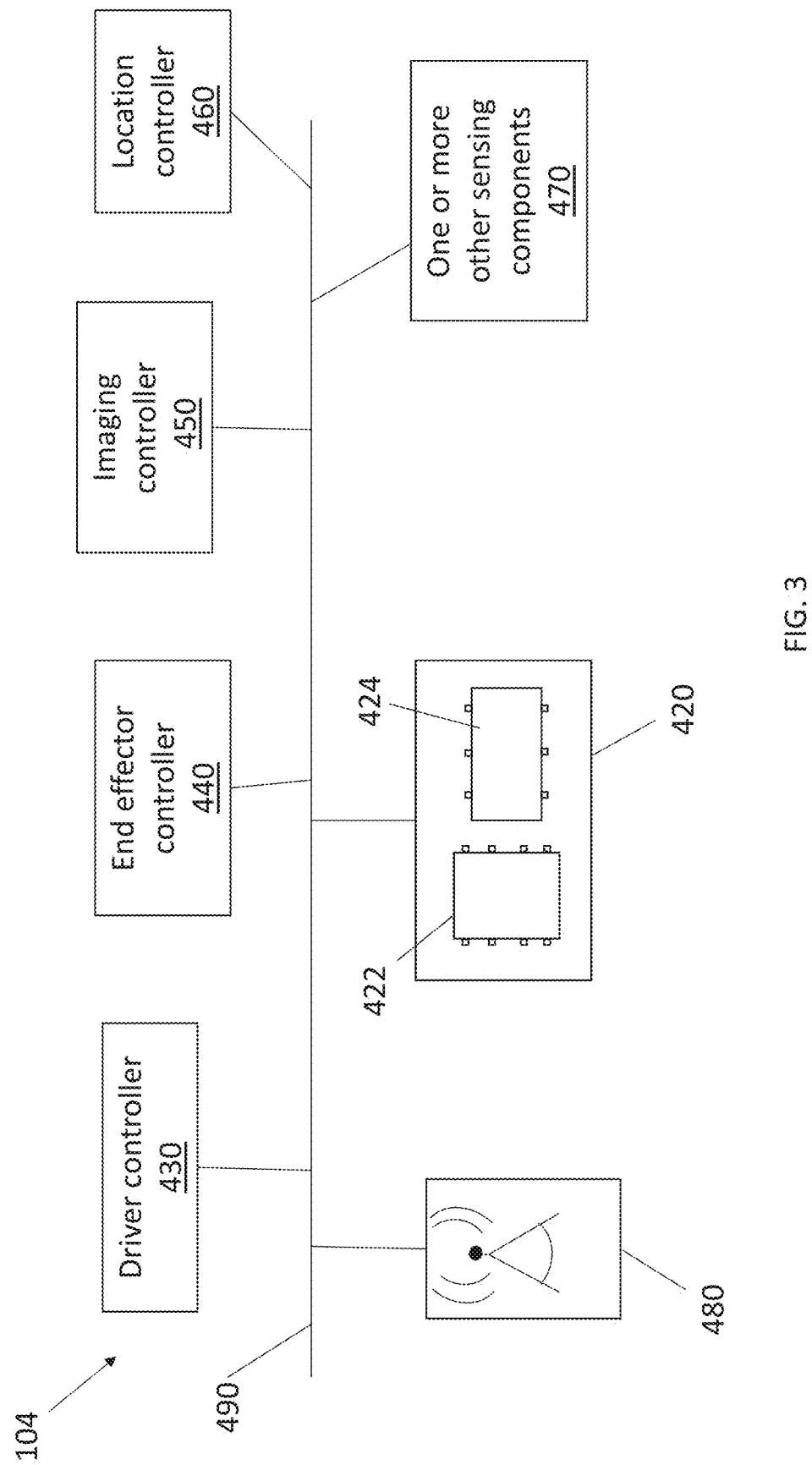
FIG. 3 depicts illustrative internal components and controllers of the robotic cart, according to one or more embodiments herein.

Referring now to FIG. 3, internal hardware components of the robotic cart 104, according to some embodiments, are depicted. The robotic cart 104 can include control circuitry 420 including a processor 422 and a memory module 424. In some embodiments, the control circuitry 420 can be an electronic control unit. In some embodiments, the robotic cart 104 can include a driver controller 430, an end effector controller 440, an imaging controller 450, a location controller 460, one or more other sensing controller 470, and a communications controller 480. The control circuitry 420 and the various controllers can be communicatively coupled to one another via a bus 490. The robotic cart 104 can be coupled to a power supply for supplying power to the control circuitry 420 and various controllers.

The processor 422 can include any processing component(s) configured to receive and execute instructions. In some embodiments, the instructions can be in the form of one or more processor-readable instructions or instruction sets stored in the memory module 424. In some embodiments, the processor 422 can be an electric controller, an integrated circuit, a microchip, a computer, or any other computing device. In some embodiments, the processor 422 is communicatively coupled to the other controllers of the robotic cart 104 via the bus 490. In some embodiments, the bus 490 can communicatively couple any number of processors 422 with one another, and allow the components and controllers coupled to the bus 490 to operate in a distributed computing environment. In some embodiments, each module or components of the robotic cart 104 can operate as a node that can send and/or receive data. In some embodiments, the robotic cart 104 can include more than one processor 422.

As noted above, in some embodiments, the control circuitry 420 includes the memory module 424. The memory module 424 can be communicatively coupled to the one or more processors 422. In some embodiments, the memory module 424 can include RAM, ROM, flash memories, hard drives, or any device capable of storing processor-readable instructions such that the processor-readable instructions can be accessed and executed by the one or more processors 422. The processor-readable instructions can include logic or algorithm(s) written in any programming language of any generation (e.g., 1GL, 2GL, 3GL, 4GL, or 5GL) such as, for example, machine language that can be directly executed by the processor 422, or assembly language, object-oriented programming (OOP), scripting languages, microcode, and the like, that can be compiled or assembled into processor-readable instructions and stored on the memory module 422. In some embodiments, the processor-readable instructions can be written in a hardware description language (HDL), such as logic implemented via either a field-programmable gate array (FPGA) configuration or an application-specific integrated circuit (ASIC), or their equivalents. Accordingly, the methods described herein can be implemented in any conventional computer programming language, as pre-programmed hardware elements, or as a combination of hardware and software components.

In some embodiments, the bus 490 can be formed from any medium that is capable of transmitting a signal such as, for example, conductive wires, conductive traces, optical waveguides, or the like. In some embodiments, the bus 490 can be formed from a combination of mediums capable of transmitting signals. The bus 490 communicatively couples the various components and modules of the robotic cart 104, such as those depicted in FIG. 3. As used herein, the term "communicatively coupled" means that coupled components are capable of exchanging data signals with one another such as, for example, electrical signals via conductive medium, electromagnetic signals via air, optical signals via optical waveguides, and the like.

In some embodiments, the driver controller 430 can be communicatively coupled to one or more motors to drive or move the robotic arm 402. The one or more motors can be configured to drive or move one or more segments (e.g., 402A-C) of the robotic arm 402. For instance, the one or more motors can be configured to articulate each robotic arm segment 402A-C independently of each other. The one or more motors can move each segment 402A-C with any desirable range of motion or degrees of freedom. In some embodiments, the one or more motors can drive each segment 402A-C of the robotic arm to achieve a desired axial motion, angular motion, or rotation of each segment 402A-C. In some embodiments, the driver controller 430 can be communicatively coupled to one or more brake components to selectively lock one or more segments 402A-C of the robotic arm 402 from moving about a corresponding joint 404.

In some embodiments, the memory module 424 can include driver instructions executable by the processor 422. Upon executing the drive instructions, the processor 422 can instruct the driver controller 430 to selectively move, position, or lock the robotic arm 402, and specifically, each segment 402A-C of the robotic arm 402. For example, the driver controller 430 can move the robotic arm 402, and specifically each segment 402A-C of the robotic arm, to selectively position the adapter 406 at the distal end of the robotic arm 402 (and therefore the end effector 408 received by the adapter 406) in or at a target surgical site to perform the surgical procedure. That is, the driver controller 430 can move the robotic arm 402 to optimally move and position the end effector 408 during and throughout the surgical procedure such that the end effector 408 can perform one or more tasks of the surgical procedure.

In some embodiments, the end effector controller 440 can include any one or more hardware devices configured to control actuation of the end effector 408. For instance, the end effector controller 440 can include one or more valves, pistons, levers, triggers, and the like configured to selectively actuate the end effector. The end effector controller 440 can include one or more electrical connections to relay power or control signals to an actuatable element of the end effector 408. For instance, in some embodiments, the end effector controller 440 can be configured to actuate (e.g., fire) a laser of the end effector 408, to actuate one or more movable blades of the end effector 408, to provide a supply of fluid to and out of the end effector 408, to actuate a suction element of the end effector 408, and the like. In some embodiments, the end effector controller 440 can selectively control the supply of one or more sources of operation of the end effector 408, such as a power source, an irrigation source, a vacuum source, and the like.

In some embodiments, the end effector controller 440 can include one or more actuators, controls, or electrical connections to change the settings of the end effector 408. For instance, if the end effector 408 includes an element for tissue ablation, the end effector controller 440 can include one or more hardware components connected with the end effector 408 such that the end effector controller 440 can change settings of the element (e.g., ablation temperature) and control or energize the element for tissue ablation during the procedure. Ablation should be appreciated merely as an example. The end effector controller 440 can be configured to actuate any end effector 408 manipulated by the robotic arm 402 by means of activation (turning one or more elements of the end effector 408 on/off) and degree (changing a setting, such as ablation temperature, vacuum pressure, etc.).

In some embodiments, the memory module 424 can include end effector instructions executable by the processor 422. Upon executing the end effector instructions, the processor 422 can instruct the end effector controller 440 to selectively actuate the end effector 408. For example, after the end effector 408 is optimally located in or at a target surgical site, the end effector 408 can be actuated to perform a surgical task. Merely as an example, the end effector 408 can be actuated to fire a laser of the end effector 408 to selectively ablate or eliminate a desired tissue at the target surgical site.

In some embodiments, the processor 422 can store data on end effector 408 actuation (e.g., log data on instructions sent to the end effector control module). In some embodiments, the processor can gather data on end effector 408 actuation from the end effector controller 440. In some embodiments, the processor 422 can stamp or associate the data on end effector 408 actuation with a respective time (e.g., the time of each actuation of the end effector 408) and a respective location (e.g., the position and orientation of the end effector 408 each time the end effector 408 is actuated, as discussed further below). "Location" and "location data," as uses herein can include at least one of position or orientation, or at least one of position data or orientation data, respectively.

In some embodiments, the imaging controller 450 includes one or more sensors configured to provide imaging data (e.g., video or still images) on the target surgical site and the operating environment of the end effector 408 (e.g., in the target surgical site). In some embodiments, the one or more imaging sensors can be included in the end effector 408. For instance, in some embodiments, the adapter 406 can receive one or more end effectors 408 at a time, and one of the one or more end effectors 408 is an imaging device, such as a cystoscope, including the one or more imaging sensors. In some embodiments, the imaging device or imaging sensors can be integrated with a dual-purpose end effector 408. For instance, a resectoscope can include an internal lumen for receiving a cystoscope or the imaging device or sensor, and for positioning the imaging sensors in the operating environment of the resectoscope (e.g., in the target surgical site). In some embodiments, the one or more imaging sensors can be integrated into the robotic cart 104. For instance, one or more imaging sensors or an imaging device can be integral or permanently fixed to the robotic arm 402 or a portion of the adapter 406.

In some embodiments, the imaging controller 450 is configured to generate real-time imaging data. A "frame" of image sensor data, as used herein, refers to a set of image sensor data collected by the imaging module 450 at a fixed point in time. A frame of image sensor data can be a still image, or a "slice" of video sensor data at a certain point in time. That is, video sensor data can be considered a collection of frames of imaging data over time. In some embodiments, the memory module 424 can include image sensor instructions executable by the processor 422. Upon executing the image sensor instructions, the processor 422 can instruct the imaging controller 450 to detect and image the environment around the imaging sensors (including the operating environment of the end effector 408 or the target surgical site). The imaging controller 450 can provide the gathered imaging data to the processor 422 or the communication module 480 for analysis and transmission, respectively.

In some embodiments, the location controller 460 can include one or more hardware components for determining or detecting the location of the end effector 408. In some embodiments, the location controller 460 includes one or more location sensors positioned on the robotic arm 402 or adapter 406. In some embodiments, the one or more location sensors can detect a location (which can include a position and orientation) of one or more portions of the robotic arm 402 or adapter 406. In such embodiments, a location of the end effector 408 relative to the one or more portions of the robotic arm 402 or the adapter 406 can be known (e.g., a distance and direction that the distal end of the end effector 408 extends from the adapter 406), such that a location of the end effector 408 (and particularly the distal end of the end effector 408) can be determined from the detected location of the one or more portions of the robotic arm 402 or adapter 406. In some embodiments, the location controller 460 includes one or more location sensors positioned on the end effector 408. In such embodiments, the one or more location sensors can directly detect a location of the end effector 408 (and particularly the distal end of the end effector 408). In some embodiments, the location controller 460 can be configured to collect inverse kinematic data on the robotic arm 402 or data on the state of the one or more motors for moving the robotic arm 402. In such embodiments, the reverse kinematic data or motor state data can be used to determine a location of one or more portions of the robotic arm 402 or adapter 406. In such embodiments, a location of the end effector 408 relative to the one or more portions of the robotic arm 402 or the adapter 406 can be known (e.g., a distance and direction that the distal end of the end effector 408 extends from the adapter 406), such that a location of the end effector 408 (and particularly the distal end of the end effector 408) can be determined from the determined location of the one or more portions of the robotic arm 402 or adapter 406.

In some embodiments, the memory module 424 can include location instructions executable by the processor 422. Upon executing the location instructions, the processor 422 can instruct the location controller 460 to detect a location (e.g., position and orientation) of the end effector 408 (and particularly the distal end of the end effector 408 that is configured to affect tissue at the target surgical site). The location controller 460 can provide the detected location data to the processor 422 or the communication module 480 for analysis and transmission, respectively. For instance, in some embodiments, the processor 422 can be configured to determine the location of the end effector 408 from the location of the one or more portions of the robotic arm 402 or adapter 406 or from the reverse kinematic data or motor state data. In some embodiments, location controller 460 can be configured, itself, to determine the location of the end effector 408 from the location of the one or more portions of the robotic arm 402 or adapter 406 or from the reverse kinematic data or motor state data.

In some embodiments, the one or more other sensing components 470 can include one or more hardware components for detecting the operational state of the robotic cart 104 or end effector 408 during a surgical operation. It should be appreciated that the one or more other sensing components 470 can include any desirable sensing hardware depending on the surgical procedure to be completed and the particular end effector 408 being manipulated by the robotic cart 104. For instance, in some embodiments, the one or more other sensing components 470 can include one or more pressure sensors for detecting the pressure in the target surgical site and the operating environment of the end effector 408 (e.g., in the target surgical site). In some embodiments, the one or more other sensing components 470 can include one or more force sensors for detecting the force applied to the tissue in the surgical site by the end effector 408.

In some embodiments, the communications controller 480 can be communicatively coupled to the control circuitry 420 via the bus 490. The communications controller 480 can include one or more hardware components capable of transmitting or receiving data with external devices or servers directly or via a network, such as an external network. Accordingly, the communications controller 480 can include a communication transceiver for sending or receiving any wired or wireless communication. For example, the communications controller 480 can include an antenna, a modem, LAN port, Wi-Fi card, WiMax card, mobile communications hardware, near-field communication hardware, satellite communication hardware and/or any wired or wireless hardware for communicating with other networks or devices. In some embodiments, the communications controller 480 can include hardware configured to operate in accordance with the Bluetooth wireless communication protocol and can include a Bluetooth send/receive module for sending and receiving Bluetooth communications.

In some embodiments, the robotic cart 104 can be communicatively coupled to a network, such as an external network. In some embodiments, the external network can include one or more computer networks (e.g., a cloud network, a personal area network, a local area network, grid computing network, wide area network, and the like), cellular networks, satellite networks, or combinations thereof. Accordingly, the robotic cart 104 can be communicatively coupled to the external network via wires, via a wide area network, via a local area network, via a personal area network, via a cellular network, via a satellite network, or the like. Suitable local area networks can include wired Ethernet and/or wireless technologies such as, for example, wireless fidelity (Wi-Fi). Suitable personal area networks can include wireless technologies such as, for example, IrDA, Bluetooth, Wireless USB, Z-Wave, ZigBee, and/or other near field communication protocols. Suitable personal area networks can similarly include wired computer buses such as, for example, USB and FireWire. Suitable cellular networks can include, but are not limited to, technologies such as LTE, WiMAX, UMTS, CDMA, and GSM.

In some embodiments, the communications controller 480 can communicatively couple the robotic cart 104 with the control cart 102, as further discussed below. In some embodiments, the communications controller 480 can enable the transmission of data and other information on the operation of the robot cart 104 to the control cart 102.

Figure 4:
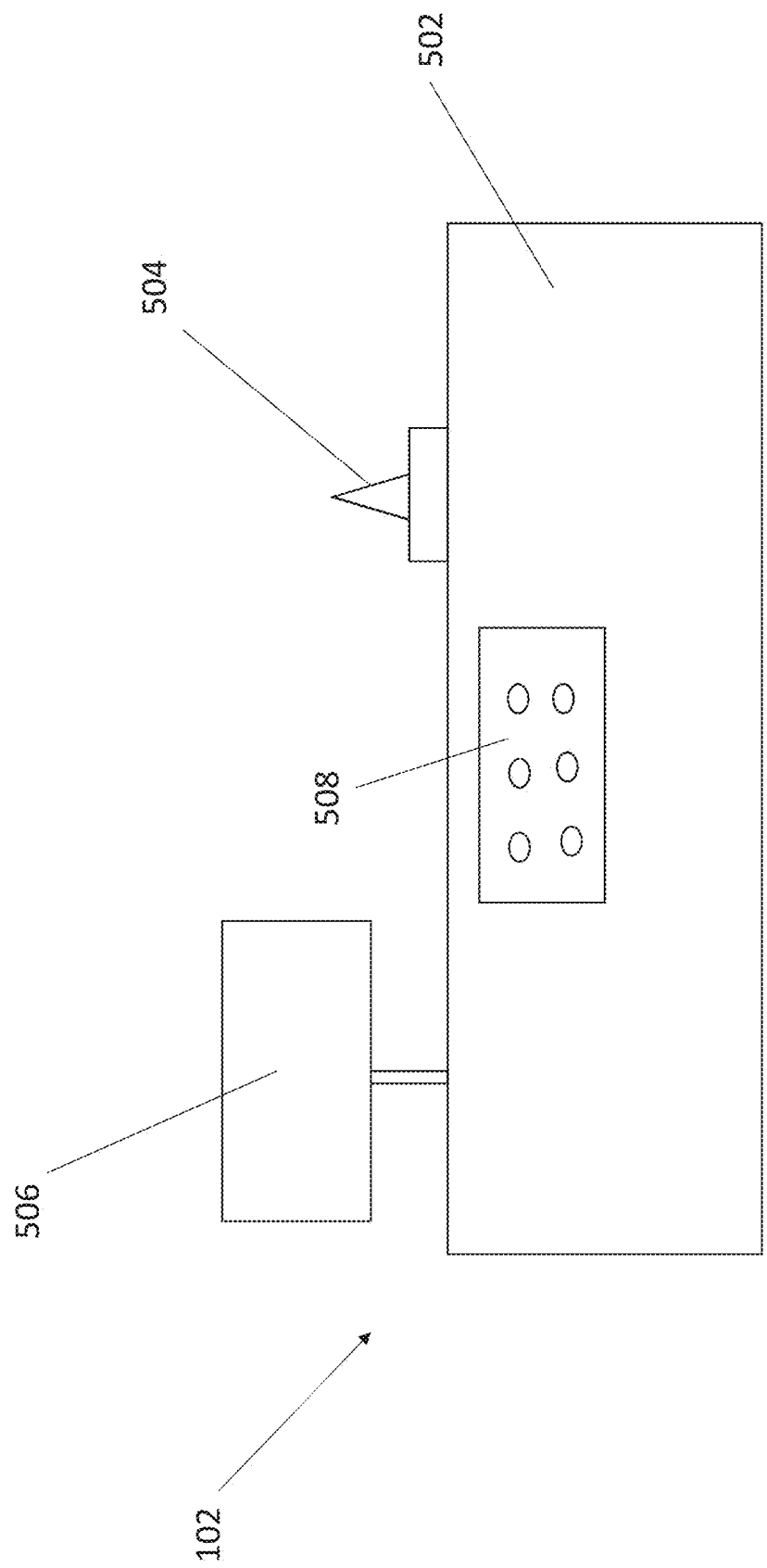
FIG. 4 depicts an illustrative control cart, according to one or more embodiments herein.

Referring now to FIG. 4, the control cart 102 is depicted according to some embodiments. In some embodiments, the control cart 102 can include a platform 502. In some embodiments, the platform 502 can include one or more wheels such that the control cart 102 is easily movable to a desired location in an operating room, hospital, or other setting. The control cart 102 can be positioned remotely from the robotic cart 104.

In some embodiments, the control cart can include an input device 504. The input device 504 can be a joystick, computer mouse, hand-held controller, or any other device for receiving input from the surgeon 200. In some embodiments, the input device 504 can be manipulated by the surgeon 200 to impart motion to the input device 504 or one or more components thereof. As described in greater detail below, actuation of the input device 504 can drive motion of the robotic arm 402. That is, movement or actuation of the input device 504 can be translated to motion of the robotic arm 402 and end effector 408.

In some embodiments, the control cart 102 can include a display 506. The display 506 can display a user interface. The user interface can be an input/output device that presents information to the surgeon 200 and can receive inputs or commands from the surgeon 200. For instance, in some embodiments, the display 506 can be a touch screen or other display that presents one or more icons, drop down menus, fillable text boxes, buttons, and the like that the surgeon 200 can actuate to provide an input. In some embodiments, the input can be information to be processed by the control cart 102 or a command to be executed by the robotic cart 104. As discussed in greater detail below, the user display 506 can display imaging data generated by the robotic cart 104, such as real-time video of the end effector 408 and target surgical site. As discussed in greater detail below, the display 506 can display one or more additional presentation elements on top of, next to, or corresponding to the displayed imaging data.

In some embodiments, the control cart 102 can include a control panel 508. In some embodiments, the control panel 508 can be used to adjust one or more settings related to the input device 504 or the display 506. In some embodiments, the control panel 508 can include one or more buttons, switches, dials, pedals, or other actuators for adjusting a setting of the input device 504 or the display 506. For instance, in some embodiments, the control panel 508 can be used to adjust a sensitivity of the input device 504. As another example, the control panel 508 can be used to adjust a brightness or other display setting of the display 506, to toggle through information displayed on or to select certain information for display on the display 506, and the like. In some embodiments, the control panel 508 can be used to control one or more components of the robotic cart 104. In some embodiments, the control panel 508 can include one or more buttons, switches, dials, pedals, or other actuators for controlling one or more components of the robotic cart 104. For instance, actuation of a certain actuator of the control panel 508 can generate an instruction for the robotic cart 104 to actuate the end effector 208 (e.g., fire a laser or change an end effector setting, such as ablation energy). It should be appreciated that, in some embodiments, any and all of the functionality of the control panel 508 can be housed within the display 506, such that displayed icons and the like on the user display 506 can take the place of actuators on the control panel 508.

Figure 5A:
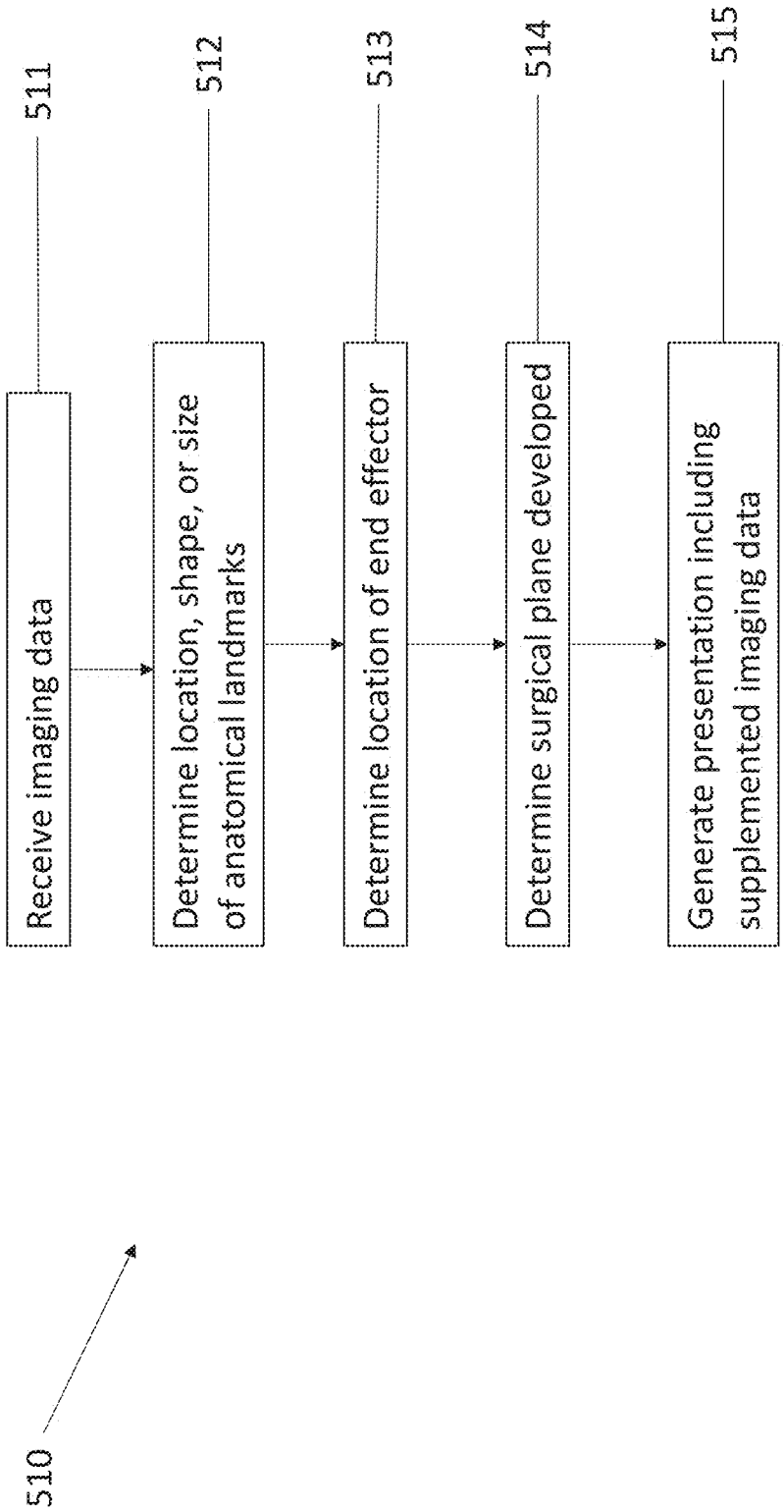
FIG. 5A depicts an illustrative embodiment for generating a presentation on a user display, according to one or more embodiments herein.

Referring now to FIG. 5A, a method 510 that can generally be carried out by the system 100, and in some embodiments by the control cart 102, is depicted. The method 510 can generally include the steps depicted in FIG. 5A. However, the method 510 can, also, include additional or fewer steps, as discussed in more detail. Details on the method 510 are discussed in greater detail below. Generally, at a step 511 of the method 510, the system 100 can receive imaging data of general anatomy or patient specific anatomy related to the surgical site. The surgical site can include, for instance, a prostate. In some embodiments, before active treatment of the surgical site begins (e.g., enucleation of a prostate), a surgeon can navigate one or more image sensors through the surgical site to gather imaging data on the entire surgical site. For instance, as discussed in greater detail below, before enucleation of the prostate begins, the surgeon can navigate one or more image sensors through the urethra do identify anatomical landmarks in the surgical site, such as the external urethral sphincter or the bladder neck. In some embodiments, before enucleation begins, the surgeon can navigate the one or more image sensors through the surgical site to gather image data on the depth, contours, and shape of tissues in the surgical site.

At a step 512 of the method 510, the system 100 can determine a location of anatomical landmarks associated with the surgical site. In some embodiments, the system 100 can determine and present the shape, size, or both of anatomical landmarks instead of or in addition to the location of anatomical landmarks. The anatomical landmarks can be portions of the surgical site that are viable or useful markers for the surgeon to perform the desired surgery. For instance, the anatomical landmarks can be anchor points that the surgeon can use to orient themselves and the end effector 408 in the surgical site. In some embodiments, the surgical procedure can proceed from one anatomical landmark to another anatomical landmark (e.g., the end effector should be navigated from one anatomical landmark to another anatomical landmark). In some embodiments, the surgical site can include the prostate and anatomical landmarks identified in the imaging data can include, but not be limited to, the Verumontanum, the bladder neck, the ureteric orifices, the external urethral sphincter, the bladder wall, ejaculatory ducts, bladder neck fibers, prostatic blood vessels, prostatic capsule, stones, tumors, or diverticuli.

At a step 513 of the method 500, the system 100 can determine a location of the end effector 408. In some embodiments, the system 100 can determine a location of the end effector in the surgical site relative the one or more identified anatomical landmarks. In some embodiments, the surgeon can utilize the relative location of the end effector 408 to the one or more anatomical landmarks to determine where the end effector 408 should be moved or actuated in the surgical site.

Figure 5B:
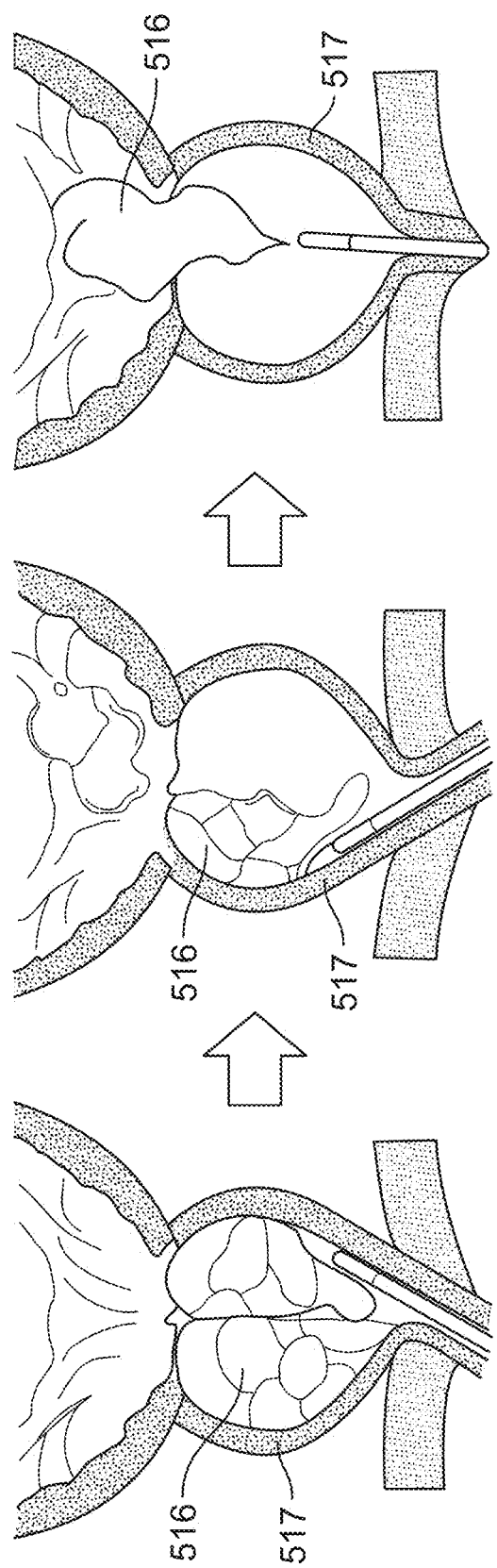
FIG. 5B depicts an enucleated prostate, according to one or more embodiments herein.

At a step 514 of the method 500, the system 100 can determine the surgical plane developed by the end effector 408 during the surgical procedure. Referring briefly to FIG. 5B, in HoLEP, during enucleation, the enlarged prostate tissue within the prostatic capsule can be removed from the capsule wall. More specifically, during enucleation, a laser, for instance, can be used to cut the enlarged prostate tissue 516 from the prostatic capsule 517 around the entire surface of the capsule. The plane that is cut along (e.g., where the laser of the end effector 408 is fired) can be described as the "surgical plane" during enucleation. The surgeon can target removing the entirety of the enlarged prostate tissue 516 from the prostatic capsule 517 (e.g., leaving no enlarged prostate tissue connected to the capsule) while leaving the capsule intact (e.g., not puncturing, cutting, or piercing the capsule). Therefore, the surgical plane can be, in some embodiments, the boundary between the enlarged prostate tissue and the prostatic capsule.

At a step 515 of the method 510, the system can generate a presentation for the user. The presentation can include imaging data, which can be real-time imaging data, received in step 511. The presentation can include one or more additional presentation elements that supplement or annotate the real-time imaging data. For instance, the one or more additional presentation elements can include labels for the anatomical landmarks in the imaging data. In some embodiments, the presentation may comprise a combination image of the imaging data received in step 511 together with anatomical landmarks determined in step 512. In some embodiments the one or more additional presentation elements include a global map of the surgical site the surgeon can view in conjunction with imaging data. In some embodiments, at least one of the imaging data displayed to the surgeon or the global map displayed to the surgeon can include labels for all anatomical landmarks in the surgical site or a subset of anatomical landmarks in the vicinity of the end effector 408. In some embodiments, at least one of the imaging data displayed to the surgeon or the global map displayed to the surgeon can include labels or other indications for the location of the end effector in the surgical site (including relative the labeled anatomical landmarks and the surgical plane). In some embodiments, at least one of the imaging data displayed to the surgeon or the global map displayed to the surgeon can include labels showing the surgical plane developed up to a current point in the surgery. The surgeon can analyze the presentation, including indications of the locations, shapes, or sizes of the anatomical landmarks, location of the end effector, and location of developed surgical plane relative to one another, and determine a next step (e.g., a next place to move the end effector 408 to continue the surgical plane) in the surgery to perform.

Figure 6:
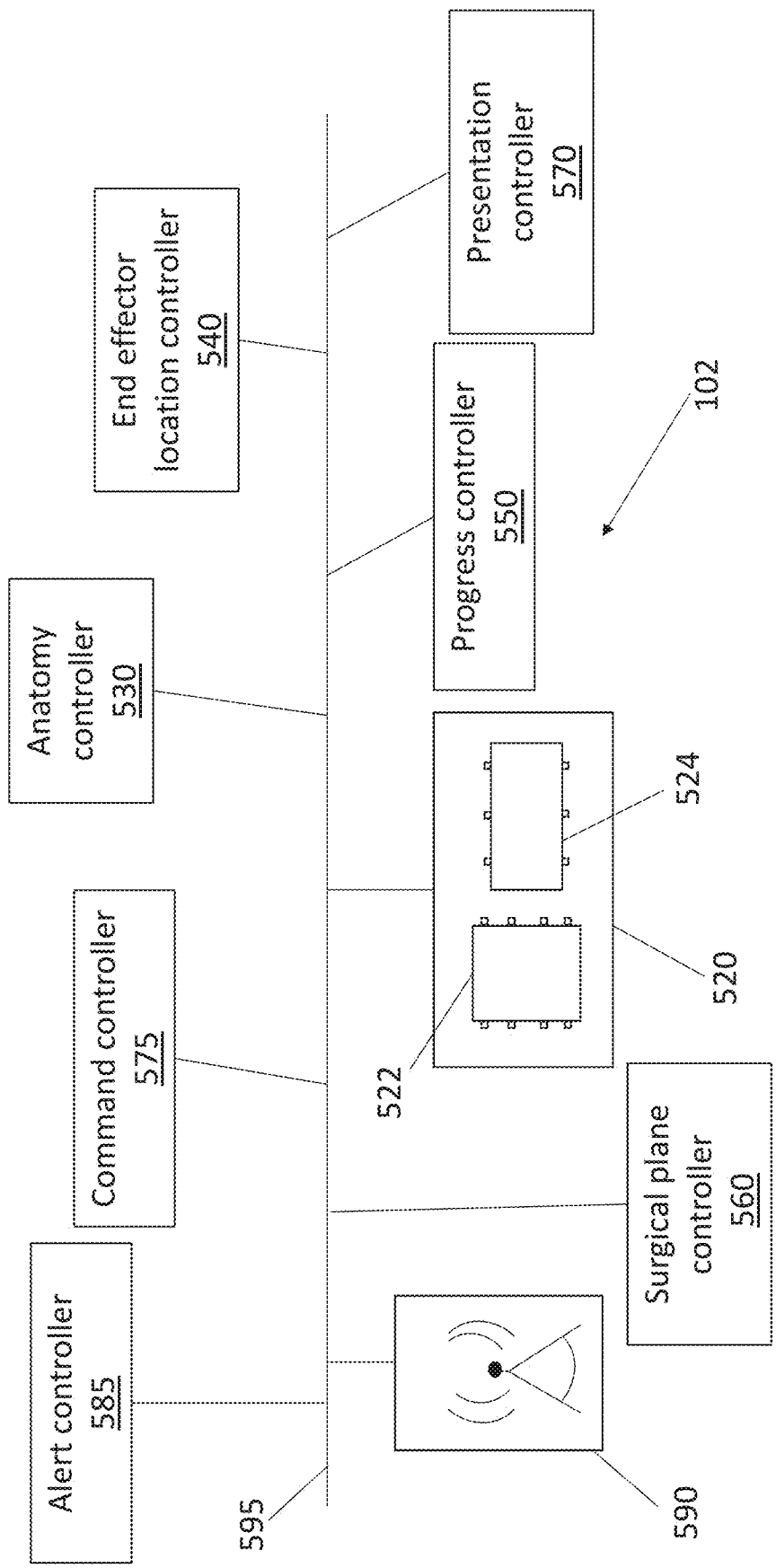
FIG. 6 depicts illustrative internal components and controllers of the control cart, according to one or more embodiments herein.

Referring now to FIG. 6, internal hardware components of the control cart 102, according to some embodiments, are depicted. The control cart 102 can include control circuitry 520 including a processor 522 and a memory module 524. In some embodiments, the control circuitry 520 can be an electronic control unit. In some embodiments, the control cart 102 can include an anatomy controller 530, an end effector location controller 540, a progress controller 550, a surgical plane controller 560, a presentation controller 570, an alert controller 585, a communications controller 590, and a command controller 575. The control circuitry 520 and the various controllers can be communicatively coupled to one another via a bus 595. The control cart 102 can be coupled to a power supply for supplying power to the control circuitry 520 and various controllers.

The processor 522 can include any processing component(s) configured to receive and execute instructions. In some embodiments, the instructions can be in the form of one or more processor-readable instructions or instruction sets stored in the memory module 524. In some embodiments, the processor 522 can be an electric controller, an integrated circuit, a microchip, a computer, or any other computing device. In some embodiments, the processor 522 is communicatively coupled to the other modules of the control cart 102 via the bus 595. In some embodiments, the bus 595 can communicatively couple any number of processors 522 with one another, and allow the components and modules coupled to the bus 595 to operate in a distributed computing environment. In some embodiments, each controller or component of the control cart 102 can operate as a node that can send and/or receive data. In some embodiments, the control cart 102 can include more than one processor 522.

As noted above, in some embodiments, the control circuitry 520 includes the memory module 524. The memory module 524 can be communicatively coupled to the one or more processors 522. In some embodiments, the memory module 524 can include RAM, ROM, flash memories, hard drives, or any device capable of storing processor-readable instructions such that the processor-readable instructions can be accessed and executed by the one or more processors 522. The processor-readable instructions can include logic or algorithm(s) written in any programming language of any generation (e.g., 1GL, 2GL, 3GL, 4GL, or 5GL) such as, for example, machine language that can be directly executed by the processor 522, or assembly language, object-oriented programming (OOP), scripting languages, microcode, and the like, that can be compiled or assembled into processor-readable instructions and stored on the memory module 522. In some embodiments, the processor-readable instructions can be written in a hardware description language (HDL), such as logic implemented via either a field-programmable gate array (FPGA) configuration or an application-specific integrated circuit (ASIC), or their equivalents. Accordingly, the methods described herein can be implemented in any conventional computer programming language, as pre-programmed hardware elements, or as a combination of hardware and software components.

In some embodiments, the bus 595 can be formed from any medium that is capable of transmitting a signal such as, for example, conductive wires, conductive traces, optical waveguides, or the like. In some embodiments, the bus 595 can be formed from a combination of mediums capable of transmitting signals. The bus 595 communicatively couples the various components and controllers of the control cart 102, such as those depicted in FIG. 6.

In some embodiments, the communications controller 590 can be communicatively coupled to the control circuitry 520 via the bus 590. The communications controller 590 can include one or more hardware components capable of transmitting or receiving data with external devices or servers directly or via a network, such as an external network. Accordingly, the communications controller 590 can include a communication transceiver for sending or receiving any wired or wireless communication. For example, the communications controller 590 can include an antenna, a modem, LAN port, Wi-Fi card, WiMax card, mobile communications hardware, near-field communication hardware, satellite communication hardware and/or any wired or wireless hardware for communicating with other networks or devices. In some embodiments, the communications controller 590 can include hardware configured to operate in accordance with the Bluetooth wireless communication protocol and can include a Bluetooth send/receive module for sending and receiving Bluetooth communications.

In some embodiments, the control cart 102 can be communicatively coupled to a network, such as an external network. In some embodiments, the external network can include one or more computer networks (e.g., a cloud network, a personal area network, a local area network, grid computing network, wide area network, and the like), cellular networks, satellite networks, or combinations thereof. Accordingly, the control cart 102 can be communicatively coupled to the external network via wires, via a wide area network, via a local area network, via a personal area network, via a cellular network, via a satellite network, or the like. Suitable local area networks can include wired Ethernet and/or wireless technologies such as, for example, wireless fidelity (Wi-Fi). Suitable personal area networks can include wireless technologies such as, for example, IrDA, Bluetooth, Wireless USB, Z-Wave, ZigBee, and/or other near field communication protocols. Suitable personal area networks can similarly include wired computer buses such as, for example, USB and FireWire. Suitable cellular networks can include, but are not limited to, technologies such as LTE, WiMAX, UMTS, CDMA, and GSM.

In some embodiments, the communications controller 590 can communicatively couple the control cart 102 with the robotic cart 104, as further discussed below. In some embodiments, the communications controller 590 can enable the reception of data and other information on the operation of the robot cart 104 generated by the robot cart 104, as discussed above, at the control cart 102, as discussed in greater detail below. In some embodiments, the communications controller 590 can enable the transmission of instructions from the control cart 102 to the robotic cart 104, which can then be executed by the robot cart 104, as discussed in greater detail below.

In some embodiments, the control cart 102 is configured to receive the imaging data generated by the imaging controller 450 from the robotic cart 104. In some embodiments, the anatomy controller 530 can be configured to receive the imaging data from the robotic cart 104 and identify one or more anatomical landmarks in the target surgical site. In some embodiments, the anatomy controller 530 can be configured to receive the imaging data from the robotic cart 104 and identify a boundary between two or more different tissue types. For instance, in some embodiments, the anatomy controller 530 can include one or more item recognition algorithms to differentiate between tissue types, tissue formations, anatomical landmarks, and the like. Any known or yet-to-be-developed item recognition algorithm can be used to extract the anatomical landmarks or tissue boundaries from the imaging data from the robotic cart 104. Example item recognition algorithms include, but are not limited to, scale-invariant feature transform ("SIFT"), speeded up robust features ("SURF"), and edge-detection algorithms. In some embodiments, the anatomy controller 530 can be informed by surgeon input, computer vision, imaging systems, or machine learning that can aid in determination of the position of anatomical landmarks or tissue boundaries. In some embodiments, the anatomy controller 530 can be trained on a database of imaging data from a plurality of completed surgical procedures of a relevant type. For instance, the anatomy controller 530 can be trained on a database of imaging data from a plurality of completed HoLEP procedures. In some embodiments, the anatomy controller 530 can identify anatomical landmarks and tissue boundaries relevant to HoLEP (e.g., in a patient's prostate). In some embodiments, the anatomy controller 530 can identify landmarks including, but not limited to, the Verumontanum, the bladder neck, the ureteric orifices, the external urethral sphincter, the bladder wall, ejaculatory ducts, bladder neck fibers, prostatic blood vessels, prostatic capsule, stones, tumors, and diverticuli. As another example, the anatomy controller 530 can identify a boundary between the prostatic capsule and the prostate tissue contained within (which in the case of HoLEP can be enlarged tissue (e.g., an adenoma)).

In some embodiments, the anatomy controller 530 is configured to identify anatomical landmarks and tissue boundaries in real-time from the imaging data, which can be real-time imaging data, received from the robotic cart 104. In some embodiments, the anatomy controller 530 is configured to identify anatomical landmarks and tissue boundaries for each frame of image sensor data (e.g., identify anatomical landmarks and tissue boundaries for each point in time during the surgical procedure). In some embodiments, the memory module 524 can include anatomy instructions executable by the processor 522. Upon executing the anatomy instructions, the processor 522 can instruct the anatomy controller 530 to analyze imaging data received from the robotic cart 104 to identify anatomical landmarks and tissue boundaries in the imaging data. The anatomy controller 530 can provide the gathered anatomical identification data to the processor 522 or one or more other controllers of the control cart 102.

In some embodiments, the anatomy controller 530 can generate a map of the surgical site. The map of the surgical site can be a graphical representation of the surgical site outside of the field of view represented in the imaging data received from the robotic cart 104 with the end effector 408 at its current location. In some embodiments, the map of the surgical site can be a graphical representation of all locations the end effector 408 has been from a start of a procedure (e.g., based on all previously gathered imaging data during the procedure). In some embodiments, the map can be generated based on imaging data previously received from the robot cart 104 (e.g., imaging data gathered at previous locations of the end effector 408). In some embodiments, the map can be based on image data collected before active treatment of the surgical site begins (e.g., enucleation of a prostate). In some embodiments, the map can show the contours, shape, size, location, etc. of the tissue in the surgical site. In some embodiments, the map of the surgical site can be a point cloud. The point cloud can generally comprise a discrete set of data points, each having a set of Cartesian coordinates, which together create a three-dimensional representation of a surface (e.g., showing its depth, contours, etc.). For instance, by tracking the depth of various tissue points in front of the end effector 408 or imaging sensors as they are moved through the surgical site, a point cloud showing the contours and shape of the tissue in the surgical site can be developed.

In some embodiments, the control cart 102 is configured to receive the end effector 408 location data generated by the location controller 460 from the robotic cart 104. In some embodiments, the end effector location controller 540 can be configured to receive the end effector 408 location data from the robotic cart 104 and determine the relative location (e.g., position and orientation) of the end effector 408 with respect to the anatomical landmarks or tissue boundaries identified in the imaging data by the anatomy controller 530. In some embodiments, the end effector location controller 540 can be configured to determine the depth of the positioning of the end effector 408 (e.g., in the prostate). That is, based on the end effector 408 location data, the end effector location controller 540 can determine the depth of positioning of the end effector 408 in the 2D imaging data received from the robotic cart 104.

In some embodiments, the memory module 524 can include end effector 408 location instructions executable by the processor 522. Upon executing the end effector 408 location instructions, the processor 522 can instruct the end effector location controller 540 to analyze the end effector 408 location data received from the robotic cart 104 and the identified anatomical landmarks or tissue boundaries in the imaging data to determine the relative location (including relative position and orientation) of the end effector 408 with respect to the anatomical landmarks or tissue boundaries or determine the depth of the positioning of the end effector 408. The end effector location controller 540 can provide the gathered end effector location data to the processor 522 or one or more other controllers of the control cart 102.

In some embodiments, the control cart 102 is configured to receive data on end effector 408 actuation from the robotic cart 104. The data on end effector 408 actuation can be stamped with a respective time of actuation and location of the end effector 408 during actuation. Therefore, the control cart 102 can be configured to receive data on a time and location of prior end effector 408 actuations. In some embodiments, the surgical plane controller 560 can be configured to receive data on end effector 408 actuation from the robotic cart 104. In some embodiments, for instance, the data on end effector 408 actuation can be a time and location of prior laser firings from the end effector 408. In some embodiments, the surgical plane controller 560 can be configured to receive the end effector location data generated by the end effector location module 540. Therefore, each actuation of the end effector 408 can be stamped or associated with its respective time of actuation, location of end effector 408 at actuation, or more specifically, the relative position and orientation of the end effector 408 with respect to the anatomical landmarks or tissue boundaries identified in the imaging data by the anatomy controller 530 at actuation. In some embodiments, the surgical plane controller 560 can track a sequence of actuations of the end effector 408 relative the anatomical landmarks or tissue boundaries identified in the imaging data by the anatomy controller 530. In some embodiments, the surgical plane controller 560 can be configured to receive the imaging data generated by the imaging controller 450 from the robotic cart 104 or end effector location data generated by the end effector location controller 540 and filter all of the radially extreme points that the end effector has been to from the received data. For instance, in some embodiments the surgical plane controller 560 can determine the radially extreme point the end effector has been to at each pair of polar and azimuthal angles that the end effector has been positioned in in the surgical site. In some embodiments, the end effector location controller 540 can filter all of the radially extreme points that the end effector has been to following an initial navigation through the surgical site to map or tag the surgical site (e.g., the end effector location controller 540 can filter all of the radially extreme points that the end effector has been to once active treatment of the surgical site begins).

In some embodiments, the end effector 408 actuations can be firings of a laser of the end effector 408 during prostate enucleation during HoLEP. The end effector 408 actuations can form the active treatment of the surgical site. During enucleation, the enlarged prostate tissue within the prostatic capsule can be removed from the capsule wall. More specifically, during enucleation, a laser can be used to cut the enlarged prostate tissue from the prostatic capsule around the entire surface of the capsule. The plane that is cut along (e.g., where the laser of the end effector 408 is fired) can be described as the "surgical plane" during enucleation. The surgeon can target removing the entirety of the enlarged prostate tissue from the prostatic capsule (e.g., leaving no enlarged prostate tissue connected to the capsule) while leaving the capsule intact (e.g., not puncturing, cutting, or piercing the capsule). Therefore, the surgical plane should be the boundary between the enlarged prostate tissue and the prostatic capsule.

In some embodiments, the surgical plane controller 560 can track the surgical plane developed by the end effector 408. For instance, in some embodiments, by tracking a sequence of actuations of the end effector 408 relative the anatomical landmarks or tissue boundaries identified in the imaging data by the anatomy controller 530, the surgical plane controller 560 can track the surgical plane developed by the sequence of previous actuations of the end effector 408. In some embodiments, the surgical plane controller 560 can identify and track the surgical plane developed by the radially extreme points that the end effector has been to. That is, each radially extreme point the end effector has been positioned at (and particularly, in some embodiments, after active treatment has begun) can be determined as a point in the developed surgical plane. In some embodiments, the surgical plane controller 560 can track a sequence of radially extreme points that the end effector has been to relative the anatomical landmarks or tissue boundaries identified by the anatomy controller 530. In some embodiments, based on the tracked surgical plane that was previously developed and the location of the end effector 408 relative the anatomical landmarks or tissue boundaries identified in the imaging data by the anatomy controller 530, the surgical plane controller 560 can determine or predict the location for the surgical plane to be continued or developed with subsequent actuation of the end effector 408. For instance, the prostate may have an asymmetrical curvature (e.g., non-circular shape) which the surgical plane should track. Based on the tracked development of the surgical plane and the location of the end effector 408 (particularly at the immediately preceding actuation in the surgical plane development or the immediately preceding radially extreme point (which can be equated as a point of actuation)) relative the anatomical landmarks or tissue boundaries identified in the imaging data by the anatomy controller 530 (e.g., the Verumontanum, the bladder neck, the ureteric orifices, the external urethral sphincter), the surgical plane controller 560 can determine or predict the location for the surgical plane to be developed to track a predicted or determined curvature of the prostate. In some embodiments, the surgical plane controller 560 is configured to track the developed surgical plane (and in some embodiments this information can be presented to the user) but is not configured to determine or predict the location for the surgical plane to be developed. In some embodiments, the surgical plane controller 560 is configured to track the developed surgical plane (and in some embodiments this information can be presented to the user) but is not configured to determine or predict the curvature of the prostate. In such embodiments, the surgeon can analyze, on a user display, the surgical plane developed and the anatomical landmarks in the surgical site to determine a curvature of the prostate, and therefore where the end effector 408 should be moved to in order to continue development of the surgical plane, as discussed further below.

In some embodiments, the memory module 524 can include surgical plane instructions executable by the processor 522. In some embodiments, upon executing the surgical plane instructions, the processor 522 can instruct the surgical plane controller 560 to track a sequence of actuations of the end effector 408 relative the anatomical landmarks or tissue boundaries identified in the imaging data by the anatomy controller 530 to track the surgical plane developed by the sequence of previous actuations of the end effector 408. In some embodiments, upon executing the surgical plane instructions, the processor 522 can instruct the surgical plane controller 560 to filter all of the radially extreme points that the end effector has been to from the end effector location data to track the surgical plane developed. In some embodiments, upon executing the surgical plane instructions, the processor 522 can instruct the surgical plane controller 560 to filter all of the radially extreme points that the end effector has been to from the end effector location data and track the radially extreme points relative the anatomical landmarks or tissue boundaries identified in the imaging data by the anatomy controller 530 to track the surgical plane developed. In some embodiments, upon executing the surgical plane instructions, the processor can instruct the surgical plane controller 560 to determine or predict the location for the surgical plane to be continued or developed with subsequent actuation of the end effector 408. The surgical plane controller 560 can provide the data gathered on developed surgical plane or the to be developed surgical plane to the processor 522 or one or more other controllers of the control cart 102.

In some embodiments, the progress controller 550 can be configured to receive at least one of data on a time and location of prior end effector 408 actuations from the robotic cart 104, data on the surgical plane developed by the sequence of previous actuations of the end effector 408 from the surgical plane controller 560, or data on the surgical plane developed determined by the radially extreme points the end effector 408 was positioned at from the surgical plane controller 560, and the end effector location data generated by the end effector location controller 540. Therefore, in some embodiments, the progress controller 550 can receive a subset of end effector position data (e.g., the radially extreme points) that is indicative of the developed surgical plane (e.g., where the end effector was actuated) and a time that the end effector was at each radially extreme point. In some embodiments, the progress controller 550 can receive end effector 408 actuation data stamped or associated with its respective time of actuation and location of end effector 408 at actuation. In some embodiments, the progress controller 550 can receive the relative position and orientation of the end effector 408 with respect to the anatomical landmarks or tissue boundaries identified in the imaging data by the anatomy controller 530 at actuation (determined from either actuation data or the radially extreme points of end effector position). Based on the received data, the progress controller 550 can determine a progress, or percent of completion, in the surgical procedure. For instance, in some embodiments, the progress controller 550 can track the development of a surgical plane in time relative the anatomical landmarks or tissue boundaries to determine a progress in the surgical procedure. The determined progress can be in the entire procedure (e.g., HoLEP procedure) or in a segment of the entire procedure (e.g., enucleation of the prostate tissue). Therefore, in some embodiments, the progress controller 550 can determine a progress made in the enucleation of the prostate. For instance, as the enucleation process typically proceeds from the Verumontanum to the bladder neck, the progress controller 550 can determine the progress of enucleation based on the location of the end effector 408 relative the Verumontanum and the bladder neck when the end effector 408 was last actuated (determined from actuation data or radially extreme position of the end effector) during the development of the surgical plane.

In some embodiments, the memory module 524 can include progress instructions executable by the processor 522. Upon executing the progress instructions, the processor 522 can instruct the progress controller 550 to analyze the end effector actuation data, end effector location data, surgical plane data, or anatomical landmark data to determine a degree of progress of the surgical procedure. The progress controller 550 can provide the data gathered on procedure progress to the processor 522 or one or more other modules of the control cart 102.

In some embodiments, the presentation controller 570 can be configured to receive data from the anatomy controller 530, the end effector location controller 540, the progress controller 550, the surgical plane controller 560, or end effector actuation data from the robotic cart 104. For instance, in some embodiments, the presentation controller 570 can receive anatomical identification data from the anatomy controller 530 and generate one or more presentation elements associated with the anatomical identification data. The presentation elements can be, for example, textual labels or non-textual labels (e.g., arrows, bounding boxes, markers, symbols, etc.) that indicate the particular landmarks and tissue boundaries identified. In some embodiments, the presentation controller 570 can receive end effector 408 location data from the end effector location controller 540 and generate one or more presentation elements associated with the end effector 408 location data. The presentation elements can be for example, numerical labels listing the relative location of the end effector 408 in relation to a landmark, a symbol showing the location of the end effector in the imaging data, and the like, any textual or non-textual label, a label in a global map of the surgical site, etc. In some embodiments, the presentation elements can be, for example, a pocket of real-time imaging data in a wider map of the surgical site. In some embodiments, the presentation controller 570 can receive data on the surgical plane developed or the location for the surgical plane to be continued from the surgical plane controller 560 and generate one or more presentation elements for the developed surgical plane or the location for the surgical plane to be continued. The presentation elements can be, for example, outlines, plots, lines, and the like showing the developed surgical plane and the location for the surgical plane to be continued. In some embodiments, the presentation controller 570 can receive procedure progress data from the progress controller 550 and generate one or more presentation elements for the procedure progress. The presentation elements can be, for example, a numerical indicator, a graphical indicator, or the like showing the progress of the procedure. A presentation element, as used herein, can be any individual feature presented to a user on a user interface during the surgery.

Figure 7:
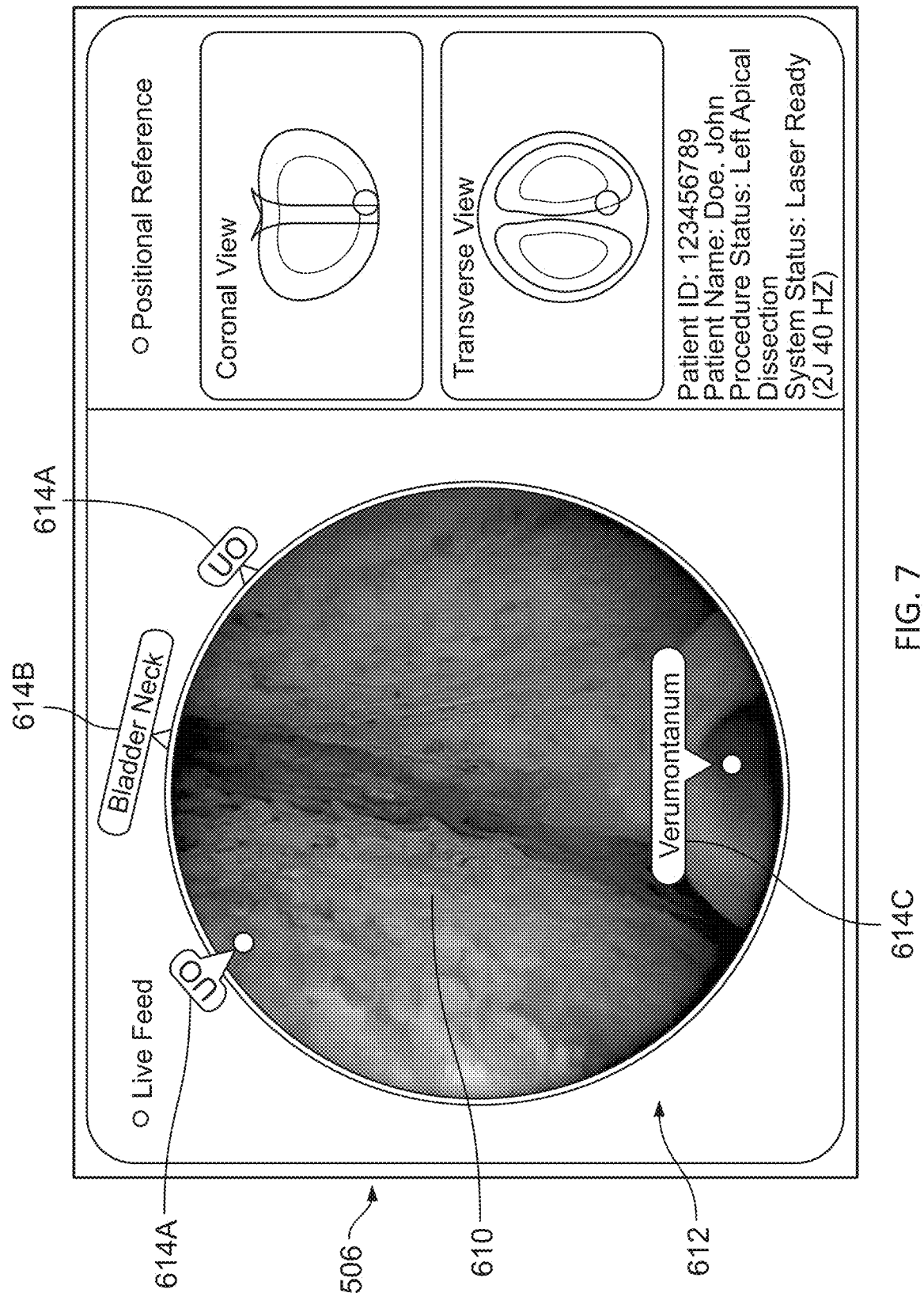
FIG. 7 depicts an illustrative example of a presentation including imaging data, according to one or more embodiments herein.

In some embodiments, the presentation controller 570 can be configured to gather presentation elements to be applied to or with a frame of imaging data or to a global map generated at least partially from received imaging data. For example, as shown in FIG. 7, described in more detail below, a group of presentation elements 614A, 614B, and 614C is gathered to create a presentation 612 on the user interface. In some embodiments, the presentation 612 can be applied on imaging data 610. That is, presentation elements can be applied on imaging data 610. In some embodiments, the presentation 612 can include the imaging data 610. In some embodiments, a group of presentation elements can be associated with a single frame of imaging data (e.g., each presentation element in the group relates, labels, includes, or points to information contained in the single frame of imaging data). The gathered group of presentation elements associated with the frame of imaging data can be described as a presentation. That is, the presentation 612 is composed of the gathered presentation elements. The single frame of imaging data can be real-time imaging, or current, data received from the robotic cart 104. Therefore, the presentation can be generated for and based on real time imaging data received from the robotic cart 104. That is, a first presentation can be generated based on, for, or including imaging data received at a first time, and a second presentation can be generated based on, for, or including imaging data received at a second subsequent time. That is, the presentation controller 570 can continuously generate presentations tailored to incoming real-time imaging data from the robotic cart 104.

In some embodiments, the memory module 524 can include presentation instructions executable by the processor 522. Upon executing the presentation instructions, the processor 522 can instruct the presentation controller 570 to generate a presentation based on, for, or including imaging data, which can be a frame of real-time imaging data. The presentation controller 570 can provide the presentation data generated to the processor 522 or one or more other controllers of the control cart 102. In some embodiments, the presentation controller 570 can automatically generate a presentation based on computer vision, imaging systems, or machine learning, for instance.

In some embodiments, the presentation controller 570 can be configured to receive the imaging data generated by the imaging module 450 of the robotic cart 104. In some embodiments, the presentation controller 570 can be configured to receive the imaging data in real time. In some embodiments, the presentation controller 570 can be configured to display the imaging data in real time. In some embodiments, the presentation controller 570 can be configured to display the imaging data on the display 506. In some embodiments, the presentation controller 570 can display the imaging data simultaneously with the one or more other presentation elements. In some embodiments, the presentation controller 570 can annotate a frame of imaging data with the presentation elements generated based on or for that particular frame of imaging data. The presentation 612 can generally provide more detailed information beyond mere imaging data that can assist the surgeon in interpreting the imaging data, planning next steps in the surgical procedure, and executing the surgical procedure.

Referring to FIG. 7, an example of a presentation 612, including the imaging data 610 (which can be real-time imaging data), on the display 506 is depicted. It should be appreciated that display 506, including the presentation 612, can be continuously updated as new imaging data 610 (e.g., video) is received from the robotic cart 104. The presentation 612 of FIG. 7 includes presentation elements 614A, 614B, and 614C, which each denotes the location of anatomical landmarks, including ureteric orifices, the bladder neck, and the Verumontanum, respectively, in the imaging data 610. The presentation 612 denotes each anatomical landmark with a textual label and symbol pointing to the location of the anatomical landmark in the real-time imaging data 610. In some embodiments, the presentation elements 614A, 614b, and 614C can also denote a shape or size of a respective anatomical landmark. As depicted in FIG. 9F and 9G, discussed in greater detail below, in some embodiments, the presentation 612 can include a presentation element or indication of the surgical plane developed up to the point in time of the frame depicted in the imaging data 610 on the display 506. Therefore, in some embodiments, a plot, line, outline, etc. can be placed over or outside the imaging data 610 showing where the surgical plane has been developed. While not depicted in FIG. 7, in some embodiments, the presentation 612 can include a presentation element or indication for a suggestion for a location for the surgical plane to be developed. Therefore, a plot, line, outline, etc. can be placed over or outside the imaging data 610 showing where the surgical plane is to be developed. While not depicted in FIG. 7, in some embodiments, the presentation 612 can include a presentation element or indication of the location of the end effector 408 during the frame of imaging data 610 displayed on the display 506. For instance, a symbol, textual label, or the like could be placed over or outside the imaging data 610 to denote the location of the end effector 408 in the imaging data. In some embodiments, a symbol, textual label, or the like could be placed in a global map of the surgical site to denote the location of the end effector 408 in the surgical site. In some embodiments, the presentation 612 can include a presentation element comprising a numerical output displayed adjacent to the real-time imaging data 610, generally showing location of the end effector 408, including an orientation of the end effector 408, coordinate location or position of the end effector 408, or distance of the end effector 408 from the denoted anatomical landmarks or tissue boundaries during the frame of imaging data 610 displayed on the display 506. While not depicted in FIG. 7, in some embodiments, the presentation 612 can include a presentation element comprising an indication of a progress of the procedure placed over or next to the real-time imaging data 610. Therefore, a numerical value or graphical representation of the progress of the procedure up to the point in time captured in the frame of imaging data 610 displayed can be presented on the display 506.

In some embodiments, the presentation controller 570 can receive data from any other controller of the control cart 102 to help generate the presentation 612 for or including the imaging data. In some embodiments, the surgeon can interact with the display 506 to add, delete, or change one or more annotations or presentation elements of the presentation 612. In some embodiments, the memory module 524 can include presentation instructions executable by the processor 522. Upon executing the presentation instructions, the processor 522 can instruct the presentation controller 570 to present the real-time imaging data received from the robotic cart 104 and a corresponding presentation 612, including one or more other presentation elements.

Figure 8B:
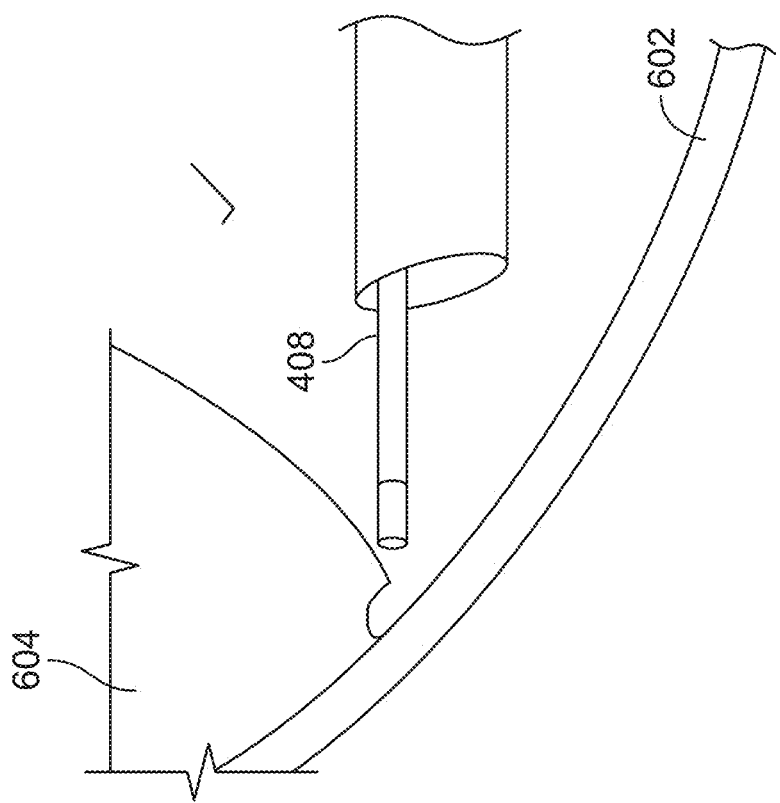
FIGS. 8A and 8B depict an illustrative example of developing a surgical plane with an end effector, according to one or more embodiments herein.
Figure 8A:
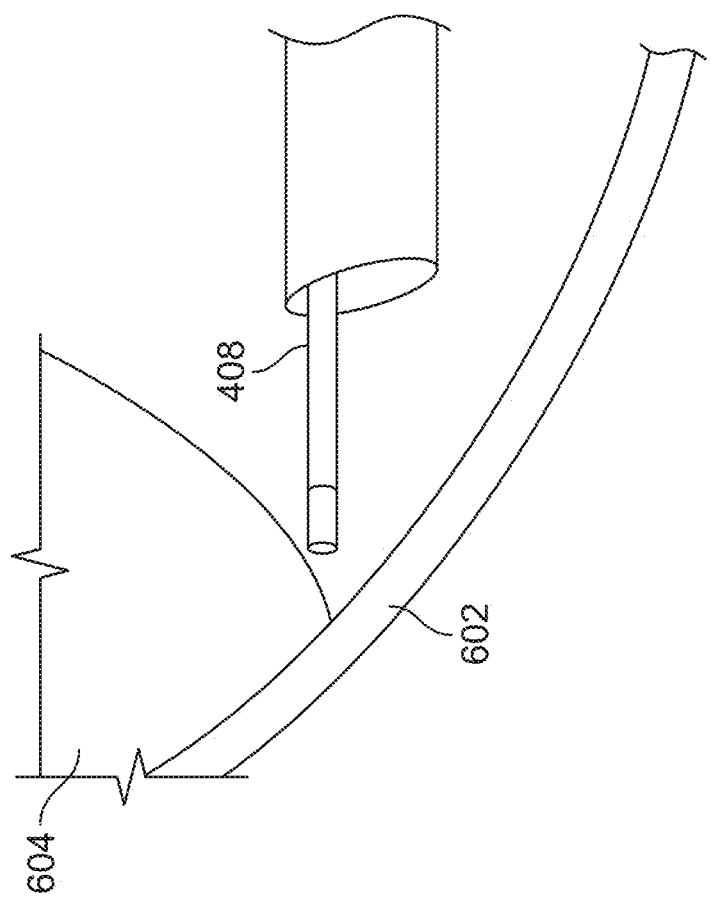

Referring again to FIG. 6, in some embodiments, the command controller 575 can be configured to receive user inputs on the control cart 102 and translate the inputs to commands for transmission to and execution by the robotic cart 104. For instance, the command controller 575 can receive a user input via the input device 504, the display 506, or the control panel 508, and translate such inputs into commands for transmission to the robotic cart 104. Merely as an example, in some embodiments, the surgeon 200 can analyze the presentation 612 on the display 506, including the imaging data, and determine a next action in the surgical procedure to take. For instance, based on the developed surgical plane, the location of anatomical landmarks and tissue boundaries in the target surgical site, and the current location of the end effector relative the anatomical landmarks and tissue boundaries, the surgeon 200 can determine a location for the end effector 408 to continue the development of the surgical plane. Specifically, via control of the input device 504, the surgeon can navigate the end effector 408 to a desired location. Control of the input device 504 can be translated by the command controller 575 as a command for the robotic cart 104 (and specifically the driver controller 430) to drive the robot arm 402 in accordance with the received input such that the end effector 408 is moved in accordance with the received input. With reference to FIG. 8A, the surgeon 200 can navigate the end effector 408 to a location to continue the surgical plane. Particularly, the surgeon 200 can account for the curvature of the prostate to move the end effector 408 to a boundary between the capsule 602 and the adenoma 604 to continue the surgical plane. The surgeon can angle the end effector 408 slightly toward the adenoma 604.

The display 506 can update the presentation 612, including the imaging data, in real time as the surgeon navigates the end effector 408 to the location for continuing the surgical plane. Once the surgeon 200 determines that the end effector 408 is properly located, the surgeon 200 can provide further input. Specifically, via input on the display 506 or control panel 508, the surgeon can actuate the end effector 408 (e.g., fire a laser of the end effector 408). Inputs on the display 506 or control panel 508 can be translated by the command controller 575 as a command for the robotic cart 104 (and specifically the end effector controller 440) to actuate the end effector 408 in accordance with the received input. With reference to FIG. 8B, the end effector 408 is shown developing the surgical plane and removing the adenoma 604 from the capsule 602.

Figure 8D:
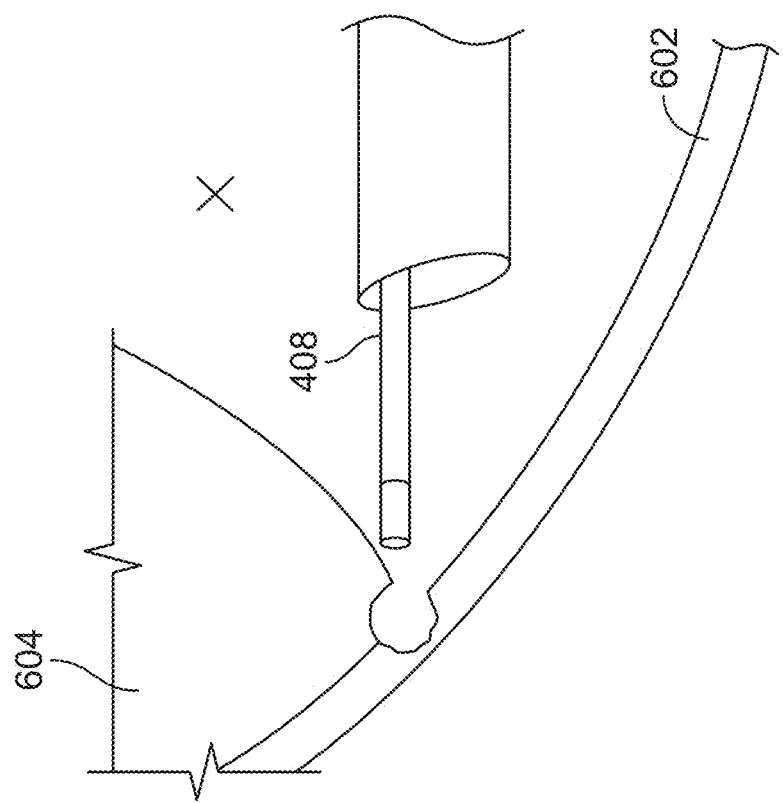
FIGS. 8C and 8D depict an illustrative example of developing a surgical plane with an end effector where a capsule is punctured, according to one or more embodiments herein.
Figure 8C:
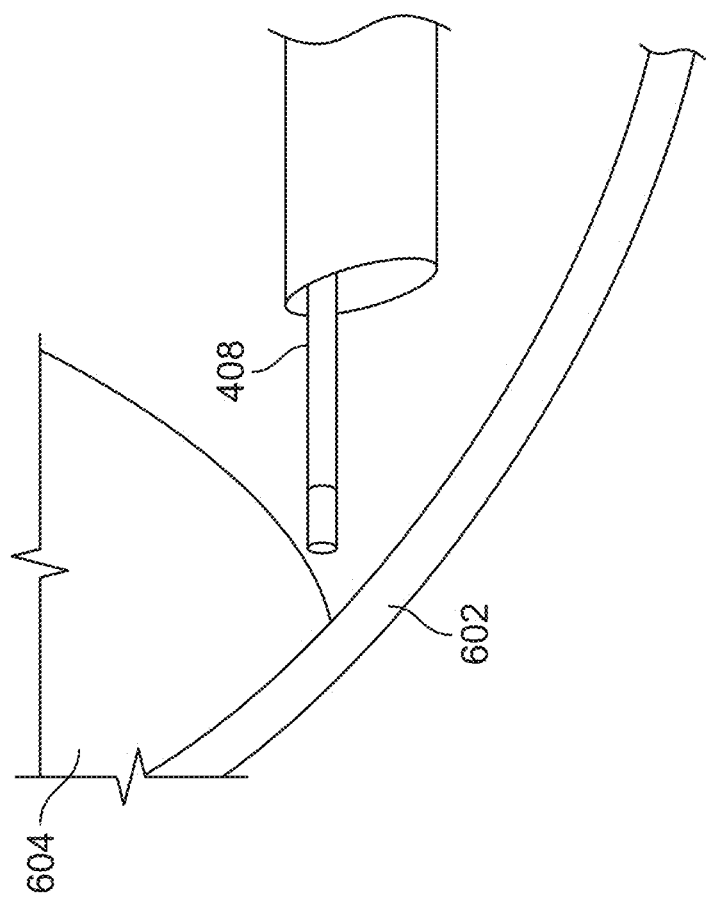

Referring again to FIG. 6, the alert controller 585 can be configured to receive at least one of imaging data from the robotic cart 104, anatomical identification data from the anatomy controller 530, end effector location data from the end effector location controller 540, data gathered on the developed surgical plane from the surgical plane controller 560, data gathered on procedure progress from the progress controller 550, or any other data from any controller of the control cart 102, and analyze the received data to determine if an error in the execution of the surgical procedure was committed. For instance, based on the received data, the alert controller 585 can determine if the surgical plane was developed in an incorrect location. With reference to FIGS. 8C and 8D, in some embodiments, the alert controller 585 can determine if the capsule 602 was mistakenly punctured due to the end effector 408 being actuated (e.g., firing a laser) when the end effector 408 was not at a correct location for developing the surgical plane. In some embodiments, the alert controller 585 can make the determination based on visually detecting a puncture in the capsule 602 from the imaging data and landmark identification data. In some embodiments, the alert controller 585 can infer the capsule 602 was punctured based on data related to the location of the end effector 408 with respect to one or more anatomical landmarks when the end effector 408 was last actuated. If the alert controller 585 detects an error in the surgical procedure was committed, the alert controller 585 can present a visual, audial, or textual alert to the surgeon 200 to notify the surgeon of the error. In some embodiments, the alert can be presented via the display 506.

In some embodiments, the memory module 524 can include alert instructions executable by the processor 522. Upon executing the alert instructions, the processor 522 can instruct the alert controller 585 to determine the presence of an error in the surgical procedure and present an alert if an error is present.

Referring now to FIGS. 9A-9I, examples of presentations 612, including imaging data (which can be real-time imaging data), that can be depicted on the display 506, according to some embodiments, are depicted. As noted above, the display 506 can be a user interface that allows for receiving user commands, instructions, or other interactions with presented imaging data.

Figure 9A:
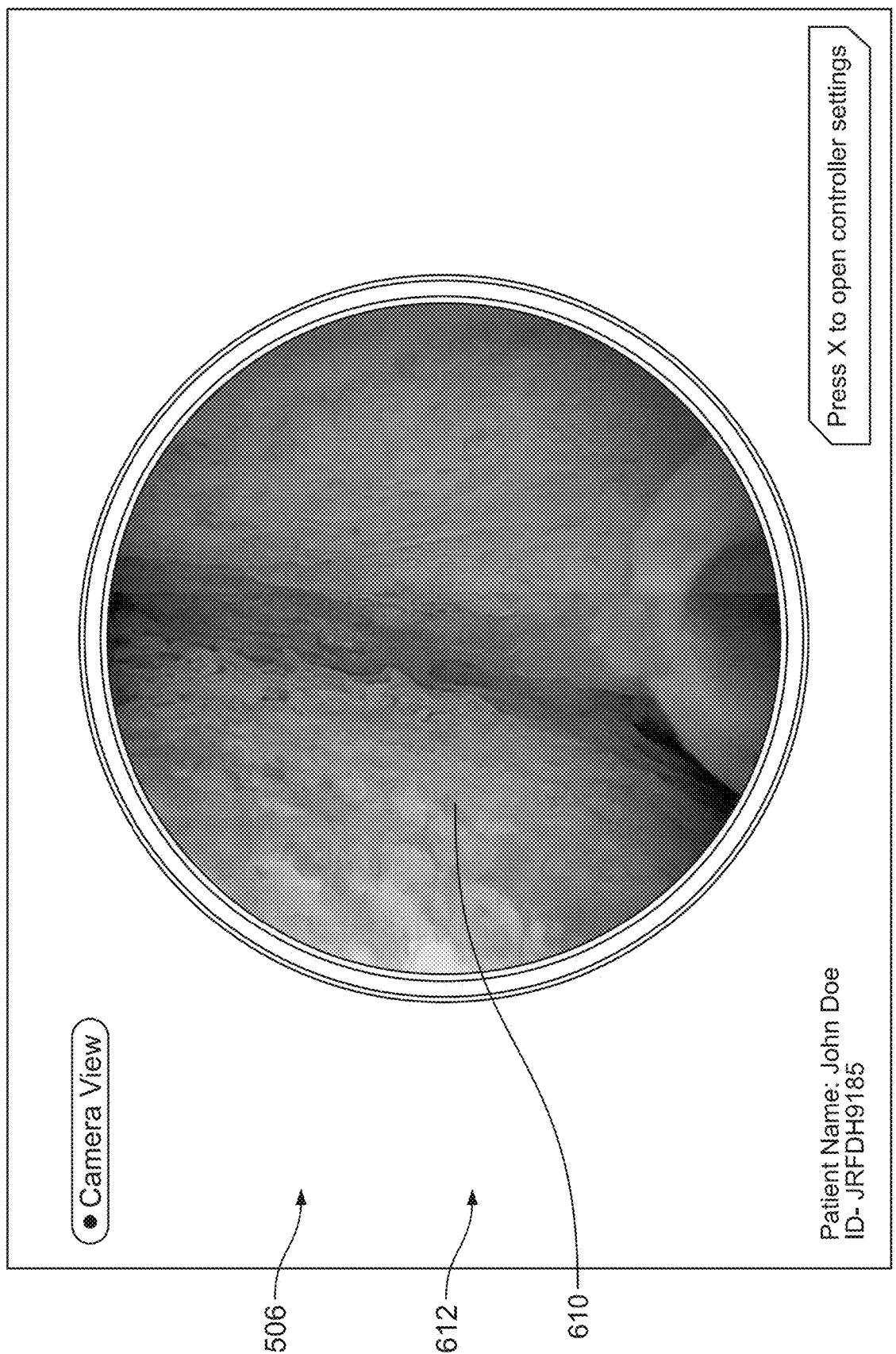
FIG. 9A depicts an intro screen that displays image data from a camera, according to one or more embodiments herein.

Referring specifically to FIG. 9A, in some embodiments, the display 506 can display an intro screen that displays live feed imaging data 610, from the imaging controller 450 for instance. For instance, in some embodiments, the presentation 612 of the display 506 of FIG. 9A can be presented to a user at the beginning of a surgical procedure, when the end effector, endoscope, or other device for generating the imaging data is inserted into the surgical site.

Figure 9B:
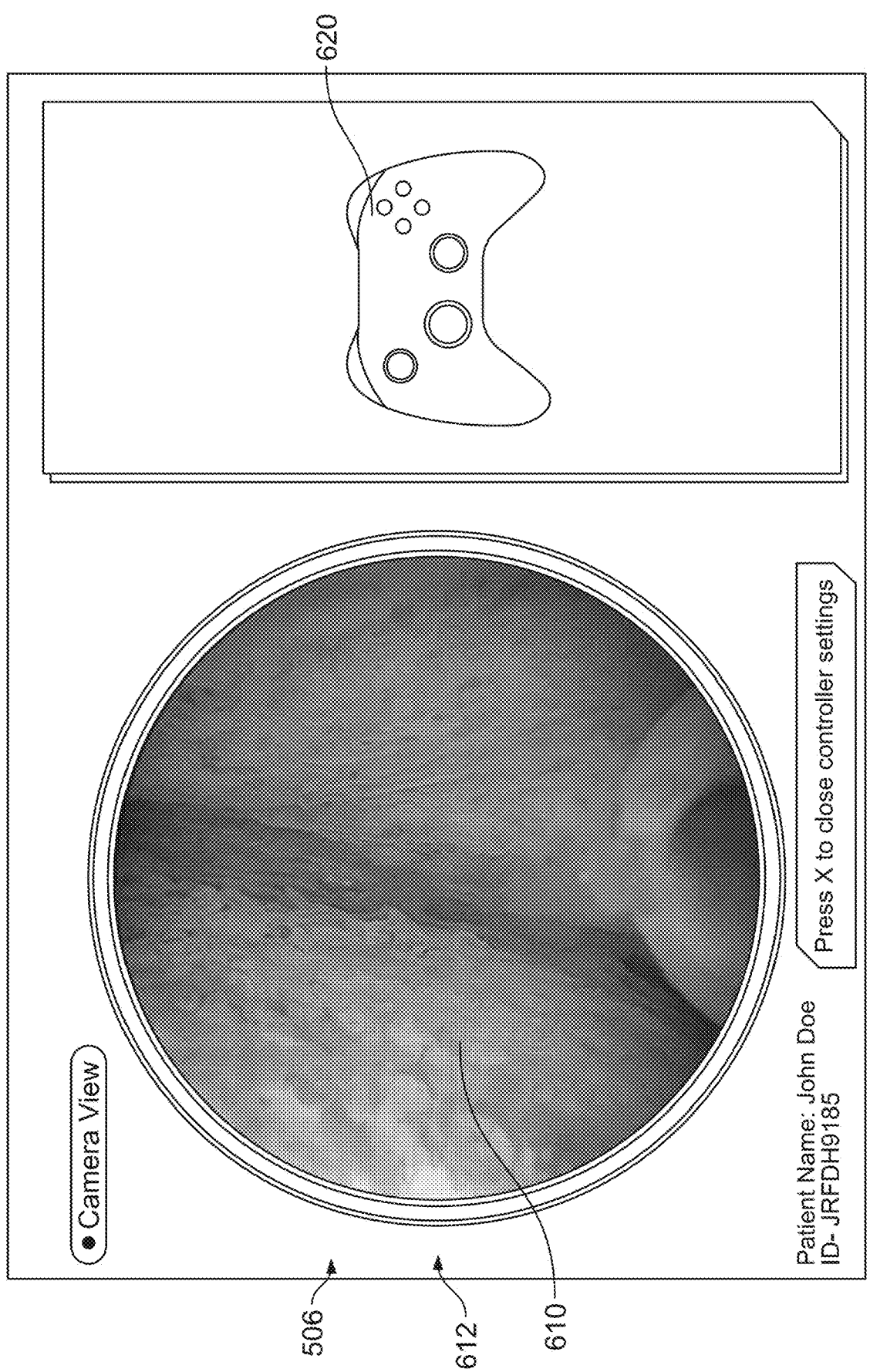
FIG. 9B depicts a controller layout screen, according to one or more embodiments herein.

Referring to FIG. 9B, in some embodiments, the display 506 can present a controller layout screen. For instance, the controller layout screen can include a presentation 612 including the imaging data 610 and a graphic 620 showing the user the layout of the input device 504, control panel 508, or the display 506, and what results from different commands or inputs received on each device. In some embodiments, a user can access the controller layout screen shown in FIG. 9B at any point during a procedure to view the layout and function of the controller buttons.

Figure 9C:
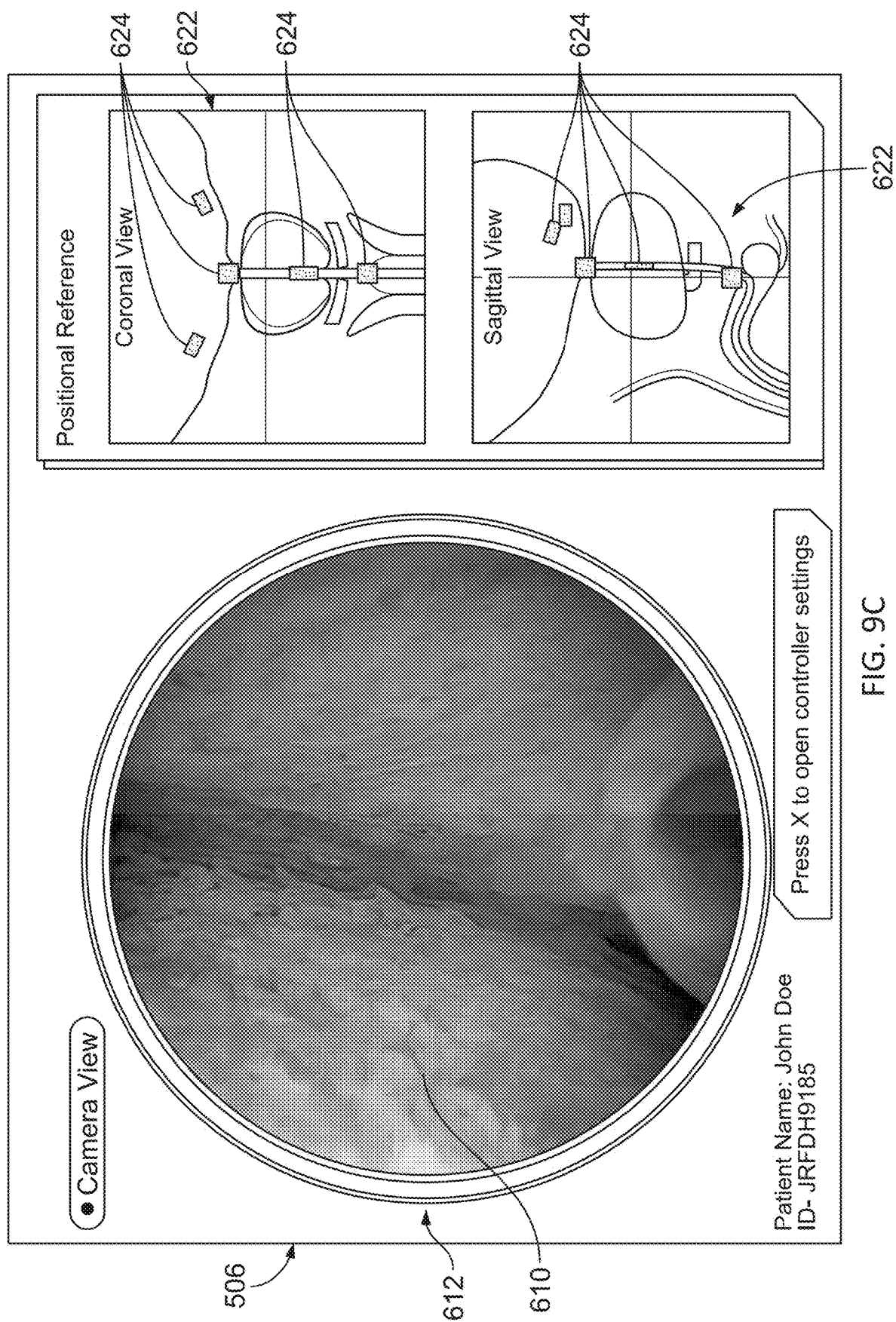
FIG. 9C depicts a pre-tagging screen, according to one or more embodiments herein.

Referring to FIG. 9C, in some embodiments, the display 506 can display a pre-tagging screen presentation 612. The presentation 612 can include the imaging data 610. In some embodiments, the presentation 612 includes one or more global maps 622 of the surgical site (e.g., the prostate and surrounding anatomy). In some embodiments, the presentation 612 includes two or more global maps 622 of the surgical site, each showing the surgical site about a different anatomical plane. In some embodiments, the one or more global maps 622 can be a general approximation of the surgical site for the target population (e.g., the prostate and surrounding anatomy of adult males). In some embodiments, the one or more global maps 622 can include labels, such as markers other indicators, 624 showing the expected location of one or more anatomical landmarks in the surgical site. In some embodiments, the one or more anatomical landmarks can include the Verumontanum, the bladder neck, the ureteric orifices, the external urethral sphincter, the bladder wall, ejaculatory ducts, bladder neck fibers, prostatic blood vessels, prostatic capsule, stones, tumors, or diverticuli. In some embodiments, the markers 624 can be located at the average position of the anatomical landmarks in the target population. In some embodiments, the one or more global maps 622, including the markers 624, are not patient-specific, but are an approximation of the patient's expected anatomy based on data from a target population. In the pre-tagging screen, the markers can be shown in a first characteristic, such as color, brightness, shape, etc.

Figure 9D:
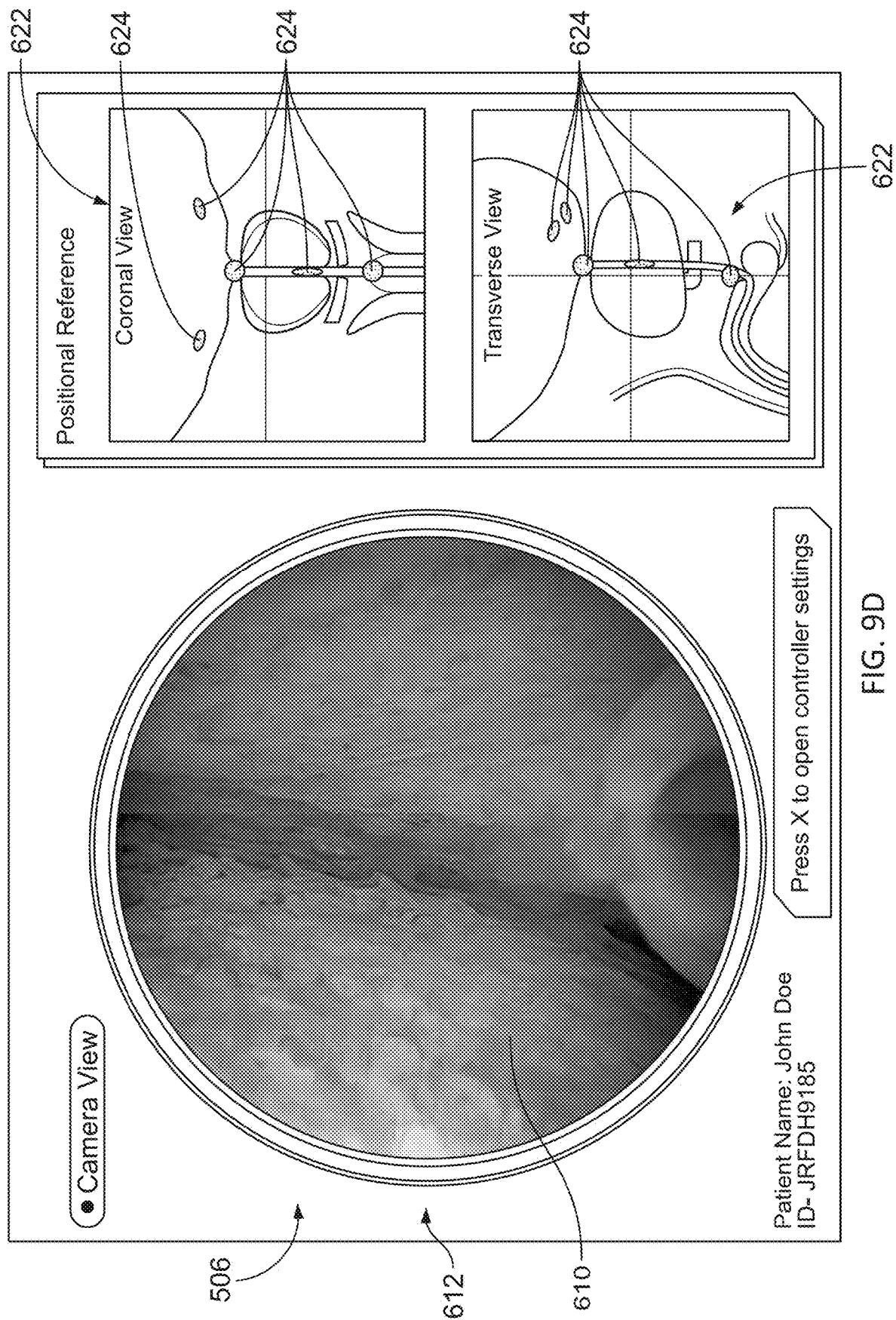
FIG. 9D depicts a post-tagging screen, according to one or more embodiments herein.

Referring to FIG. 9D, in some embodiments, the display 506 can display a post-tagging screen presentation 612. The presentation 612 can include the imaging data 610. In some embodiments, the presentation 612 includes the one or more global maps 622 of the surgical site (e.g., the prostate and surrounding anatomy). In some embodiments, the presentation 612 includes the two or more global maps 622 of the surgical site, each showing the surgical site about a different anatomical plane. Before enucleation begins, during the surgical procedure, the user can navigate the end effector 408, endoscope, or other imaging device through the surgical site to map the surgical site. Mapping the surgical site can include identifying the location of the anatomical landmarks in the patient. In other words, mapping the surgical site can include determining the patient-specific location of the anatomical landmarks. As imaging data 610 is received during the mapping, it can be updated in the presentation 612. As imaging data is received, the anatomy controller 530 can identify the anatomical landmarks in the imaging data. Once a particular anatomical landmark is identified in the imaging data 610, the particular marker 624 denoting the particular anatomical landmark in the global maps 622 can change characteristics. For instance, the particular marker 624 can change colors, brightness, shape, etc. compared to the pre-tagging screen. In some embodiments, after the surgical site is mapped, or the anatomical landmarks are "tagged" (e.g., found or identified in the imaging data 610), the shape or size of the global map 622 or the shape, size, or location of the markers 624 for the tagged anatomical landmarks can be updated such that the global maps 622 reflect the patient-specific anatomy. The tagging or mapping process can take place before active treatment (e.g., enucleation) of the surgical site begins.

Figure 9E:
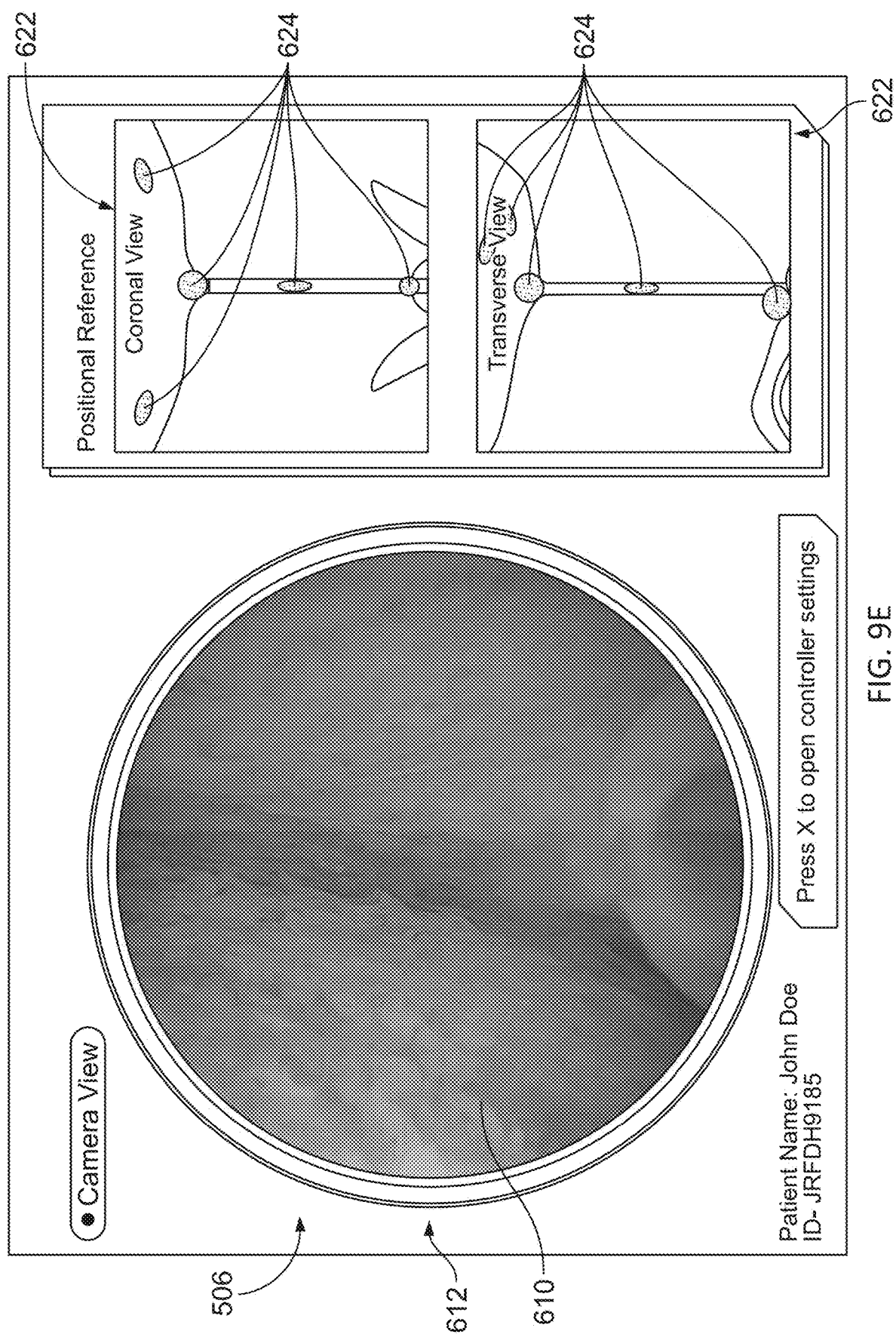
FIG. 9E depicts an enucleation begin screen, according to one or more embodiments herein.
Figure 9F:
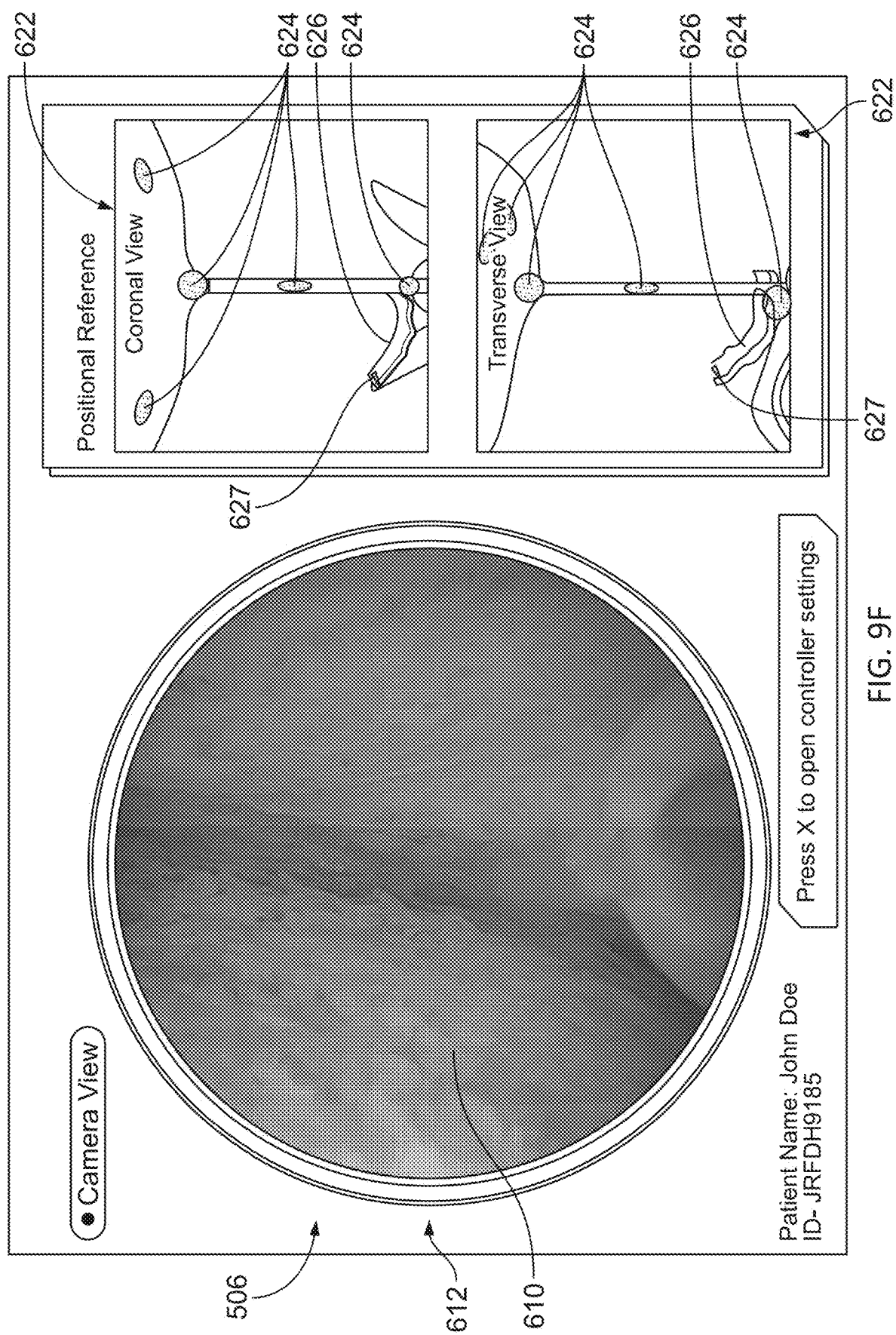
FIG. 9F depicts an enucleation mid-way screen, according to one or more embodiments herein.
Figure 9G:
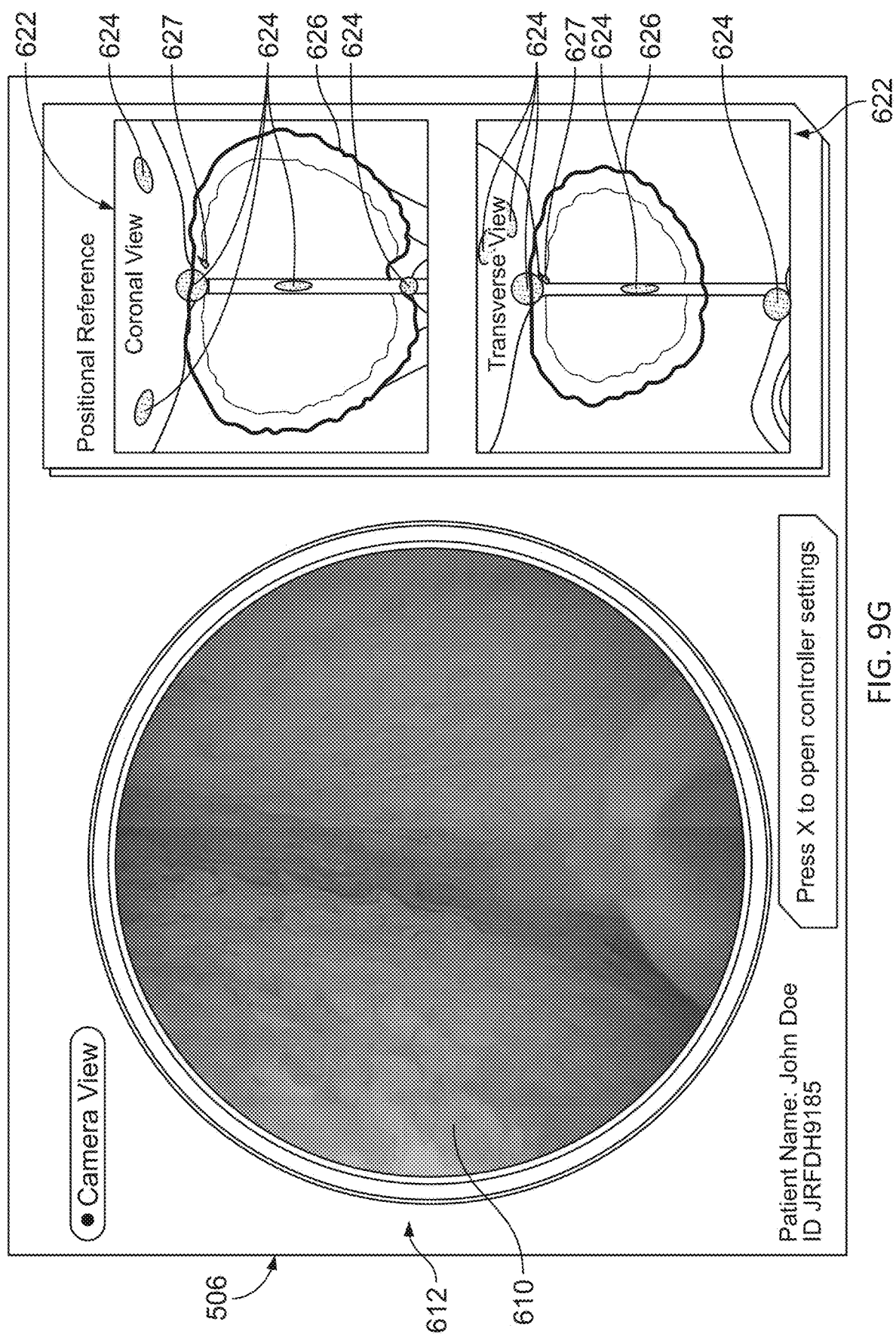
FIG. 9G depicts an enucleation end screen, according to one or more embodiments herein.

Referring to FIG. 9E, in some embodiments, the display 506 can depict an enucleation begin screen presentation 612. The enucleation begin screen can appear after all required anatomical landmarks have been tagged and confirmed by the surgeon. The presentation 612 can include the imaging data 610. In some embodiments, the presentation 612 includes the one or more global maps 622 of the surgical site (e.g., the prostate and surrounding anatomy). In some embodiments, the presentation 612 includes the two or more global maps 622 of the surgical site, each showing the surgical site about a different anatomical plane. When enucleation is to begin, the scope of the one or more global maps 622 can be limited directly to the area in which enucleation will occur (e.g., the prostate and immediately surrounding anatomy including relevant anatomical landmarks). That is, once enucleation begins, the presentation of the global maps 622 can be a zoomed-in view compared to those presented during tagging. In some embodiments, the one or more global maps 622 or markers 624 presented in the enucleation begin screen can be patient-specific. The one or more global maps 622 in the enucleation begin screen can include the tagged anatomical landmarks shown with the markers 624.

Referring to FIG. 9F, according to some embodiments, the display 506 can depict an enucleation mid-way screen presentation 612. The enucleation mid-way screen can appear after enucleation has begun and before enucleation has completed. The presentation 612 can include the imaging data 610. In some embodiments, the presentation 612 includes the one or more global maps 622 of the surgical site (e.g., the prostate and surrounding anatomy). In some embodiments, the presentation 612 includes the two or more global maps 622 of the surgical site, each showing the surgical site about a different anatomical plane. In some embodiments, the scope of the one or more global maps 622 can be limited directly to the area in which enucleation is occurring or will occur (e.g., the prostate and immediately surrounding anatomy including relevant anatomical landmarks). In some embodiments, the one or more global maps 622 or markers 624 presented in the enucleation mid-way screen can be patient-specific. The one or more global maps 622 in the enucleation mid-way screen can include the tagged anatomical landmarks shown with the markers 624. In some embodiments, the one or more global maps 622 in the enucleation mid-way screen can include a presentation element 626 (e.g., a label or marker) showing the surgical plane developed up to that point in time. The one or more global maps 622 in the enucleation mid-way screen can include a label, such as a marker, 627 showing the location of the end effector 408 in the surgical site. The marker 627 can be moved in the one or more global maps 622 in real-time as the end effector 408 is moved. The one or more global maps 622 can indicate to a surgeon the location of the end effector 408 relative the tagged anatomical landmarks. The one or more global maps 622 can indicate to a surgeon the location of the surgical plane relative the tagged anatomical landmarks. The surgeon can analyze the location of the end effector 408 relative the tagged anatomical landmarks and/or the location of the surgical plane relative the tagged anatomical landmarks to determine where to move the end effector 408 to continue the surgical plane (e.g., the surgeon can infer the curvature of the prostate and move the end effector 408 accordingly to continue the surgical plane).

Referring to FIG. 9G, in some embodiments, the display 506 can display an enucleation end screen presentation 612. The enucleation end screen can appear when the enucleation finishes to show a complete tracing of the prostate surface as traced by the surgery. The enucleation end screen can have the same or similar elements as the enucleation mid-way screen, differing in that the surgical plane shown in the one or more global maps 622 is completed.

Figure 9H:
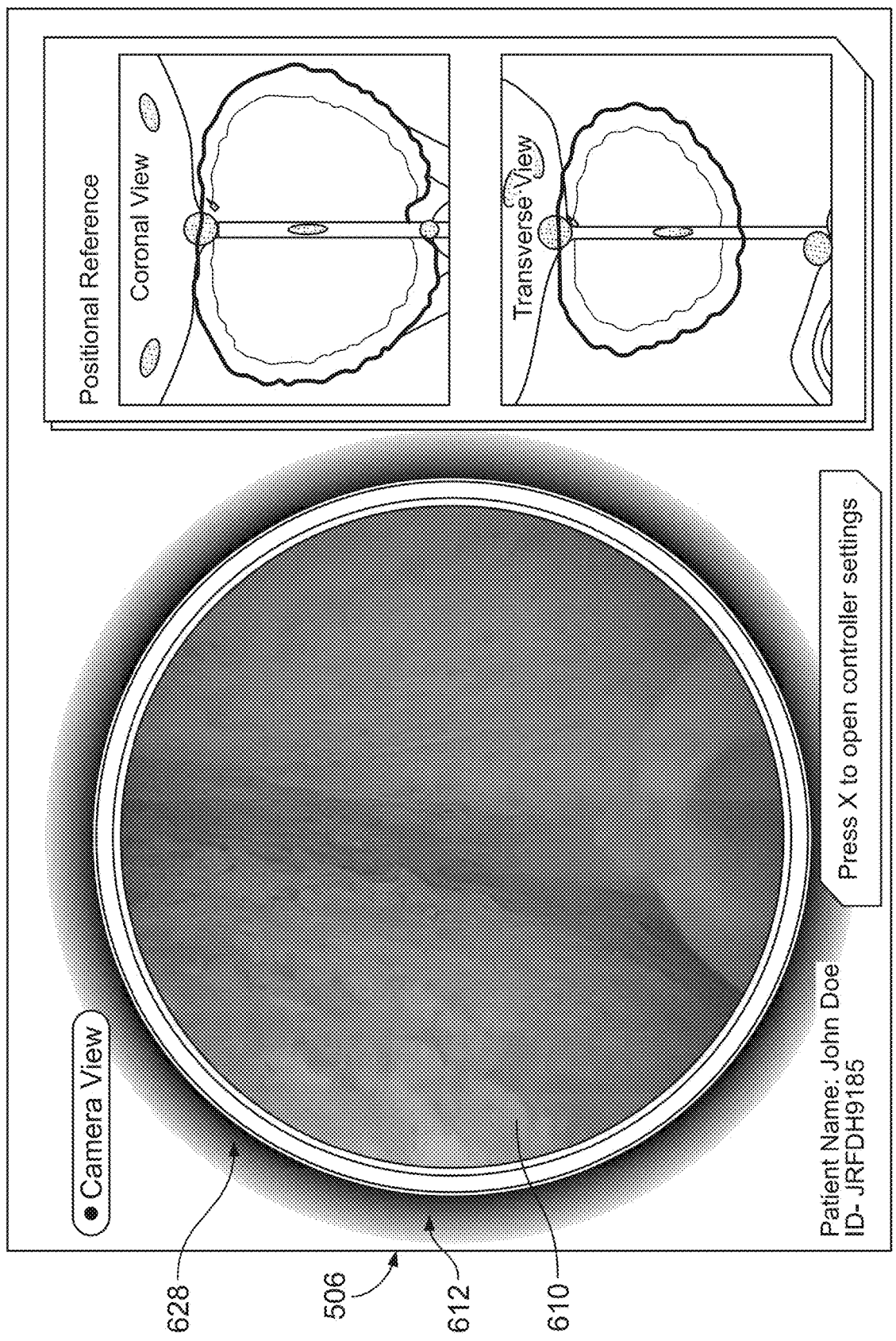
FIG. 9H depicts a force alert on the screen, according to one or more embodiments herein.
Figure 9I:
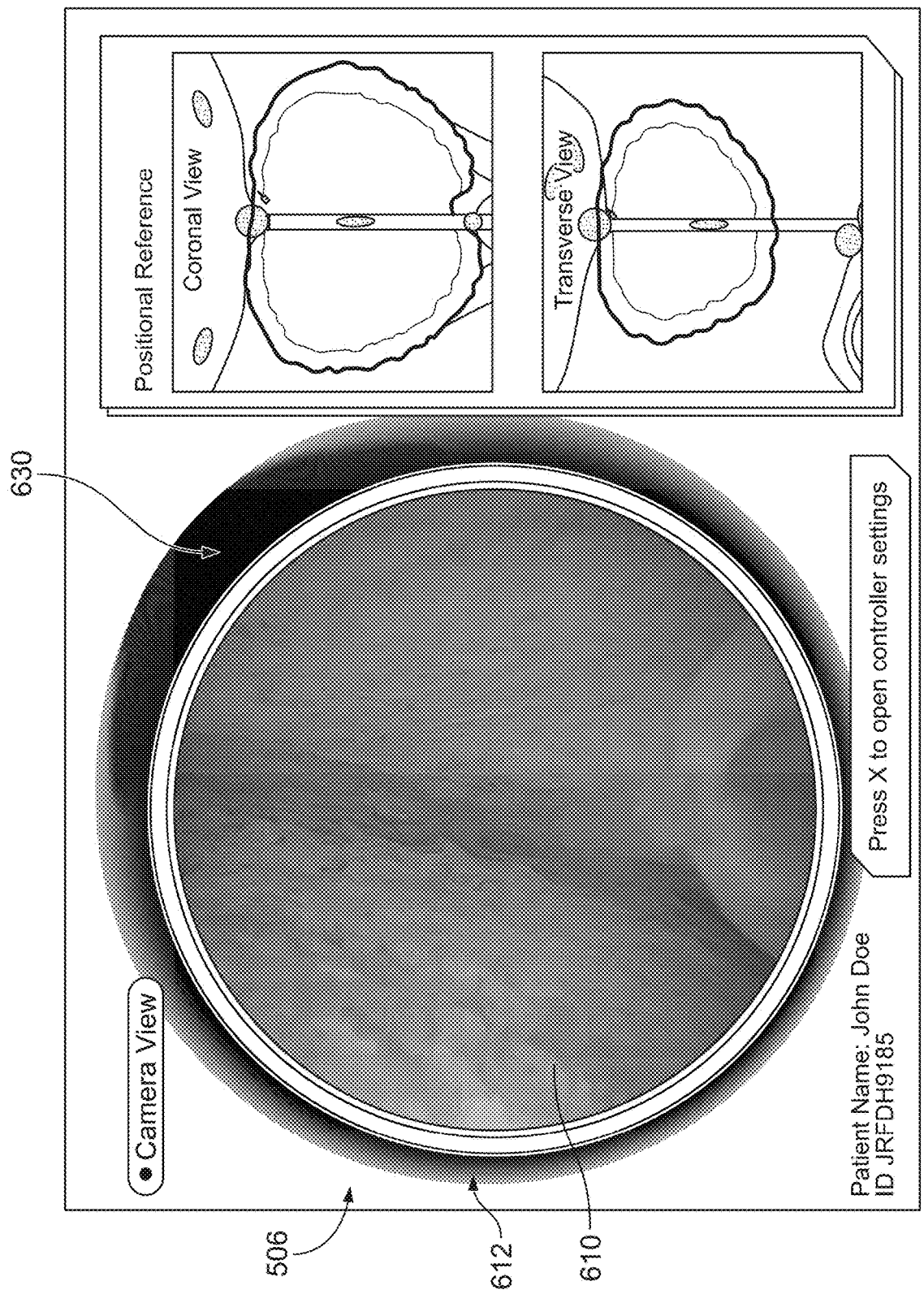
FIG. 9I depicts a directional force alert, according to one or more embodiments herein.

Referring to FIG. 9H, in some embodiments, the display 506 can display a force alert presentation element 628 in the presentation 612. The force alert presentation element 628 can be displayed at any time during a procedure, for instance during enucleation. The force alert presentation element 628 can appear on the display 506 if the user pushes the end effector 408 into the surrounding tissue harder than a designated amount. In some embodiments, the force alert presentation element 628 can be a colored ring presented around the real-time imaging data 610. In some embodiments, when the excess force is applied in the axial direction, the force alert presentation element 628 can be a ring surrounding the entire real-time imaging data 610. Referring to FIG. 9I, in some embodiments, the display 506 can display a directional force alert presentation element 630, which can also be displayed at any point during a procedure. The display 506 in FIG. 9I substantially mirrors the display 506 in FIG. 9H, except when the excess force is applied in a radial direction, the force presentation element 630 can be displayed around only a portion of the real-time imaging data 610 that corresponds to the direction the excess force is applied in.

It should be appreciated the real-time image data 610 and associated presentation 612 displayed on the display 506 can transition between multiple of the above-shown examples during the course of a procedure. Merely as an example, the display 506 can transition from the pre-tagging screen to the post-tagging screen as anatomical landmarks are tagged. As another example, the display 506 can transition between the enucleation begin screen, the enucleation mid-way screen, and the enucleation end screen as the prostate is enucleated. It should, also, be appreciated that the above-described displays 506 shown in FIGS. 9A-9I are merely examples, and that the system 100 described herein can generate more or different presentations 612 on the display 506.

Figure 10A:
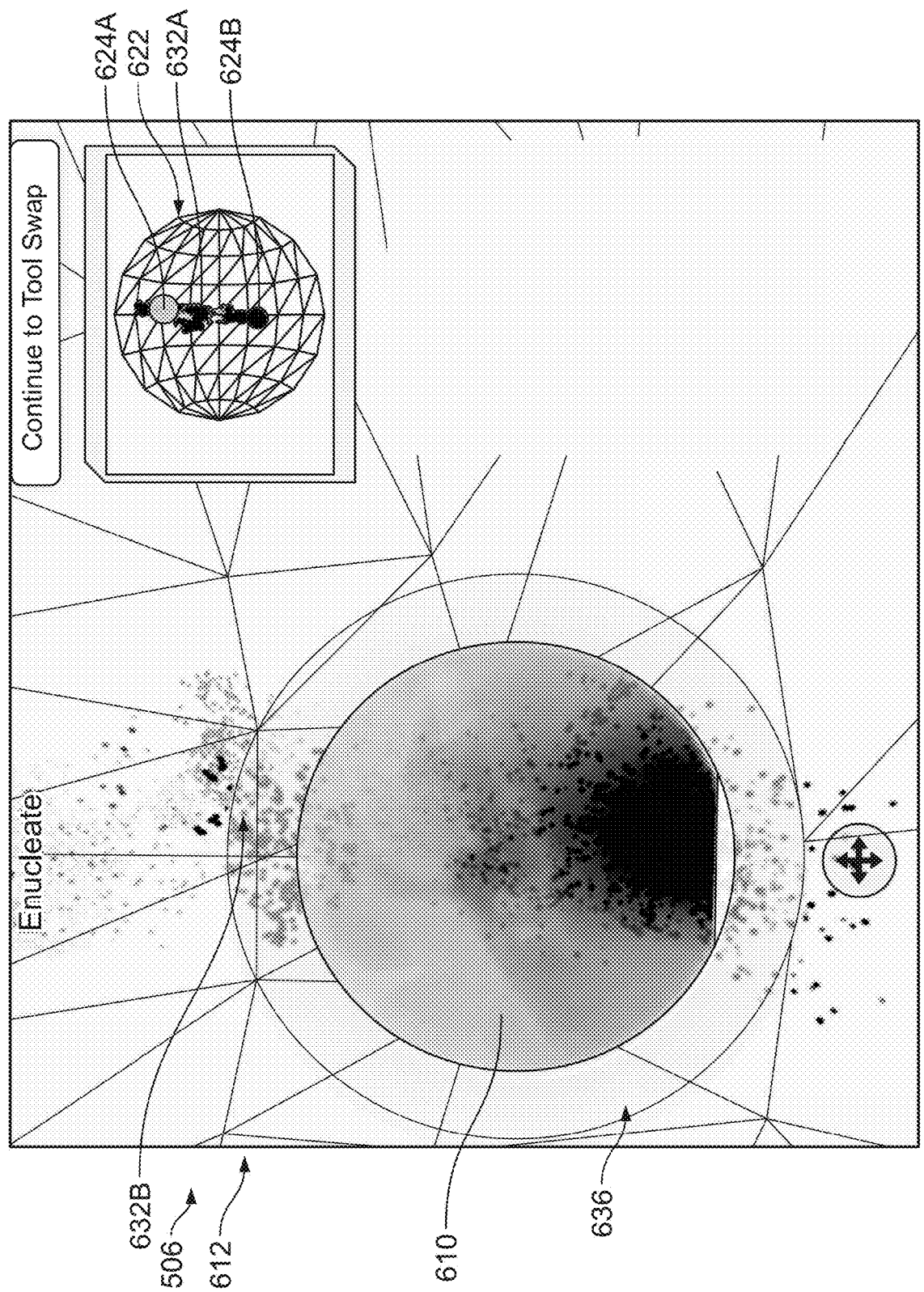
FIG. 10A depicts a presentation, according to one or more embodiments herein.
Figure 10B:
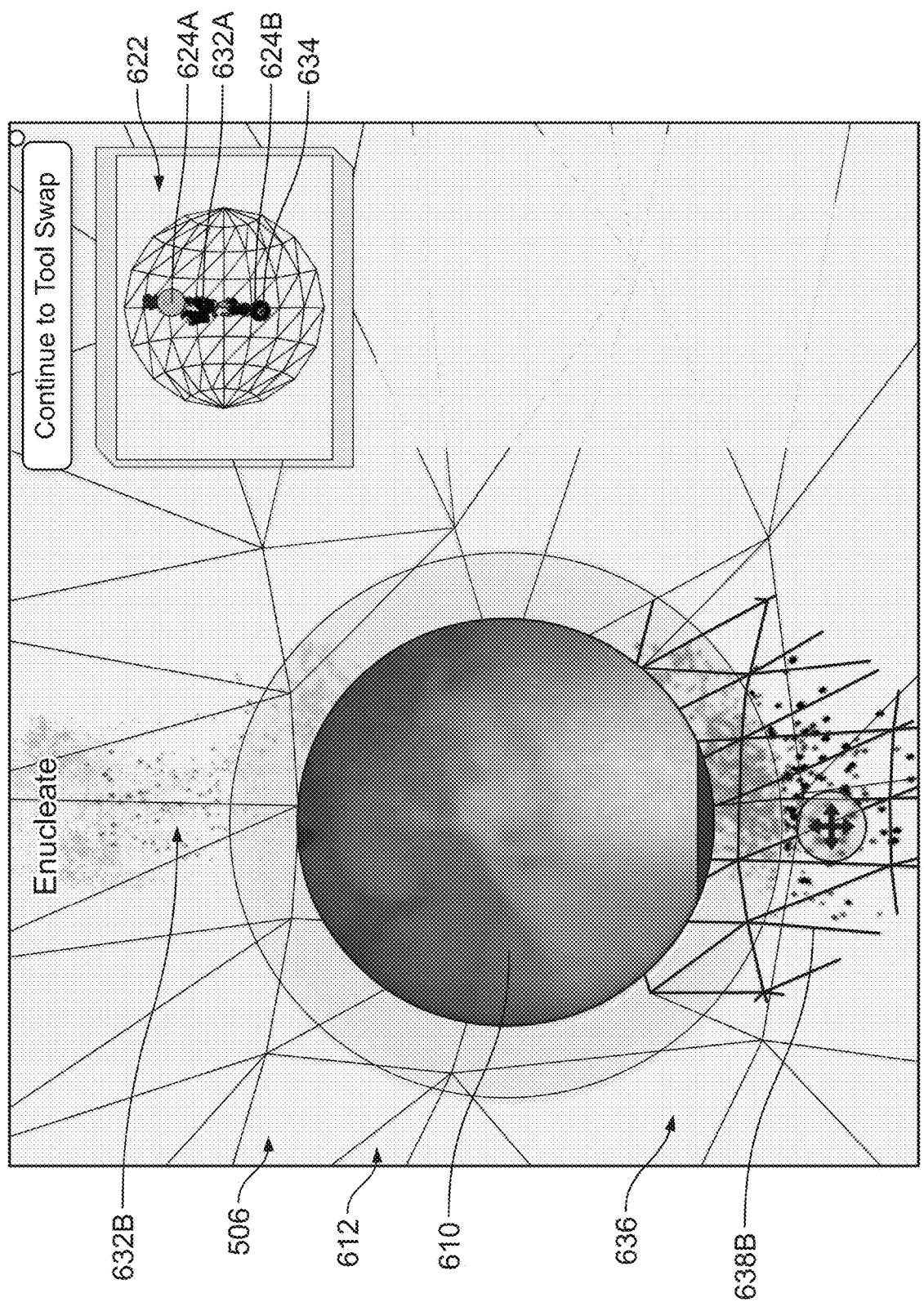
FIG. 10B depicts a presentation, according to one or more embodiments herein.
Figure 10C:
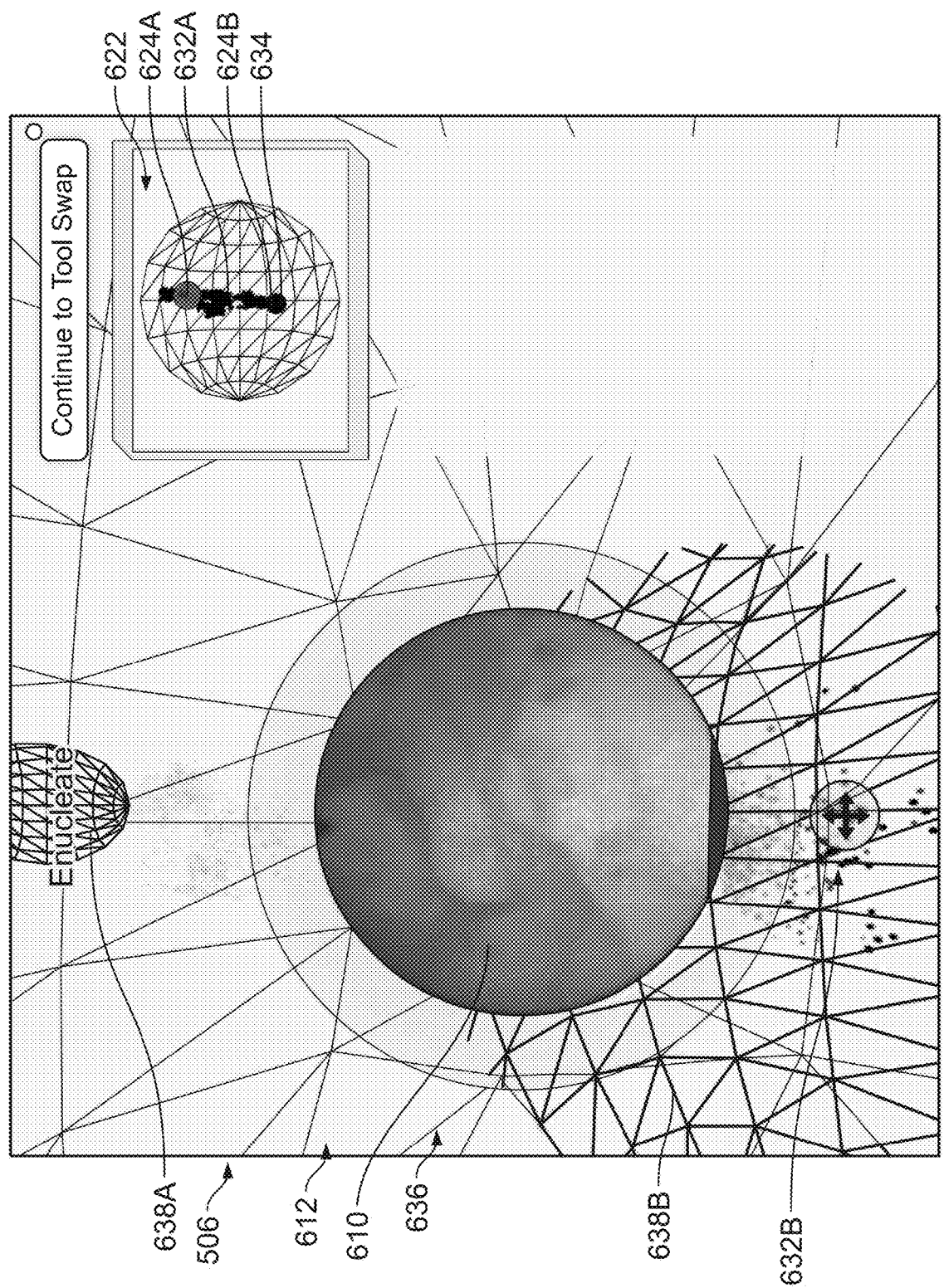
FIG. 10C depicts a presentation, according to one or more embodiments herein.

Referring now to FIG. 10A-10C, examples of presentations 612, including imaging data 610 (which can be real-time imaging data), that can be depicted on the display 506, according to some embodiments, are depicted. In some embodiments, the global map 622 can generally show the surgical site. In some embodiments, the global map 622 can generally show the surgical site using a spherical volume. In some embodiments, during the tagging process of anatomical landmarks, the system 100 can generate patient-specific information to populate the global map 622. For instance, the system 100 can generate a point cloud, showing the contours, shape, size, location, etc. of the tissue in the surgical site. In some embodiments, the global map 622 can include a depiction of a point cloud 632A, showing the contours, shapes, surface, depth, etc. of the patient-specific anatomy in the surgical site, for example, anatomical landmarks. In some embodiments, the global map can include a first presentation element, such as a label or marker, 624A showing a location, shape, or size of a first tagged anatomical landmark in the global map 622. In some embodiments, the global map can include a second presentation element, such as a label or marker, 624B showing a location, shape, or size of a second tagged anatomical landmark in the global map 622. The first marker 624A and the second marker 624B can be sized and positioned in the global map 622 based on the patient-specific anatomy (e.g., the patient specific anatomical landmarks) learned during the tagging process. In some embodiments, the first marker 624A and the second marker 624B can include different characteristics (e.g., color, shape, brightness, etc.) to differentiate the markers and therefore the anatomical landmarks they represent. In some embodiments, the first marker 624A can be a bladder neck, and the second marker 624B can be a sphincter.

In some embodiments, the global map 622 can include a presentation element, such as a label or marker, 634 showing the location of the end effector 408 in the surgical site. In some embodiments, the marker 634 can show the location of the end effector 408 relative the one or more anatomical landmarks in the surgical site. In some embodiments, as the end effector 408 is moved in real-time in the surgical space, the location of the marker 634 for the end effector can correspondingly move in the global map 622.

In some embodiments, the displays 506 can include a central presentation element 636. The central presentation element 636 can include the imaging data 610. In some embodiments, the central presentation element 636 can include a depiction of the point cloud 632B, which can be a zoomed in or local view of the point cloud 632A shown in the global map 622. That is the point cloud 632B shown in the central presentation element 636 is a segment of the point cloud 632A (e.g., the tissue) in the immediate vicinity of the end effector 408. In some embodiments, the point cloud 632B in the central presentation element 636, showing the contours, depth, surface, etc. of the tissue in the vicinity of the end effector 408, updates in real-time as the end effector 408 is moved throughout the surgical site. In such embodiments, the imaging data 610, itself, can indicate the location of the end effector 408 in the surgical site (e.g., in the point cloud 632B). The point cloud 632B can be a map or projection of the anatomy in the vicinity of the end effector 408.

As the end effector 408 is navigated in the surgical site, as anatomical landmarks come into the vicinity of the end effector 408, presentation elements, such as labels, which can be markers, showing the anatomical landmarks in the surgical site can appear in the central presentation element 636 around the real-time imaging data 610. It should be appreciated that markers showing the anatomical landmarks can appear or disappear from the central presentation element 636 as the end effector 408 is moved toward or away from the anatomical landmarks. In some embodiments, the nearer the end effector 408 is to the anatomical landmark, the larger the marker will appear in the central presentation element 636. In some embodiments, the markers in the central presentation element 636 for the anatomical landmarks can be volumetric (e.g., a three-dimensional shape generally corresponding to the size, and in the location of, the anatomical landmark). For instance, as the end effector 408 is moved in the surgical site, corresponding to the change in presentations 612 between that shown in FIG. 10A and that shown in FIG. 10B, the anatomical landmark shown with the marker 624B in the global map 622 can come into the vicinity of the end effector 408. Accordingly, a marker 638B, corresponding to the same landmark shown with the marker 624B, can appear in the central presentation element 636 in relation to its relative location to the end effector 408. The marker 638B can share one or more identifying characteristics (e.g. color, brightness, etc.) with the marker 624B such that the surgeon can recognize they denote the same anatomical landmark. At the location of the end effector 408 shown in FIG. 10B, the anatomical landmark denoted by the marker 624A is still not in the vicinity of the end effector 408, and therefore, a corresponding marker for such anatomical landmark does not yet appear in the central presentation element 636. The markers for the anatomical landmarks, along with the point cloud 632B, can be considered a local map or projection of the anatomy in the vicinity of the end effector 408.

As the end effector 408 is moved in the surgical site, corresponding to the change in presentations 612 between that shown in FIG. 10B and that shown in FIG. 10C, the location of the anatomical landmark shown with the marker 638B in the central presentation element 636 can change relative the end effector 408. Therefore, the amount or size of the marker 638B shown in the central presentation element 636 can change between the displays 506 shown in FIG. 10B and 10C. Additionally, as an example, as the end effector 408 is moved in the surgical site, corresponding to the change in presentations 612 between that shown in FIG. 10B and that shown in FIG. 10C, the anatomical landmark shown with the marker 624A in the global map 622 can come into the vicinity of the end effector 408. Accordingly, a marker 638A, corresponding to the same landmark shown with the marker 624A, can appear in the central presentation element 636 in accordance with its relative location to the end effector 408. The marker 638A can share one or more identifying characteristics (e.g. color, brightness, etc.) with the marker 624A such that the surgeon can recognize they denote the same anatomical landmark. In some embodiments, the point cloud 632B, itself, can be a marker for the anatomical landmarks in the vicinity of the end effector 408 in the central presentation element 636. In such embodiments, there may not be volumetric markers, such as those shown by 638A and 638B in the central presentation element 636. The surgeon, looking at the markers 624A and 624B in the global map 622 and assessing the point cloud 632B in the central presentation element 636 can assess the location, size, contours, shape, depth, etc. of the anatomical landmarks in the vicinity of the end effector 408. While the embodiments shown in FIGS. 10A-10C show the markers 638A and 638B in the central presentation element 636 as spherical objects, in some embodiments, the markers 638A and 638B can take any desirable shape, including a shape that approximates the anatomical landmarks each marker 638A and 638B respectively denote.

It should be appreciated that any of the above-discussed processing controllers of the control cart 102 and robotic cart 104 can include algorithms that incorporate machine learning (ML). While ML is specifically discussed herein, it should be appreciated that this is merely an example, and that the system 100 can be informed by algorithms incorporating any artificial intelligence systems (such as neural networks or deep learning, for example) in addition to or instead of ML.

In some embodiments, the system 100 can use surgeon input, computer vision, or ML to identify the current phase of the surgical procedure or specific surgical actions within that phase or within the entire procedure. In some cases, the system can use information about the phase, ongoing surgical actions, current end effector 408 held by the adapter 406, end effector 408 location, or anatomical landmark identification to determine a particular phase of the surgical procedure. In the specific case of HoLEP, the phases may include procedure setup, enucleation, morcellation, hemostasis, and transitional phases before, after or between those phases. The specific overlays presented with the real-time imaging data will vary depending on the detected phase of the surgical procedure. For instance, it should be appreciated that information on the surgical plane during enucleation would not be overlayed on the real-time imaging data during morcellation of the prostate tissue in the bladder.

It should be appreciated that the configuration of the system 100 discussed above is merely one non-limiting example of the layout of the system 100. That is, in some embodiments, the system 100 can include a single console that includes all of the above-described features of the robotic cart 104 and the control cart 102. That is, data collection, analysis, presentation, and the like, do not need to be distributed between different consoles. Instead, such determinations can be made locally on a single console that includes the hardware of the both the control cart 102 and the robotic cart 104. Moreover, it should be appreciated that the above-discussed controllers can be distributed in other manners than those presented above. For instance, and merely as an example, the robotic cart 104 may include the anatomy controller 530 and then transmit its generated data on landmark and tissue boundary identification to the control cart 102. Indeed, in some embodiments, any or all of the analyses can be performed on the robotic cart 104 and transmitted to the control cart 102, which can function merely to present such information via the presentation controller 570 or alert controller 585, and to receive user inputs via the command controller 575.

Moreover, it should be appreciated that the "control cart" 102 need not include the hardware elements discussed with respect to FIG. 4. Instead, the hardware of the control cart 102 discussed herein is merely one non-limiting example. The functionality of the discussed "control cart" can be entirely housed within any processing device. For instance the "control cart" can merely be a hand-held device that can process data, communicate with the robot cart 104, present information to the surgeon, and receive surgeon input (on a touch screen for instance). In some embodiments, the "control cart" can be a standalone computer, a dedicated electronic device, a tablet, a smartphone, etc.

It should be appreciated that the system 100 can operate under different modes of human (e.g., surgeon 200) supervision. For instance, in some embodiments, the surgeon 200 can make all decisions on surgical procedure execution. In such embodiments, as an example, the surgeon can analyze at least one of the anatomical landmark and boundary information in the presentation 612, including the imaging data 610, presented on the display 506, the current end effector location information (e.g., relative one or more landmarks) in the presentation 612, or the information on the developed surgical plane presented in presentation 612. Based on such analysis, the surgeon can determine a curvature of the prostate or a location for the end effector 408 to be moved to continue development of the surgical plane, move the end effector 408 to such location, and activate the end effector 408 to develop the surgical plane. That is, in such embodiments, the system 100 does not present the surgeon 200 with any explicit information on the proposed location to develop the surgical plane. Moreover, in such embodiments, the system 100 does not automatically control the robot arm 402 or end effector 408.

As another example, in some embodiments, the system 100 can make explicit suggestions to the surgeon 200 for carrying out the surgical procedure. For instance, in such embodiments, the presentation 612, including real-time imaging data 610, presented on the display 506 can include a proposed location for the surgical plane to be developed. In such embodiments, the surgeon 200 can decide to follow the suggestion presented by the system 100 or to move the end effector 408 to a different location than that suggested in order to develop the surgical plane. In such embodiments, the surgeon 200 can remain in full control of movement of the end effector 408 to a desired location to develop the surgical plane (whether the location is the one suggested by the system 100 or not) and the activation of the end effector 408 at the moved-to location.

As another example, in some embodiments, the system 100 can partially automatically control the robotic cart 104 to develop the surgical plane. For instance, in such embodiments, the system 100 can automatically navigate the end effector to its determined suggested location for developing the surgical plane. The surgeon 200 can then make the determination to "accept" the automatic navigation by activating the end effector 408 at the location the end effector 408 was moved to by the system 100, or "reject" the automatic navigation by moving the end effector 408 to a different location to develop the surgical plane and activating the end effector 408 at the different location.

As another example, in some embodiments, the system 100 can fully automatically control the robotic cart 104 to develop the surgical plane. For instance, in such embodiments, the system 100 can automatically navigate the end effector to its determined suggested location for developing the surgical plane. The system 100 can then activate the end effector 408 at the suggested location to develop the surgical plane. The system 100 can continue a similar process to develop the surgical plane until the surgeon 200 intervenes, instructing the system 100 to shift from a fully automatic mode to a semi-automatic, suggestion, or fully manual mode.

It should be appreciated that the above examples for different levels of human supervision in the operation of the system 100 are merely examples. It should be appreciated that the boundary between surgeon 200 performed tasks and automatic system 100 performed tasks can be drawn at any desirable level. Moreover, while examples of different modes of human supervision were discussed with respect to developing the surgical plane during enucleation, it should be appreciated that the same principles can apply to different stages of the surgical procedure, such as morcellation.

Referring now to FIG. 11, a method 700 for presenting data on anatomical landmarks or tissue boundaries is depicted. The method 700 can be performed by the system 100. In step 702 of the method 700, imaging data, which can be real-time imaging data, can be received by the system 100. The imaging data can be generated by one or more sensors on or controlled by the robotic cart 104 that are configured to provide imaging data (e.g., video or still images) on the target surgical site and the operating environment of the end effector 408 (e.g., in the target surgical site).

In step 704 of the method 700, the imaging data can be analyzed by the system 100 to determine anatomical landmarks in the target surgical site. In some embodiments, the system 100 can be configured to receive the imaging data from the robotic cart 104 and determine a boundary between two or more different tissue types. For instance, in some embodiments, the system 100 can include one or more item recognition algorithms to differentiate between tissue types, tissue formations, anatomical landmarks, and the like. Any known or yet-to-be-developed item recognition algorithm can be used to extract the anatomical landmarks or tissue boundaries from the imaging data from the robotic cart 104. Example item recognition algorithms include, but are not limited to, scale-invariant feature transform ("SIFT"), speeded up robust features ("SURF"), and edge-detection algorithms. In some embodiments, the system 100 can be informed by surgeon input, computer vision, imaging systems, or machine learning that can aid in determination of the location, size, or shape of anatomical landmarks or tissue boundaries. In some embodiments, the system 100 can be trained on a database of imaging data from a plurality of completed surgical procedures of a relevant type. For instance, the system 100 can be trained on a database of imaging data from a plurality of completed HoLEP procedures. In some embodiments, the system 100 can determine anatomical landmarks and tissue boundaries relevant to HoLEP (e.g., in a patient's prostate). In some embodiments, the system 100 can determine landmarks including, but not limited to, the Verumontanum, the bladder neck, the ureteric orifices, the external urethral sphincter, the bladder wall, ejaculatory ducts, bladder neck fibers, prostatic blood vessels, prostatic capsule, stones, tumors, or diverticuli. As another example, the system 100 can determine a boundary between the prostatic capsule and the prostate tissue contained within (which in the case of HoLEP can be enlarged tissue (e.g., an adenoma)). A tissue boundary can be considered a landmark herein. The system 100 can be configured to determine anatomical landmarks and tissue boundaries in real-time from the real-time imaging data received from the robotic cart 104.

In step 706 of the method 700, the system 100 can generate a presentation based on the identified anatomical landmarks in the imaging data. In some embodiments, the presentation can include one or more presentation elements. In some embodiments, the presentation elements can include the imaging data, which can be real-time imaging data. In some embodiments, the presentation elements can include a global map of the target surgical site. In some embodiments, the presentation elements can include a local map of the target surgical site surrounding the end effector. In some embodiments, the presentation elements can include one or more items associated with the anatomical identification data (e.g., the identified anatomical landmarks in the imaging data). The presentation elements can be, for example, textual labels or non-textual labels (e.g., arrows, bounding boxes, symbols, markers etc.) that indicate the particular landmarks and tissue boundaries identified. That is, the system 100 can determine a label for each identified anatomical landmark. In some embodiments, the generated presentation elements can be any of the previously described presentation elements. The one or more other presentation elements can be used to annotate or supplement the real-time imaging data to provide greater context to a surgeon on the surgical procedure.

In step 708 of the method 700, the system 100 can present the presentation, including the imaging data, which can be real-time imaging data, and one or more other presentation elements. The imaging data annotated or supported with one or more other presentation elements can be called combination imaging data, including labels for calling out the identified anatomical landmarks in the imaging data or maps for calling out the surrounding anatomy in the surgical site. The surgeon can view the presentation on the display. The surgeon can use such presentation to guide the surgeon through the surgical procedure with increased precision.

Figure 12:
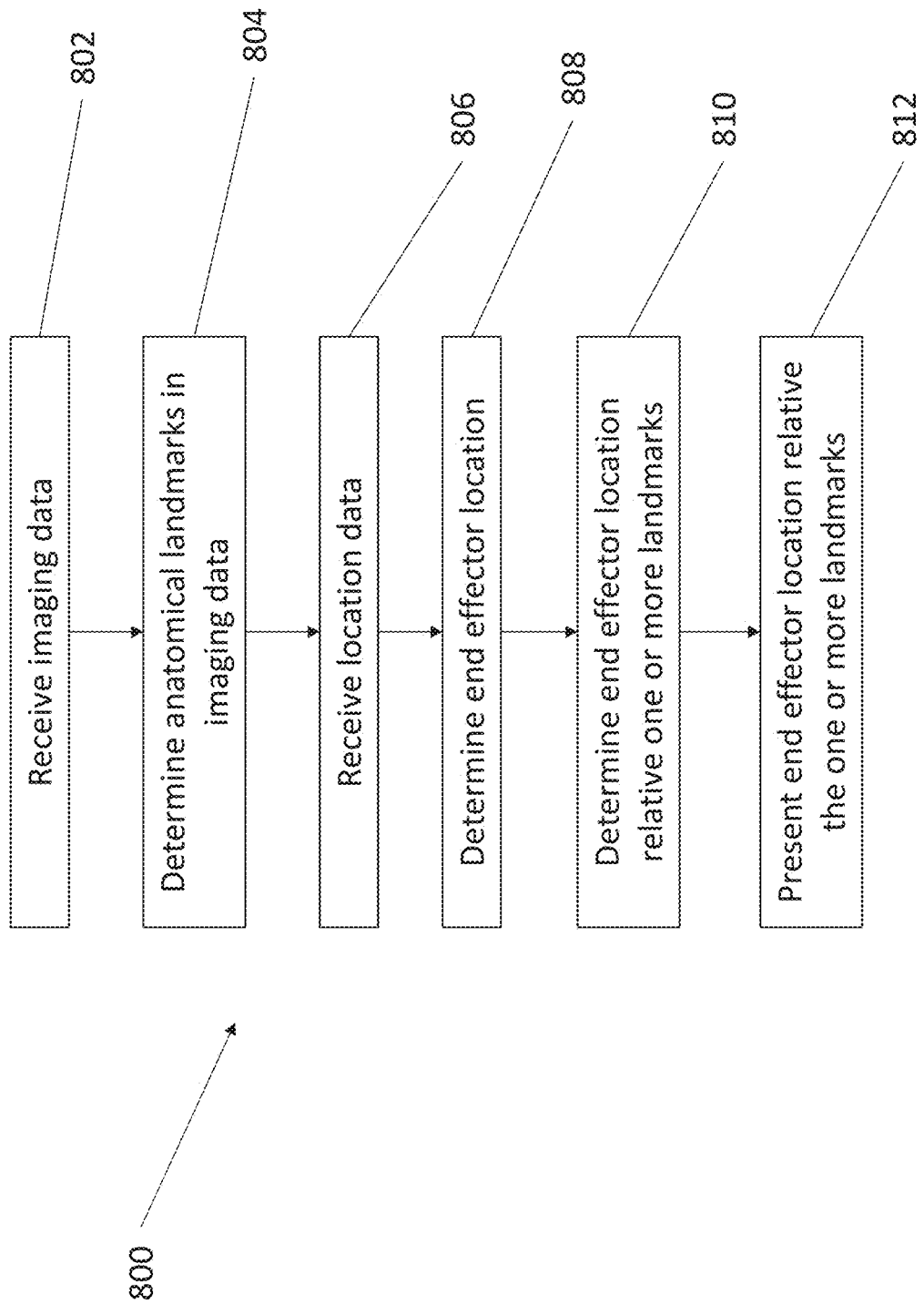
FIG. 12 depicts an illustrative method for generating a presentation of imaging data based on a determined location of an end effector relative one or more landmarks in the imaging data, according to one or more embodiments herein.

Referring now to FIG. 12, a method 800 for presenting data on end effector 408 location is depicted. In step 802 of the method 800, imaging data, which can be real-time imaging data, can be received by the system 100, and in step 804 of the method 800, anatomical landmarks in the imaging data can be identified by the system 100. It should be appreciated that these steps mirror the steps 702 and 704 of the method 700, and so are not discussed in detail here.

In step 806 of the method 800, the system 100 can receive location data related to the location of the end effector 408. In some embodiments, one or more location sensors can detect a location of one or more portions of the robotic arm 402 or adapter 406. In such embodiments, a location of the end effector 408 relative to the one or more portions of the robotic arm 402 or the adapter 406 can be known (e.g., a distance and direction that the distal end of the end effector 408 extends from the adapter 406), such that a location of the end effector 408 (and particularly the distal end of the end effector 408) can be determined from the detected location of the one or more portions of the robotic arm 402 or adapter 406. In some embodiments, one or more location sensors positioned on the end effector 408 can directly detect a location of the end effector. In some embodiments, the system 100 can be configured to collect inverse kinematic data on the robotic arm 402 or data on the state of the one or more motors for moving the robotic arm 402. In such embodiments, the reverse kinematic data or motor state data can be used to determine a location of one or more portions of the robotic arm 402 or adapter 406. In such embodiments, a location of the end effector 408 relative to the one or more portions of the robotic arm 402 or the adapter 406 can be known (e.g., a distance and direction that the distal end of the end effector 408 extends from the adapter 406), such that a location of the end effector 408 (and particularly the distal end of the end effector 408) can be determined from the determined location of the one or more portions of the robotic arm 402 or adapter 406.

In step 808 of the method 800, the system 100 can determine a location of the end effector 408. In some embodiments, such as when one or more sensors detect the location of the end effector 408 directly, no further calculations are needed to determine the location of the end effector 408. In embodiments where one or more location sensors detect a location of one or more portions of the robotic arm 402 or adapter 406, a location of the end effector 408 relative to the one or more portions of the robotic arm 402 or the adapter 406 can be known (e.g., a distance and direction that the distal end of the end effector 408 extends from the adapter 406), such that a location of the end effector 408 (and particularly the distal end of the end effector 408) can be determined from the detected location of the one or more portions of the robotic arm 402 or adapter 406. In embodiments where reverse kinematic data or motor state data is used to determine a location of one or more portions of the robotic arm 402 or adapter 406, a location of the end effector 408 relative to the one or more portions of the robotic arm 402 or the adapter 406 can be known (e.g., a distance and direction that the distal end of the end effector 408 extends from the adapter 406), such that a location of the end effector 408 (and particularly the distal end of the end effector 408) can be determined from the determined location of the one or more portions of the robotic arm 402 or adapter 406.

In step 810 of the method 800, the system 100 can compare the end effector 408 location data and the identified anatomical landmark data (which includes not just an identity of a landmark, but also a location of the landmark in the imaging data) to determine the relative position and orientation of the end effector 408 with respect to the anatomical landmarks or tissue boundaries identified in the imaging data. The location of the end effector 408 can be determined relative anatomical landmarks identified from imaging data, but that are not present in a current frame of real-time imaging data. For instance, the location of the end effector 408 relative anatomical landmarks identified during an initial tagging process can be determined.

In step 812 of the method 800, a presentation, including the imaging data and one or more other presentation elements annotating or supplementing the imaging data can be generated by the system. In addition to the presentation denoting the identified anatomical landmarks (as discussed in steps 706 and 708 of the method 700), the system 100 can generate the presentation to include one or more presentation elements associated with the end effector 408 location data. The presentation elements can be for example, numerical labels listing the relative location of the end effector 408 in relation to a landmark, a symbol showing the location of the end effector in the imaging data or in a global or local map of the surgical site, and the like. Still referring to step 812, the system 100 can present the presentation including the one or more additional presentation elements on top of or surrounding the received real-time imaging data. In some embodiments, the one or more additional presentation elements (which can be, for instance, anatomical landmarks) can be presented on a global map of the surgical site. The location of a first label or presentation element, denoting the location of the end effector 408, relative the location of a second label or presentation element, denoting the location of an anatomical landmark, can reveal to the surgeon the relative location of the end effector 408 to the anatomical landmark on the presentation on the display 506. The presentation elements can be fit to the received imaging data, such that the presentation elements accurately point to or are positioned over the location of anatomical landmarks or the location of the end effector 408, in the imaging data, global map of the surgical site, or local map of the surgical site (e.g., the central presentation element 636 depicted in FIGS. 10A-10C). For instance, the presentation can include an indication of the location of the end effector 408 during the frame of imaging data displayed on the display 506. For instance, a symbol, textual label, or the like could be placed over the imaging data, next to the imaging data, or in a global or local map to denote the location of the end effector 408 derived from the imaging data. In some embodiments, the presentation can include a numerical output displayed adjacent to the imaging data, generally showing an orientation of the end effector 408, coordinate location or position of the end effector 408, or distance of the end effector 408 from the denoted anatomical landmarks or tissue boundaries during the frame of imaging data (e.g., at the moment of time) displayed on the display 506. The annotated or supplemented imaging data in the presentation can be presented on a display for inspection by a surgeon. The surgeon can use such combination image data, including imaging data labeled with anatomical landmarks and relative end effector 408 location, to guide the surgeon through the surgical procedure with increased precision. For instance, as discussed above, the surgeon can use such information to estimate a curvature of the prostate. For instance, as discussed above, the surgeon can use such information to determine where to move the end effector 408 to continue to the surgical plane.

Figure 13:
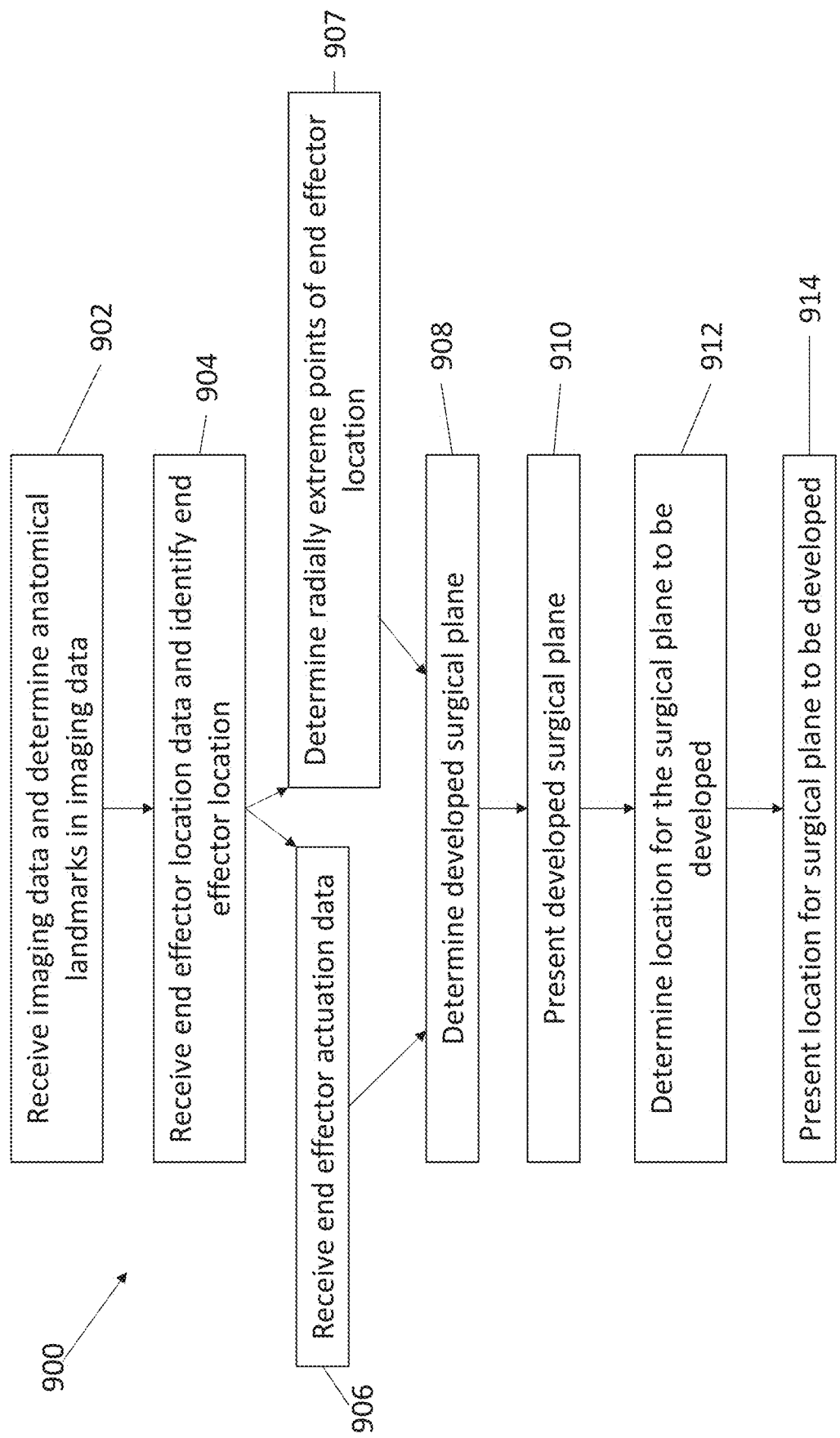
FIG. 13 depicts an illustrative method for generating a presentation of imaging data based on a determined developed surgical plane or a surgical plane to be developed, according to one or more embodiments herein.

Referring now to FIG. 13, a method 900 of presenting a developed surgical plane and, in some embodiments, a surgical plane to be developed to a surgeon 200 is depicted. In step 902 of the method 900, the system 100 can receive imaging data, which can be real-time imaging data, and determine anatomical landmarks in the imaging data, as discussed in detail with respect to steps 702 and 704 of the method 700. In step 904 of the method 900, the system 100 can receive end effector location data and determine end effector 408 location, as discussed in detail with respect to steps 806 and 808 of the method 800.

In some embodiments, in step 906 of the method 900, the system 100 can receive end effector 408 actuation data. The data on end effector 408 actuation can be stamped with a respective time of actuation and location of the end effector 408 during actuation (e.g., as determined in step 804). Therefore, the system 100 can determine a location (e.g., position and orientation) of prior end effector 408 actuations. The system 100 can, also, track the temporal sequence of prior end effector 408 actuations. Therefore, each actuation of the end effector 408 can be stamped or associated with its respective time of actuation, location of end effector 408 at actuation, and more specifically, the relative position and orientation of the end effector 408 with respect to the anatomical landmarks or tissue boundaries at actuation. In some embodiments, system 100 can track a sequence of actuations of the end effector 408 relative the anatomical landmarks or tissue boundaries identified. In some embodiments, the system 100 need not stamp the end effector 408 actuation data with a respective time of actuation, and instead need only determine the location of actuation.

In some embodiments, in step 907 of the method 900 the system 100 can receive the end effector location data and filter all of the radially extreme points that the end effector has been to from the end effector location data. For instance, in some embodiments the surgical plane module 560 can determine the radially extreme point the end effector has been to at each pair of polar and azimuthal angles that the end effector 408 has been positioned in. In some embodiments, the system 100 can identify and track the surgical plane developed by the radially extreme points that the end effector has been to. That is, each radially extreme point the end effector has been positioned at can be determined as a point in the developed surgical plane. The system 100 can, also, track the temporal sequence of surgical plane development (e.g., by the temporal sequence of radially extreme points the end effector is positioned at). Therefore, each point in the surgical plane (e.g., radially extreme point) can be stamped or associated with its respective time of generation (e.g., location of end effector 408 at actuation at each radially extreme point), and more specifically, the relative position and orientation of the end effector 408 with respect to the anatomical landmarks or tissue boundaries at each radially extreme point. In some embodiments, system 100 can track a sequence of radially extreme points of the end effector 408 relative the anatomical landmarks or tissue boundaries identified. In some embodiments, the system 100 need not stamp the radially extreme points with a respective time of being located in the radially extreme points, and instead need only determine the location of the radially extreme points.

In step 908 of the method 900, the system 100 can track the surgical plane developed by the previous actuations of the end effector 408 or the radially extreme points the end effector 408 was positioned at. That is the surgical plane can be defined by the locations of the previous end effector 408 actuations or the previous radially extreme points of end effector 408 location. In some embodiments, the system 100 can track the sequence with which the surgical plane was developed (e.g., sequence of actuations of sequence of radially extreme points).

In step 910 of the method 900, the system 100 can present a presentation for the imaging data can be generated. In addition to the presentation denoting the identified anatomical landmarks (as discussed in steps 706 and 708 of the method 700) and the relative location of the end effector (as discussed with respect to step 812 of the method 800), the system 100 can generate the presentation to include one or more presentation elements associated with the developed surgical plane. The one or more presentation elements for the developed surgical plane can be, for example, outlines, plots, lines, and the like showing the developed surgical plane. Still referring to the step 910, the system 100 can present the presentation element for the developed surgical plane on top of the received imaging data, next to the received imaging data, in a global map, or in a local map. The presentation element can be fit to the received imaging data or global or local map, such that the presentation element labeling the developed surgical plane accurately point to or are positioned over the location of the developed surgical plane in the imaging data or map. The annotated or supplemented imaging data can be presented on a display for inspection by a surgeon. The surgeon can use such combination imaging data, including the imaging data with labeled anatomical landmarks, relative end effector 408 location, and the developed surgical plane, to guide the surgeon through the surgical procedure with increased precision (e.g., to assist the surgeon in determining to move and activate the end effector 408 to continue to the surgical plane).

In some embodiments, in step 912 of the method 900, based on the tracked surgical plane that was previously developed and the location of the end effector 408 relative the anatomical landmarks or tissue boundaries identified in the imaging data, the system 100 can determine or predict the location for the surgical plane to be continued or developed with subsequent actuation of the end effector 408. For instance, the prostate will have an asymmetrical curvature (e.g., non-circular shape) which the surgical plane should track. Based on the tracked development of the surgical plane and the location of the end effector 408 (particularly at the immediately preceding actuation or radially extreme point in the surgical plane development) relative the anatomical landmarks or tissue boundaries identified in the imaging data (e.g., the Verumontanum, the bladder neck, the ureteric orifices, the external urethral sphincter), the system 100 can determine or predict the location for the surgical plane to be developed to track a predicted or determined curvature of the prostate.

In some embodiments, in step 914 of the method 900, the system 100 can present a presentation element for the surgical plane to be developed in the generated presentation. In some embodiments, in addition to the presentation denoting the identified anatomical landmarks (as discussed in steps 706 and 708 of the method 700), the relative location of the end effector (as discussed with respect to step 812 of the method 800), and the developed surgical plane (as discussed in step 910) the system 100 can generate the presentation to include one or more presentation elements associated with the suggested location for the surgical plane to be developed. The one or more presentation elements for the surgical plane to be developed can be, for example, outlines, plots, lines, and the like showing the location for the surgical plane to be developed. Still referring to the step 914, the system 100 can present the presentation element for the surgical plane to be developed on top of the received imaging data, next to the received imaging data, in a global map, or in a local map. The presentation element can be fit to the received imaging data or map, such that the presentation element labeling the surgical plane to be developed accurately point to or are positioned over the location for the development of the surgical plane in the imaging data or map. The annotated or supplemented imaging data can be presented on a display for inspection by a surgeon. The surgeon can use such combination imaging data, including the imaging data with labeled anatomical landmarks, relative end effector 408 location, the developed surgical plane, or the surgical plane to be developed, to guide the surgeon through the surgical procedure with increased precision (e.g., to assist the surgeon in determining to move and activate the end effector 408 to continue to the surgical plane).

It should be appreciated that the above-described methods are not limited to the number or order of steps depicted. That is, one or more steps can be added, omitted, or combined in the above-described methods.

Now, referring again briefly to FIG. 5B, a fully enucleated prostate is depicted. In the fully enucleated prostate, the adenoma is fully detached from the capsule. Following enucleations, the surgeon 200 can change end effectors 408 held by the adapter 406. For instance, in some embodiments, the surgeon 200 can remove a resectoscope from the adapter and position a nephroscope on the adapter 406. The nephroscope can be used to guide the enucleated prostate tissue into the bladder, as shown in FIG. 5B, where the enucleated prostate tissue is morcellated.

Figure 14:
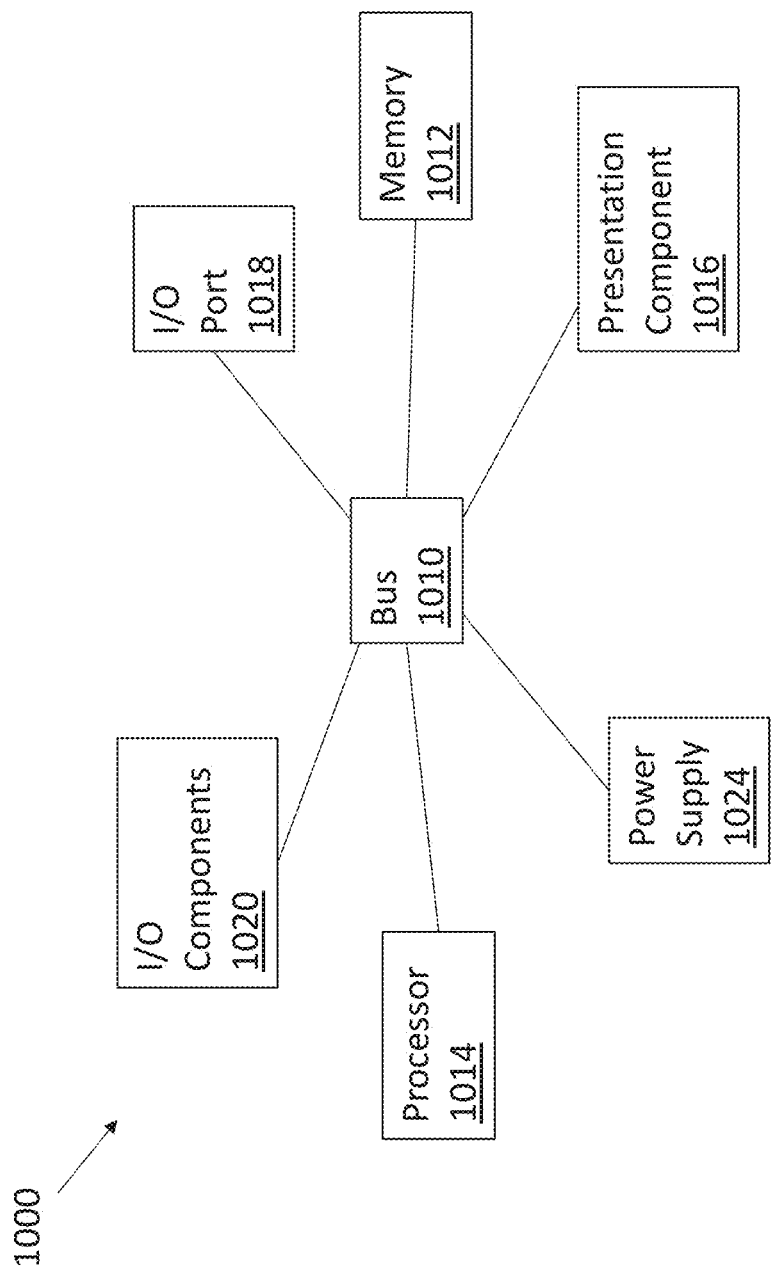
FIG. 14 depicts an exemplary computing device, according to one or more embodiments herein.

Any suitable computing systems can be used to implement the computing devices and methods/functionality described herein and be converted to a specific system for performing the operations and features described herein through modification of hardware, software, and firmware, in a manner significantly more than mere execution of software on a generic computing device, as would be appreciated by those of skill in the art. One illustrative example of such a computing device 1000 is depicted in FIG. 14. The computing device 1000 is merely an illustrative example of a suitable computing environment and in no way limits the scope of the present invention. A "computing device," as represented by FIG. 14, can include a "workstation," a "server," a "laptop," a "desktop," a "hand-held device," a "mobile device," a "tablet computer," or other computing devices, as would be understood by those of skill in the art. Given that the computing device 1000 is depicted for illustrative purposes, embodiments of the present invention may utilize any number of computing devices 1000 in any number of different ways to implement a single embodiment of the present invention. Accordingly, embodiments of the present invention are not limited to a single computing device 1000, as would be appreciated by one with skill in the art, nor are they limited to a single type of implementation or configuration of the example computing device 1000.

The computing device 1000 can include a bus 1010 that can be coupled to one or more of the following illustrative components, directly or indirectly: a memory 1012, one or more processors 1014, one or more presentation components 1016, input/output ports 1018, input/output components 1020, and a power supply 1024. One of skill in the art will appreciate that the bus 1010 can include one or more busses, such as an address bus, a data bus, or any combination thereof. One of skill in the art additionally will appreciate that, depending on the intended applications and uses of a particular embodiment, multiple of these components can be implemented by a single device. Similarly, in some instances, a single component can be implemented by multiple devices. As such, FIG. 14 is merely illustrative of an exemplary computing device that can be used to implement one or more embodiments of the present invention, and in no way limits the invention.

The computing device 1000 can include or interact with a variety of computer-readable media. For example, computer-readable media can include Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices that can be used to encode information and can be accessed by the computing device 1000.

The memory 1012 can include computer-storage media in the form of volatile and/or nonvolatile memory. The memory 1012 may be removable, non-removable, or any combination thereof. Exemplary hardware devices are devices such as hard drives, solid-state memory, optical-disc drives, and the like. The computing device 1000 can include one or more processors that read data from components such as the memory 1012, the various I/O components 1020, etc. Presentation component(s) 1016 present data indications to a user or other device. Exemplary presentation components include a display device, speaker, printing component, vibrating component, etc.

The I/O ports 1018 can enable the computing device 1000 to be logically coupled to other devices, such as I/O components 1020. Some of the I/O components 1020 can be built into the computing device 1000. Examples of such I/O components 1020 include a microphone, joystick, recording device, game pad, satellite dish, scanner, printer, wireless device, networking device, and the like.

In some embodiments, the present disclosure relates to a system, including: a surgical robot, including: a robot arm; and an adapter configured to hold an end effector; and a control unit including a processing device configured to: receive imaging data of a target surgical site, wherein the end effector is positioned in the target surgical site; determine one or more anatomical landmarks in the imaging data; determine a location of the end effector; and generate an image overlay, wherein the image overlay is configured to be placed over the imaging data, and wherein the image overlay includes: one or more overlay elements indicative of a location of the one or more anatomical landmarks in the imaging data; and one or more overlay elements indicative of a location of the end effector relative the one or more anatomical landmarks.

In some embodiments, the present disclosure relates to a system, including: a surgical robot, including: a robot arm; and an adapter configured to hold an end effector; and a control unit including a processing device configured to: receive imaging data of a target surgical site, wherein the end effector is positioned in the target surgical site; determine one or more anatomical landmarks in the imaging data; determine a location of the end effector relative the one or more anatomical landmarks when the end effector was last actuated; and determine a location of a developed surgical plane in the imaging data based on the determined one or more anatomical landmarks and the determined location of the end effector.

In some embodiments, the present disclosure relates to a system, wherein the processing device is further configured to: generate an image overlay, wherein the image overlay is configured to be placed over the imaging data, and wherein the image overlay includes: one or more overlay elements indicative of the location of the developed surgical plane in the imaging data. In some embodiments, the present disclosure relates to a system, wherein the processing device is further configured to determine a location of a surgical plane to be developed in the imaging data based on: the determined location of the end effector relative the one or more anatomical landmarks when the end effector was last actuated; and the determined location of the developed surgical plane. In some embodiments, the present disclosure relates to a system, wherein the surgical plane to be developed tracks a predicted or determined curvature of a prostate. In some embodiments, the present disclosure relates to a system, wherein the processing device is further configured to: generate an image overlay, wherein the image overlay is configured to be placed over the imaging data, and wherein the image overlay includes: one or more overlay elements indicative of the location of the surgical plane to be developed in the imaging data.

In some embodiments, the present disclosure relates to a system, including: a surgical robot, including: a robot arm; and an adapter configured to hold an end effector; and a control unit including a processing device configured to: receive imaging data of a target surgical site, wherein the end effector is positioned in the target surgical site; determine one or more anatomical landmarks in the imaging data; determine a location of the end effector relative the one or more anatomical landmarks when the end effector was last actuated; and determine a progress of enucleation based on the determined one or more anatomical landmarks and the determined location of the end effector.

In some embodiments, the present disclosure relates to a method, including: receiving imaging data of a target surgical site, wherein an end effector held by an adapter of a robotic arm is positioned in the target surgical site; determining one or more anatomical landmarks in the imaging data; determining a location of the end effector; and generating an image overlay, wherein the image overlay is configured to be placed over the imaging data, and wherein the image overlay includes: one or more overlay elements indicative of a location of the one or more anatomical landmarks in the imaging data; and one or more overlay elements indicative of a location of the end effector relative the one or more anatomical landmarks.

In some embodiments, the present disclosure relates to a method, including: receiving imaging data of a target surgical site, wherein an end effector held by an adapter of a robotic arm is positioned in the target surgical site; determining one or more anatomical landmarks in the imaging data; determining a location of the end effector relative the one or more anatomical landmarks when the end effector was last actuated; and determining a location of a developed surgical plane in the imaging data based on the determined one or more anatomical landmarks and the determined location of the end effector.

In some embodiments, the present disclosure relates to a method, further including generating an image overlay, wherein the image overlay is configured to be placed over the imaging data, and wherein the image overlay includes one or more overlay elements indicative of the location of the developed surgical plane in the imaging data. In some embodiments, the present disclosure to a method, further including determining a location of a surgical plane to be developed in the imaging data based on: the determined location of the end effector relative the one or more anatomical landmarks when the end effector was last actuated; and the determined location of the developed surgical plane. In some embodiments, the present disclosure relates to a method, wherein the surgical plane to be developed tracks a predicted or determined curvature of a prostate. In some embodiments, the present disclosure relates to a method, further including generating an image overlay, wherein the image overlay is configured to be placed over the imaging data, and wherein the image overlay includes one or more overlay elements indicative of the location of the surgical plane to be developed in the imaging data.

In some embodiments, the present disclosure relates to a method, including: receiving imaging data of a target surgical site, wherein an end effector held by an adapter of a robotic arm is positioned in the target surgical site; determining one or more anatomical landmarks in the imaging data; determining a location of the end effector relative the one or more anatomical landmarks when the end effector was last actuated; and determining a progress of enucleation based on the determined one or more anatomical landmarks and the determined location of the end effector.

Non-limiting embodiments of the present disclosure are set out in the following clauses:

Clause 1. A system, comprising: one or more processors; and one or more storage mediums having encoded thereon executable instructions that, when executed by the one or more processors, cause the one or more processors to: receive imaging data of a surgical site, wherein an end effector held by a surgical robot is positioned in the surgical site; determine one or more anatomical landmarks in the imaging data; determine a location of the end effector; and generate a presentation to be presented on a user interface, wherein the presentation comprises: one or more presentation elements indicative of the one or more anatomical landmarks in the surgical site; and one or more presentation elements indicative of a location of the end effector relative the one or more anatomical landmarks.

Clause 2. The system of clause 1, wherein the presentation further comprises real-time imaging data of the surgical site.

Clause 3. The system of clause 1 or clause 2, wherein the one or more presentation elements indicative of the one or more anatomical landmarks in the surgical site annotate the real-time imaging data.

Clause 4. The system of any one of clauses 1-3, wherein: the presentation further comprises a global map of the surgical site; the one or more presentation elements indicative of the one or more anatomical landmarks in the surgical site are presented on the global map; and the one or more presentation elements indicative of the location of the end effector relative the one or more anatomical landmarks are presented on the global map.

Clause 5. The system of any one of clauses 1-4, wherein: the presentation further comprises a projection of an anatomy of the surgical site surrounding the real-time imaging data; and the one or more presentation elements indicative of the one or more anatomical landmarks in the surgical site are presented in the projection.

Clause 6. The system of any one of clauses 1-5, wherein the projection comprises a point cloud of the anatomy of the surgical site surrounding the real-time imaging data.

Clause 7. The system of any one of clauses 1-6, wherein the executable instructions, when executed by the one or more processors, further cause the one or more processors to determine a location of a developed surgical plane in the surgical site.

Clause 8. The system of any one of clauses 1-7, wherein the one or more processors is configured to determine the location of the developed surgical plane in the surgical site based on radially extreme points that the end effector has been located at.

Clause 9. The system of any one of clauses 1-8, wherein the presentation further comprises one or more presentation elements indicative of the location of the developed surgical plane in the surgical site.

Clause 10. The system of any one of clauses 1-9, wherein: the presentation further comprises a global map of the surgical site; and the one or more presentation elements indicative of the location of the developed surgical plane in the surgical site is presented in the global map of the surgical site.

Clause 11. The system of any one of clauses 1-10, wherein the one or more anatomical landmarks comprise at least one of a Verumontanum, a bladder neck, a ureteric orifice, or an external urethral sphincter.

Clause 12. The system of any one of clauses 1-11, wherein the surgical site comprises a prostate and surrounding anatomy.

Clause 13. The system of any one of clauses 1-12, wherein the end effector is configured to perform holmium laser enucleation of a prostate.

Clause 14. The system of any one of clauses 1-13, wherein the executable instructions, when executed by the one or more processors, further cause the one or more processors to determine a progress of enucleation of a prostate.

Clause 15. The system of any one of clauses 1-14, wherein the one or more processors is configured to determine the progress of enucleation of the prostate based on a location of the one or more anatomical landmarks in the surgical site and the location of the end effector in the surgical site.

Clause 16. A system, comprising: one or more processors; and one or more storage mediums having encoded thereon executable instructions that, when executed by the one or more processors, cause the one or more processors to: receive imaging data of a surgical site, wherein an end effector held by a surgical robot is positioned in the surgical site; determine one or more anatomical landmarks in the imaging data; determine a location of the end effector; and generate a presentation to be presented on a user interface, wherein the presentation comprises: real-time imaging data of the surgical site; a projection of an anatomy of the surgical site surrounding the real-time imaging data, wherein the projection comprises a point cloud; a global map of the surgical site; one or more presentation elements indicative of a location, a size, or a shape of the one or more anatomical landmarks in the surgical site, wherein: at least one of the one or more presentation elements indicative of the location, the size, or the shape of the one or more anatomical landmarks are presented on the global map; and at least one of the one or more presentation elements indicative of the location, the size, or the shape of the one or more anatomical landmarks are presented in the projection; and one or more presentation elements indicative of a location of the end effector relative the one or more anatomical landmarks, wherein the one or more presentation elements indicative of the location of the end effector relative the one or more anatomical landmarks are presented on the global map.

Clause 17. The system of clause 16, wherein: the executable instructions, when executed by the one or more processors, further cause the one or more processors to determine a location of a developed surgical plane in the surgical site; the presentation further comprises one or more presentation elements indicative of the location of the developed surgical plane in the surgical site; and the one or more presentation elements indicative of the location of the developed surgical plane in the surgical site is presented in the global map of the surgical site.

Clause 18. A method, comprising: receiving imaging data of a surgical site, wherein an end effector held by a surgical robot is positioned in the surgical site; determining one or more anatomical landmarks in the imaging data; determining a location of the end effector; and generating a presentation to be presented on a user interface, and wherein the presentation comprises: one or more presentation elements indicative of the one or more anatomical landmarks in the surgical site; and one or more presentation elements indicative of a location of the end effector relative the one or more anatomical landmarks.

Clause 19. The method of clause 18, wherein the presentation further comprises real-time imaging data of the surgical site.

Clause 20. The method of clause 18 or clause 19, wherein the one or more presentation elements indicative of the one or more anatomical landmarks in the surgical site annotate the real-time imaging data.

Clause 21. The method of any one of clauses 18-20, wherein: the presentation further comprises a global map of the surgical site; the one or more presentation elements indicative of the one or more anatomical landmarks in the surgical site are presented on the global map; and the one or more presentation elements indicative of the location of the end effector relative the one or more anatomical landmarks are presented on the global map.

Clause 22. The method of any one of clauses 18-21, wherein: the presentation further comprises a projection of an anatomy of the surgical site surrounding the real-time imaging data; and the one or more presentation elements indicative of the one or more anatomical landmarks in the surgical site are presented in the projection.

Clause 23. The method of any one of clauses 18-22, wherein the projection comprises a point cloud of the anatomy of the surgical site surrounding the real-time imaging data.

Clause 24. The method of any one of clauses 18-23, further comprising determining a location of a developed surgical plane in the surgical site.

Clause 25. The method of any one of clauses 18-24, wherein the location of the developed surgical plane in the surgical site is based on radially extreme points that the end effector has been located at.

Clause 26. The method of any one of clauses 18-25, wherein the presentation further comprises one or more presentation elements indicative of the location of the developed surgical plane in the surgical site.

Clause 27. The method of any one of clauses 18-26, wherein: the presentation further comprises a global map of the surgical site; and the one or more presentation elements indicative of the location of the developed surgical plane in the surgical site is presented in the global map of the surgical site.

Clause 28. The method of any one of clauses 18-27, wherein the one or more anatomical landmarks comprise at least one of a Verumontanum, a bladder neck, a ureteric orifice, or an external urethral sphincter.

Clause 29. The method of any one of clauses 18-28, wherein the surgical site comprises a prostate and surrounding anatomy.

Clause 30. The method of any one of clauses 18-29, wherein the surgical robot is configured to perform holmium laser enucleation of a prostate.

Clause 31. The method of any one of clauses 18-30, further comprising determining a progress of enucleation of a prostate.

Clause 32. The method of any one of clauses 18-31, wherein determining the progress of enucleation of the prostate is based on the location of the one or more anatomical landmarks in the surgical site and the location of the end effector in the surgical site.

Clause 33. A system, comprising: a surgical robot configured to hold an end effector; one or more processors; and one or more storage mediums having encoded thereon executable instructions that, when executed by the one or more processors, cause the one or more processors to: receive imaging data of a surgical site, wherein the end effector is positioned in the surgical site; determine one or more anatomical landmarks in the imaging data; determine a location of the end effector; and generate a presentation to be presented on a user interface, wherein the presentation comprises: one or more presentation elements indicative of a location of the one or more anatomical landmarks in the surgical site; and one or more presentation elements indicative of a location of the end effector relative the one or more anatomical landmarks.

Clause 34. A system, comprising: one or more processors; and one or more storage mediums having encoded thereon executable instructions that, when executed by the one or more processors, cause the one or more processors to: receive imaging data of a surgical site; determine one or more anatomical landmarks in the imaging data; and generate a presentation to be presented on a user interface, wherein the presentation comprises one or more presentation elements indicative of a location of the one or more anatomical landmarks in the surgical site.

Clause 35. A system, comprising: one or more processors; and one or more storage mediums having encoded thereon executable instructions that, when executed by the one or more processors, cause the one or more processors to: receive imaging data of a surgical site, wherein: the surgical site comprises a prostate; and an end effector held by a surgical robot configured to perform holmium laser enucleation of the prostate is positioned in the surgical site; determine one or more anatomical landmarks in the imaging data, wherein the one or more anatomical landmarks comprise at least one of a Verumontanum, a bladder neck, a ureteric orifice, or an external urethral sphincter; determine a location of the end effector; and generate a presentation to be presented on a user interface, wherein the presentation comprises: one or more presentation elements indicative of a location of the one or more anatomical landmarks in the surgical site; and one or more presentation elements indicative of a location of the end effector relative the one or more anatomical landmarks.

Clause 36. The system of clause 35, wherein the presentation further comprises real-time imaging data of the surgical site.

Clause 37. The system of clause 35 or clause 36, wherein: the presentation further comprises a global map of the surgical site; the one or more presentation elements indicative of the location of the one or more anatomical landmarks in the surgical site are presented on the global map; and the one or more presentation elements indicative of the location of the end effector relative the one or more anatomical landmarks are presented on the global map.

Clause 38. The system of any one of clauses 35-37, wherein: the presentation further comprises a point cloud projection of an anatomy of the surgical site surrounding the real-time imaging data; and the one or more presentation elements indicative of the location of the one or more anatomical landmarks in the surgical site are presented in the point cloud projection.

Clause 39. The system of any one of clauses 35-38, wherein: the executable instructions, when executed by the one or more processors, further cause the one or more processors to determine a location of a developed surgical plane in the surgical site, wherein the developed surgical plane separates an adenoma from a prostatic capsule; and the presentation further comprises one or more presentation elements indicative of the location of the developed surgical plane in the surgical site.

Clause 40. The system of any one of clauses 35-39, wherein: the presentation further comprises a global map of the surgical site; and the one or more presentation elements indicative of the location of the developed surgical plane in the surgical site is presented in the global map of the surgical site.

Clause 41. The system of any one of clauses 1-15 or the method of any one of clauses 18-32, wherein the one or more presentation elements indicative of the one or more anatomical landmarks in the surgical site are indicative of one or more of a location, a shape, or a size of the one or more anatomical landmarks in the surgical site.

Based on the foregoing, it should now be understood that embodiments shown and described herein relate to processes and systems for an image-guide surgical robotic platform.

All patents and publications mentioned in this specification are herein incorporated by reference to the same extent as if each independent patent and publication was specifically and individually indicated to be incorporated by reference.

As utilized herein, the terms "comprise" and "comprising" are intended to be construed as being inclusive, not exclusive. As utilized herein, the terms "exemplary", "example", and "illustrative", are intended to mean "serving as an example, instance, or illustration" and should not be construed as indicating, or not indicating, a preferred or advantageous configuration relative to other configurations. As utilized herein, the terms "about", "generally", and "approximately" are intended to cover variations that may existing in the upper and lower limits of the ranges of subjective or objective values, such as variations in properties, parameters, sizes, and dimensions. In one non-limiting example, the terms "about", "generally", and "approximately" mean at, or plus 10 percent or less, or minus 10 percent or less. In one nonlimiting example, the terms "about", "generally", and "approximately" mean sufficiently close to be deemed by one of skill in the art in the relevant field to be included. As utilized herein, the term "substantially" refers to the complete or nearly complete extend or degree of an action, characteristic, property, state, structure, item, or result, as would be appreciated by one of skill in the art. For example, an object that is "substantially" circular would mean that the object is either completely a circle to mathematically determinable limits, or nearly a circle as would be recognized or understood by one of skill in the art. The exact allowable degree of deviation from absolute completeness may in some instances depend on the specific context. However, in general, the nearness of completion will be so as to have the same overall result as if absolute and total completion were achieved or obtained. The use of "substantially" is equally applicable when utilized in a negative connotation to refer to the complete or near complete lack of an action, characteristic, property, state, structure, item, or result, as would be appreciated by one of skill in the art. The use of the terminology X "or" Y herein should be interpreted as meaning either "X" or "Y" individually, or both "X and Y" together.

Many modifications and alternative embodiments of the present disclosure will be apparent to those skilled in the art in view of the foregoing description. Accordingly, this description is to be construed as illustrative only and is for the purpose of teaching those skilled in the art the best mode for carrying out the present disclosure. Details of the structure may vary substantially without departing from the spirit of the present disclosure, and exclusive use of all modifications that come within the scope of any appended claims is reserved. Within this specification, embodiments have been described in a way which enables a clear and concise specification to be written, but it is intended and will be appreciated that embodiments may be variously combined or separated without parting from the scope of the present disclosure. It is intended that the present disclosure be limited only to the extent required by any appended claims and the applicable rules of law.

What is claimed is:

1. A system, comprising:
one or more processors; and
one or more storage mediums having encoded thereon executable instructions that, when executed by the one or more processors, cause the one or more processors to:
receive imaging data of a surgical site, wherein an end effector held by a surgical robot is positioned in the surgical site;
determine a plurality of anatomical landmarks in the imaging data;
determine a location of the end effector;
determine a location of a developed surgical plane in the surgical site, wherein the one or more processors is configured to determine the location of the developed surgical plane in the surgical site based on radially extreme points that the end effector has been located at; and
generate a presentation to be presented on a user interface, wherein the presentation comprises:
a plurality of presentation elements indicative of the plurality of anatomical landmarks in the surgical site; and
one or more presentation elements indicative of a location of the end effector relative the plurality of anatomical landmarks.

2. The system of claim 1, wherein the presentation further comprises real-time imaging data of the surgical site.

3. The system of claim 2, wherein the plurality of presentation elements indicative of the plurality of anatomical landmarks in the surgical site annotate the real-time imaging data.

4. The system of claim 2, wherein:
the presentation further comprises a global map of the surgical site;
the plurality of presentation elements indicative of the plurality of anatomical landmarks in the surgical site are presented on the global map; and
the one or more presentation elements indicative of the location of the end effector relative the plurality of anatomical landmarks are presented on the global map.

5. The system of claim 2, wherein:
the presentation further comprises a projection of an anatomy of the surgical site surrounding the real-time imaging data; and
the plurality of presentation elements indicative of the plurality of anatomical landmarks in the surgical site are presented in the projection.

6. The system of claim 5, wherein the projection comprises a point cloud of the anatomy of the surgical site surrounding the real-time imaging data.

7. The system of claim 1, wherein the presentation further comprises one or more presentation elements indicative of the location of the developed surgical plane in the surgical site.

8. The system of claim 7, wherein:
the presentation further comprises a global map of the surgical site; and
the one or more presentation elements indicative of the location of the developed surgical plane in the surgical site is presented in the global map of the surgical site.

9. The system of claim 1, wherein the plurality of anatomical landmarks comprises a bladder neck and an external urethral sphincter.

10. The system of claim 1, wherein the surgical site comprises a prostate and surrounding anatomy.

11. The system of claim 1, wherein the end effector is configured to perform holmium laser enucleation of a prostate.

12. The system of claim 1, wherein the executable instructions, when executed by the one or more processors, further cause the one or more processors to determine a progress of enucleation of a prostate.

13. The system of claim 12, wherein the one or more processors is configured to determine the progress of enucleation of the prostate based on a location of the plurality of anatomical landmarks in the surgical site and the location of the end effector in the surgical site.

14. A system, comprising:
one or more processors; and
one or more storage mediums having encoded thereon executable instructions that, when executed by the one or more processors, cause the one or more processors to:
receive imaging data of a surgical site, wherein an end effector held by a surgical robot is positioned in the surgical site;
determine a plurality of anatomical landmarks in the imaging data;
determine a location of the end effector;
determine a progress of enucleation of a prostate, wherein the one or more processors is configured to determine the progress of enucleation of the prostate based on a location of the plurality of anatomical landmarks in the surgical site and the location of the end effector in the surgical site; and
generate a presentation to be presented on a user interface, wherein the presentation comprises:
a plurality of presentation elements indicative of the plurality of anatomical landmarks in the surgical site; and
one or more presentation elements indicative of a location of the end effector relative the plurality of anatomical landmarks.

15. The system of claim 14, wherein the presentation further comprises real-time imaging data of the surgical site.

16. The system of claim 15, wherein the plurality of presentation elements indicative of the plurality of anatomical landmarks in the surgical site annotate the real-time imaging data.

17. The system of claim 15, wherein:
the presentation further comprises a global map of the surgical site;
the plurality of presentation elements indicative of the plurality of anatomical landmarks in the surgical site are presented on the global map; and
the one or more presentation elements indicative of the location of the end effector relative the plurality of anatomical landmarks are presented on the global map.

18. The system of claim 15, wherein:
the presentation further comprises a projection of an anatomy of the surgical site surrounding the real-time imaging data; and
the plurality of presentation elements indicative of the plurality of anatomical landmarks in the surgical site are presented in the projection.

19. The system of claim 18, wherein the projection comprises a point cloud of the anatomy of the surgical site surrounding the real-time imaging data.

20. The system of claim 14, wherein the presentation further comprises one or more presentation elements indicative of a location of a developed surgical plane in the surgical site.

21. The system of claim 20, wherein:
the presentation further comprises a global map of the surgical site; and
the one or more presentation elements indicative of the location of the developed surgical plane in the surgical site is presented in the global map of the surgical site.

22. The system of claim 14, wherein the plurality of anatomical landmarks comprises a bladder neck and an external urethral sphincter.

23. A method, comprising:
receiving imaging data of a surgical site, wherein an end effector held by a surgical robot is positioned in the surgical site;
determining a plurality of anatomical landmarks in the imaging data;
determining a location of the end effector;
determining a location of a developed surgical plane in the surgical site, wherein the location of the developed surgical plane in the surgical site is based on radially extreme points that the end effector has been located at; and
generating a presentation to be presented on a user interface, and wherein the presentation comprises:
a plurality of presentation elements indicative of the plurality of anatomical landmarks in the surgical site; and
one or more presentation elements indicative of a location of the end effector relative the plurality of anatomical landmarks.

24. A method, comprising:
receiving imaging data of a surgical site, wherein an end effector held by a surgical robot is positioned in the surgical site;
determining a plurality of anatomical landmarks in the imaging data;
determining a location of the end effector;
determining a progress of enucleation of a prostate, wherein determining the progress of enucleation of the prostate is based on the location of the plurality of anatomical landmarks in the surgical site and the location of the end effector in the surgical site; and
generating a presentation to be presented on a user interface, and wherein the presentation comprises:
a plurality of presentation elements indicative of the plurality of anatomical landmarks in the surgical site; and
one or more presentation elements indicative of a location of the end effector relative the plurality of anatomical landmarks.

* * * * *